US011983166B1

(12) United States Patent
Miller et al.

(10) Patent No.: US 11,983,166 B1
(45) Date of Patent: May 14, 2024

(54) SUMMARIZED VIEW OF SEARCH RESULTS WITH A PANEL IN EACH COLUMN

(71) Applicant: SPLUNK INC., San Francisco, CA (US)

(72) Inventors: Jesse Miller, Berkeley, CA (US); Marc V. Robichaud, San Francisco, CA (US); Cory Burke, San Bruno, CA (US); Jeffrey Thomas Lloyd, South San Francisco, CA (US); Alexander James, Sammamish, WA (US); Andrew Robbins, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/806,151

(22) Filed: Jun. 9, 2022

Related U.S. Application Data

(63) Continuation of application No. 16/260,985, filed on Jan. 29, 2019, now Pat. No. 11,442,924, which is a
(Continued)

(51) Int. Cl.
*G06F 16/23* (2019.01)
*G06F 3/0482* (2013.01)
(Continued)

(52) U.S. Cl.
CPC ........ *G06F 16/2372* (2019.01); *G06F 3/0482* (2013.01); *G06F 3/0484* (2013.01);
(Continued)

(58) Field of Classification Search
CPC ...... G06F 16/2372; G06F 16/33; G06F 16/23; G06F 16/26; G06F 16/3334;
(Continued)

(56) References Cited

U.S. PATENT DOCUMENTS 5,251,152 A 10/1993 Notess
5,261,044 A 11/1993 Dev et al.
(Continued)

FOREIGN PATENT DOCUMENTS

JP 2006-99477 A 4/2006

OTHER PUBLICATIONS

U.S. Appl. No. 14/610,717, filed Jan. 30, 2015, Status: Granted.
(Continued)

*Primary Examiner* — Joshua Bullock
(74) *Attorney, Agent, or Firm* — Shook, Hardy & Bacon, L.L.P.

(57) ABSTRACT

In some embodiments, a method may include display of a data summary view of a set of events that correspond to query results of a query. Each event of the set of events may include data items of a plurality of event attributes. In embodiments, the data summary view can include various summary reports. Each summary report can include summary entries and a summary graph that each present a summary of data items of a selected event attribute, of the plurality of event attributes. At least one summary report can include summary entries that are selectable by a user. The method may further include filtering the set of event, in response to, and based on, selection of one or more of the selectable summary entries by the user and updating of at least the first and second summary graphs to correspond to the filtered set of events.

20 Claims, 42 Drawing Sheets

Related U.S. Application Data continuation of application No. 14/815,932, filed on Jul. 31, 2015, now Pat. No. 10,204,093, which is a continuation-in-part of application No. 14/611,002, filed on Jan. 30, 2015, now Pat. No. 10,061,824.

(51) Int. Cl.

| | | |
|---|---|---|
| *G06F 3/0484* | (2022.01) | |
| *G06F 3/04842* | (2022.01) | |
| *G06F 16/00* | (2019.01) | |
| *G06F 16/242* | (2019.01) | |
| *G06F 16/2453* | (2019.01) | |
| *G06F 16/2455* | (2019.01) | |
| *G06F 16/2458* | (2019.01) | |
| *G06F 16/26* | (2019.01) | |
| *G06F 16/33* | (2019.01) | |
| *G06F 21/62* | (2013.01) | |
| *G06F 40/174* | (2020.01) | |
| *G06F 40/177* | (2020.01) | |
| *G06F 40/186* | (2020.01) | |
| *G06Q 10/00* | (2023.01) | |
| *G06T 11/20* | (2006.01) | |
| *G06Q 10/10* | (2023.01) | |

(52) U.S. Cl.
CPC .......... *G06F 3/04842* (2013.01); *G06F 16/00* (2019.01); *G06F 16/23* (2019.01); *G06F 16/235* (2019.01); *G06F 16/2423* (2019.01); *G06F 16/24544* (2019.01); *G06F 16/24564* (2019.01); *G06F 16/2477* (2019.01); *G06F 16/26* (2019.01); *G06F 16/33* (2019.01); *G06F 16/3334* (2019.01); *G06F 21/6227* (2013.01); *G06F 40/174* (2020.01); *G06F 40/177* (2020.01); *G06F 40/186* (2020.01); *G06Q 10/00* (2013.01); *G06T 11/206* (2013.01); *G06Q 10/10* (2013.01); *G06T 2200/24* (2013.01)

(58) Field of Classification Search
CPC ........... G06F 16/24544; G06F 16/2477; G06F 16/235; G06F 16/00; G06F 16/2423; G06F 16/24564; G06F 40/186; G06F 40/177; G06F 40/174; G06F 3/0482; G06F 3/0484; G06F 3/04842; G06F 21/6227; G06Q 10/00; G06Q 10/10; G06T 11/206; G06T 2200/24
USPC ....................................................... 707/766
See application file for complete search history.

(56) References Cited

U.S. PATENT DOCUMENTS

| | | |
|---|---|---|
| 5,619,688 A | 4/1997 | Bosworth et al. |
| 5,625,812 A | 4/1997 | David |
| 5,760,770 A | 6/1998 | Bliss et al. |
| 5,781,773 A | 7/1998 | Vanderpool et al. |
| 5,787,411 A | 7/1998 | Groff et al. |
| 5,966,712 A | 10/1999 | Sabatini et al. |
| 5,982,370 A | 11/1999 | Kamper |
| 6,072,493 A | 6/2000 | Driskell et al. |
| 6,301,584 B1 | 10/2001 | Ranger |
| 6,430,584 B1 | 8/2002 | Comer et al. |
| 6,438,565 B1 | 8/2002 | Ammirato et al. |
| 6,493,703 B1 | 12/2002 | Knight et al. |
| 6,513,033 B1 | 1/2003 | Trauring |
| 6,553,317 B1 | 4/2003 | Lincoln et al. |
| 6,691,254 B2 | 2/2004 | Kaler et al. |
| 6,768,997 B2 | 7/2004 | Schirmer et al. |
| 6,775,682 B1 | 8/2004 | Ballamkonda et al. |
| 6,851,088 B1 | 2/2005 | Conner et al. |
| 6,985,901 B1 | 1/2006 | Sachse et al. |
| 7,003,475 B1 | 2/2006 | Friedland et al. |
| 7,034,710 B2 | 4/2006 | Falada et al. |
| 7,131,037 B1 | 10/2006 | LeFaive et al. |
| 7,173,651 B1 | 2/2007 | Knowles |
| 7,190,382 B1 | 3/2007 | Retlich et al. |
| 7,243,046 B1 | 7/2007 | Patlashenko et al. |
| 7,324,108 B2 | 1/2008 | Hild et al. |
| 7,480,647 B1 | 1/2009 | Murstein et al. |
| 7,583,187 B1 | 9/2009 | Cheng et al. |
| 7,603,349 B1 | 10/2009 | Kraft et al. |
| 7,669,119 B1 | 2/2010 | Orelind et al. |
| 7,703,026 B2 | 4/2010 | Bechtold et al. |
| 7,750,910 B2 | 7/2010 | Hild et al. |
| 7,797,585 B1 | 9/2010 | Sahin et al. |
| 7,797,635 B1 | 9/2010 | Denise |
| 7,822,707 B1 * | 10/2010 | Yehuda ................ G06F 16/248 707/792 |
| 7,925,660 B2 | 4/2011 | Dieberger et al. |
| 7,937,344 B2 | 5/2011 | Baum et al. |
| 8,112,425 B2 | 2/2012 | Baum et al. |
| 8,140,563 B2 | 3/2012 | Midgley |
| 8,150,815 B2 | 4/2012 | Vian et al. |
| 8,150,960 B2 | 4/2012 | Kumbalimutt |
| 8,166,071 B1 * | 4/2012 | Korablev ............. G06F 21/604 707/783 |
| 8,296,412 B2 | 10/2012 | Secor et al. |
| 8,364,709 B1 | 1/2013 | Das et al. |
| 8,412,696 B2 | 4/2013 | Zhang et al. |
| 8,473,250 B2 | 6/2013 | Adest et al. |
| 8,473,520 B1 | 7/2013 | Tsang et al. |
| 8,484,208 B1 | 7/2013 | Raghavan et al. |
| 8,515,963 B1 | 8/2013 | Blank, Jr. et al. |
| 8,516,008 B1 | 8/2013 | Marquardt et al. |
| 8,577,911 B1 | 11/2013 | Stepinski et al. |
| 8,583,631 B1 | 11/2013 | Ganapathi et al. |
| 8,707,194 B1 | 4/2014 | Jenkins et al. |
| 8,712,993 B1 | 4/2014 | Ordonez |
| 8,751,529 B2 | 6/2014 | Zhang et al. |
| 8,752,014 B2 | 6/2014 | Harmon |
| 8,788,525 B2 | 7/2014 | Neels et al. |
| 9,002,873 B1 | 4/2015 | King |
| 9,152,929 B2 | 10/2015 | Carasso et al. |
| 9,218,615 B2 | 12/2015 | Wan et al. |
| 9,286,413 B1 | 3/2016 | Coates et al. |
| 9,437,022 B2 | 9/2016 | Vander Broek |
| 9,507,848 B1 | 11/2016 | Li et al. |
| 9,641,334 B2 * | 5/2017 | Faitelson ................ G06F 9/468 |
| 10,127,258 B2 | 11/2018 | Lamas et al. |
| 10,282,350 B1 | 5/2019 | Pathak |
| 11,442,924 B2 * | 9/2022 | Miller ................... G06F 40/186 |
| 11,651,012 B1 * | 5/2023 | Dinga ................. G06F 11/3476 717/107 |
| 2002/0049713 A1 | 4/2002 | Khemlani et al. |
| 2002/0194166 A1 | 12/2002 | Fowler |
| 2003/0100999 A1 | 5/2003 | Markowitz |
| 2003/0217043 A1 | 11/2003 | Weiss et al. |
| 2003/0220940 A1 | 11/2003 | Futoransky et al. |
| 2004/0010564 A1 | 1/2004 | Imaida et al. |
| 2004/0030741 A1 | 2/2004 | Wolton et al. |
| 2004/0186826 A1 | 9/2004 | Choi et al. |
| 2004/0186835 A1 | 9/2004 | Sakurai |
| 2004/0196308 A1 | 10/2004 | Blomquist |
| 2004/0221296 A1 | 11/2004 | Ogielski et al. |
| 2004/0236757 A1 | 11/2004 | Caccavale et al. |
| 2004/0254919 A1 | 12/2004 | Giuseppini |
| 2005/0015624 A1 | 1/2005 | Ginter et al. |
| 2005/0027845 A1 | 2/2005 | Secor et al. |
| 2005/0044065 A1 | 2/2005 | McArdle |
| 2005/0066027 A1 | 3/2005 | Hakiel et al. |
| 2005/0086187 A1 | 4/2005 | Grosser et al. |
| 2005/0091198 A1 | 4/2005 | Dettinger et al. |
| 2005/0172261 A1 | 8/2005 | Yuknewicz et al. |
| 2005/0198247 A1 | 9/2005 | Perry et al. |
| 2006/0028470 A1 | 2/2006 | Bennett et al. |
| 2006/0069635 A1 | 3/2006 | Ram et al. |
| 2006/0100974 A1 | 5/2006 | Dieberger et al. |
| 2006/0129554 A1 | 6/2006 | Suyama et al. |

(56) References Cited

U.S. PATENT DOCUMENTS

| | | | |
|---|---|---|---|
| 2006/0129914 A1 | 6/2006 | Ellis et al. | |
| 2006/0184529 A1 | 8/2006 | Berg et al. | |
| 2006/0221184 A1 | 10/2006 | Vallone et al. | |
| 2007/0022125 A1* | 1/2007 | Salam | G06F 16/951 |
| 2007/0078872 A1 | 4/2007 | Cohen | |
| 2007/0088723 A1* | 4/2007 | Fish | G06Q 30/00 |
| 2007/0100878 A1 | 5/2007 | Fielding et al. | |
| 2007/0118642 A1 | 5/2007 | Kumbalimutt | |
| 2007/0130585 A1 | 6/2007 | Perret et al. | |
| 2007/0174188 A1* | 7/2007 | Fish | G06Q 20/10 |
| | | | 705/39 |
| 2007/0214164 A1 | 9/2007 | MacLennan et al. | |
| 2007/0280123 A1 | 12/2007 | Atkins et al. | |
| 2008/0071580 A1 | 3/2008 | Marcus et al. | |
| 2008/0086363 A1 | 4/2008 | Kass et al. | |
| 2008/0091466 A1 | 4/2008 | Butler et al. | |
| 2008/0104542 A1 | 5/2008 | Cohen et al. | |
| 2008/0147578 A1 | 6/2008 | Leffingwell et al. | |
| 2008/0195649 A1* | 8/2008 | Lefebvre | G06F 16/252 |
| | | | 707/999.102 |
| 2008/0228442 A1 | 9/2008 | Lippincott et al. | |
| 2008/0270369 A1 | 10/2008 | Myerson et al. | |
| 2009/0063472 A1 | 3/2009 | Pell et al. | |
| 2009/0063473 A1 | 3/2009 | Van Den Berg et al. | |
| 2009/0192985 A1 | 7/2009 | Bolls et al. | |
| 2009/0299998 A1 | 12/2009 | Kim | |
| 2009/0319498 A1 | 12/2009 | Zabokritski et al. | |
| 2009/0327240 A1* | 12/2009 | Meehan | G06F 16/248 |
| 2010/0030888 A1 | 2/2010 | Nawabzada et al. | |
| 2010/0049692 A1* | 2/2010 | Astito | G06F 16/2452 |
| | | | 707/769 |
| 2010/0062796 A1 | 3/2010 | Hayton et al. | |
| 2010/0114885 A1 | 5/2010 | Bowers et al. | |
| 2010/0122194 A1 | 5/2010 | Rogers | |
| 2010/0162140 A1 | 6/2010 | Fereira et al. | |
| 2010/0205521 A1 | 8/2010 | Folting | |
| 2010/0228752 A1 | 9/2010 | Folting et al. | |
| 2010/0313127 A1 | 12/2010 | Gosper et al. | |
| 2010/0325118 A1 | 12/2010 | Takemoto | |
| 2011/0032260 A1 | 2/2011 | Duggan et al. | |
| 2011/0066585 A1 | 3/2011 | Subrahmanyam et al. | |
| 2011/0083167 A1 | 4/2011 | Carpenter et al. | |
| 2011/0099500 A1 | 4/2011 | Smith et al. | |
| 2011/0145786 A1 | 6/2011 | Fayed et al. | |
| 2011/0167058 A1 | 7/2011 | van Os | |
| 2011/0251992 A1 | 10/2011 | Bethlehem et al. | |
| 2011/0314148 A1 | 12/2011 | Petersen et al. | |
| 2012/0005044 A1* | 1/2012 | Coleman | G06Q 30/02 |
| | | | 705/27.2 |
| 2012/0011474 A1 | 1/2012 | Kashik et al. | |
| 2012/0047025 A1 | 2/2012 | Strohman | |
| 2012/0102396 A1 | 4/2012 | Arksey et al. | |
| 2012/0124072 A1 | 5/2012 | Vaidyanathan et al. | |
| 2012/0173752 A1 | 7/2012 | Erskins | |
| 2012/0173985 A1 | 7/2012 | Peppel | |
| 2012/0197934 A1 | 8/2012 | Zhang et al. | |
| 2012/0246303 A1 | 9/2012 | Petersen et al. | |
| 2012/0265727 A1 | 10/2012 | Naryzhnyy et al. | |
| 2012/0265805 A1 | 10/2012 | Samdadiya et al. | |
| 2013/0073573 A1 | 3/2013 | Huang et al. | |
| 2013/0086587 A1 | 4/2013 | Naik et al. | |
| 2013/0151491 A1 | 6/2013 | Gislason | |
| 2013/0151563 A1 | 6/2013 | Addepalli et al. | |
| 2013/0173398 A1 | 7/2013 | Wang et al. | |
| 2013/0179460 A1 | 7/2013 | Acuña et al. | |
| 2013/0179793 A1 | 7/2013 | Duggan et al. | |
| 2013/0191371 A1 | 7/2013 | Poznanski et al. | |
| 2013/0212125 A1 | 8/2013 | Wierenga et al. | |
| 2013/0238968 A1 | 9/2013 | Barrus | |
| 2013/0283168 A1 | 10/2013 | Brown et al. | |
| 2013/0305183 A1 | 11/2013 | Kumagai et al. | |
| 2013/0326620 A1 | 12/2013 | Merza et al. | |
| 2014/0006871 A1 | 1/2014 | Lakshmanan et al. | |
| 2014/0032694 A1 | 1/2014 | Cohn et al. | |
| 2014/0053070 A1 | 2/2014 | Powers et al. | |
| 2014/0108437 A1 | 4/2014 | Brown et al. | |
| 2014/0149393 A1 | 5/2014 | Bhatt et al. | |
| 2014/0149592 A1 | 5/2014 | Krishna | |
| 2014/0160238 A1 | 6/2014 | Yim et al. | |
| 2014/0222641 A1 | 8/2014 | Køber et al. | |
| 2014/0222750 A1 | 8/2014 | Uchiumi et al. | |
| 2014/0244625 A1 | 8/2014 | Seghezzi et al. | |
| 2014/0297666 A1 | 10/2014 | Morris | |
| 2014/0310649 A1 | 10/2014 | Bernstein et al. | |
| 2014/0324862 A1 | 10/2014 | Bingham et al. | |
| 2014/0344249 A1 | 11/2014 | Magistrado | |
| 2014/0344622 A1 | 11/2014 | Huang et al. | |
| 2015/0058318 A1 | 2/2015 | Blackwell et al. | |
| 2015/0109305 A1 | 4/2015 | Black | |
| 2015/0213631 A1 | 7/2015 | Vander Broek | |
| 2015/0254138 A1 | 9/2015 | Anderson et al. | |
| 2015/0294256 A1 | 10/2015 | Mahesh et al. | |
| 2015/0339405 A1 | 11/2015 | Vora et al. | |
| 2016/0004736 A1* | 1/2016 | Tsuchida | G06F 16/2455 |
| | | | 707/742 |
| 2016/0004741 A1* | 1/2016 | Johnson | G06F 21/6218 |
| | | | 707/783 |
| 2016/0012111 A1 | 1/2016 | Pattabhiraman et al. | |
| 2016/0125120 A1 | 5/2016 | Yu et al. | |
| 2016/0155254 A1* | 6/2016 | Briscoe | G06F 3/04842 |
| | | | 345/467 |
| 2016/0188744 A1 | 6/2016 | Ito et al. | |
| 2016/0335303 A1 | 11/2016 | Madhalam et al. | |
| 2017/0032550 A1 | 2/2017 | Vander Broek | |
| 2017/0039229 A1 | 2/2017 | Verma | |
| 2017/0364506 A1* | 12/2017 | Stern | G10L 15/26 |
| 2017/0364534 A1 | 12/2017 | Zhang et al. | |
| 2018/0025050 A1 | 1/2018 | Yadav et al. | |
| 2018/0046643 A1 | 2/2018 | Brodt et al. | |
| 2019/0004493 A1 | 1/2019 | Kawanoue | |
| 2019/0034502 A1 | 1/2019 | Onoda | |
| 2019/0098106 A1 | 3/2019 | Mungel et al. | |
| 2019/0188302 A1 | 6/2019 | Milby et al. | |
| 2019/0266273 A1 | 8/2019 | Karlapudi et al. | |
| 2019/0385014 A1 | 12/2019 | Malak et al. | |
| 2022/0141188 A1 | 5/2022 | Apger et al. | |
| 2023/0129123 A1* | 4/2023 | Wang | G06Q 10/10 |
| | | | 705/7.26 |
| 2023/0150529 A1* | 5/2023 | Stenson | B60W 60/001 |
| | | | 701/23 |

OTHER PUBLICATIONS

U.S. Appl. No. 14/611,026, filed Jan. 30, 2015, Status: Granted.
U.S. Appl. No. 15/996,226, filed Jun. 1, 2018, Status: Granted.
U.S. Appl. No. 14/610,702, filed Jan. 30, 2015, Status: Granted.
U.S. Appl. No. 14/610,676, filed Jan. 30, 2015, Status: Granted.
U.S. Appl. No. 15/799,949, filed Oct. 31, 2017, Status: Granted.
U.S. Appl. No. 14/611,007, filed Jan. 30, 2015, Status: Granted.
U.S. Appl. No. 15/885,546, filed Jan. 31, 2018, Status: Granted.
U.S. Appl. No. 14/611,002, filed Jan. 30, 2015, Status: Granted.
U.S. Appl. No. 14/815,923, filed Jul. 31, 2015, Status: Granted.
U.S. Appl. No. 15/799,917, filed Oct. 31, 2017, Status: Granted.
U.S. Appl. No. 14/815,924, filed Jul. 31, 2015, Status: Granted.
U.S. Appl. No. 14/815,927, filed Jul. 31, 2015, Status: Granted.
U.S. Appl. No. 16/260,971, filed Jan. 29, 2019, Status: Pending.
U.S. Appl. No. 14/815,928, filed Jul. 31, 2015, Status: Granted.
U.S. Appl. No. 16/216,021, filed Dec. 11, 2018, Status: Granted.
U.S. Appl. No. 14/815,929, filed Jul. 31, 2015, Status: Granted.
U.S. Appl. No. 16/250,949, filed Jan. 17, 2019, Status: Granted.
U.S. Appl. No. 14/815,932, filed Jul. 31, 2015, Status: Granted.
U.S. Appl. No. 16/260,985, filed Jan. 29, 2019, Status: Pending.
U.S. Appl. No. 16/260,962, filed Jan. 29, 2019, Status: Pending.
U.S. Appl. No. 16/042,989, filed Jul. 23, 2018, Status: Pending.
U.S. Appl. No. 14/611,023, filed Jan. 30, 2015, Status: Granted.
U.S. Appl. No. 15/878,299, filed Jan. 23, 2018, Status: Granted.
U.S. Appl. No. 14/610,710, filed Jan. 30, 2015, Status: Granted.
U.S. Appl. No. 15/885,538, filed Jan. 31, 2018, Status: Granted.
U.S. Appl. No. 14/611,018, filed Jan. 30, 2015, Status: Granted.
U.S. Appl. No. 15/956,131, filed Apr. 18, 2018, Status: Granted.
U.S. Appl. No. 16/750,256, filed Jan. 23, 2020, Status: Pending.

(56) References Cited

OTHER PUBLICATIONS

U.S. Appl. No. 16/919,400, filed Jul. 2, 2020, Status: Granted.
U.S. Appl. No. 17/076,534, filed Oct. 21, 2020, Status: Pending.
U.S. Appl. No. 17/128,913, filed Dec. 21, 2020, Status: Pending.
U.S. Appl. No. 17/121,949, filed Dec. 15, 2020, Status: Pending.
U.S. Appl. No. 17/212,953, filed Mar. 25, 2021, Status: Pending.
U.S. Appl. No. 17/237,422, filed Apr. 22, 2021, Status: Pending.
U.S. Appl. No. 17/121,935, filed Dec. 15, 2020, Status: Pending.
U.S. Appl. No. 17/809,830, filed Jun. 29, 2022, Status: Pending.
Bitincka, L., et al., "Optimizing Data Analysis With a Semi-Structured Time Series Database," pp. 1-9 (2010).
Bumgarner, Vincent, "Implementing Splunk: Big Data Reporting and Development for Operational Intelligence," Retrieved from Internet URL: http://2.droppdf.com/files/ug81f/implementing-splunk.pdf, 448 pages (Jan. 2013).
Carasso, D., "Exploring Splunk Search Processing Language (SPL) Primer and Cookbook", CITO Research, pp. 1-156 (2012).
Citation of Link to Video Available Online: Wrangling Big Data from the CPG Industry with Cloudera & Trifacta, Published Oct. 20, 2014, Available at: https://www.youtube.com/watch?v=WuBjZzq8bWw, pp. 2, Last Accessed (Dec. 15, 2015).
Citation of Link to Application Available Online: Data Wrangler Application, Available at: http://vis.stanford.edu/wrangler/app, Copyright 2011-2013 Stanford Visualization Group, pp. 3, Last accessed (Dec. 15, 2015).
"Display query system event subset—Bing," Retrieved from Internet URL: http://www.bing.com/search?q=display%20query%20system%20event20subset&qs=n&f . . . , p. 1 (Apr. 4, 2016).
"Field Extractor App—SPLUNK," Retrieved from Internet URL: https://www.youtube.com/watch?v=Gfi9Cm9v64Y video; dated Jul. 12, 2013, pp. 3 (Jan. 21, 2016).
"Splunk Cloud 8.0.2004 User Manual", available online, retrieved on May 20, 2020 from docs.splunk.com, pp. 66.
Splunk Enterprise Security User Manual 2.0, https://web.archive.org/web/20120712034303/http://docs.splunk.com/Documentaiton/ES/latest/User/Incident Reviewdashboard; dated Jul. 12, 2012; last accessed Oct. 14, 2016 to show the date of 2.0 user manual; and the complete PDF version of the Splunk Enterprise Security User Manual 2.0 downloaded, 141 pages (Oct. 14, 2016).
"Splunk Enterprise 8.0.0 Overview", available online, retrieved on May 20, 2020 from docs.splunk.com, pp. 17.
"Splunk Quick Reference Guide", updated 2019, available online at https://www.splunk.com/pdfs/solution-guides/splunk-quick-reference-guide.pdf, retrieved on May 20, 2020, pp. 6.

\* cited by examiner

Original Search: 501
search "error | stats count BY host

Sent to peers: 502
search "error | prestats count BY host (map)

Executed by search head: 503
Merge prestats results received from peers (reduce)

| | _time | _raw | source | host | bytes | clientip | method | referer |
|---|---|---|---|---|---|---|---|---|
| 1 | 2013-11-10T18:22:16.000-0800 | 91.205.189.15 -- [10/Nov/2013:18:22:16] "GET /oldlink?itemid=34&JSESSIONID=SD6SL7FF7ADFF53113 HTTP 1.1" 200 1665 "http://www.buttercupgames.com/oldlink?itemid=EST-14" "Mozilla/5.0 (Windows NT 6.1; WOW64) AppleWebKit/536.5 (KHTML, like Gecko) Chrome/19.0.1084.46 Safari/536.5" 159 | tutorialdata.zip:./www2/access.log | mrobichaud-mbp.sv.splunk.com | 1665 | 91.205.189.15 | GET | http://www.buttercupgames.com/oldlink?itemid=EST-14 |
| 2 | 2013-11-10T18:22:15.000-0800 | 91.205.189.15 -- [10/Nov/2013:18:22:15] "GET /category.screen?categoryid=SHOOTER&JSESSIONID=SD6SL7FF7ADFF53113 HTTP 1.1" 200 1369 "http://www.google.com" "Mozilla/5.0 (Windows NT 6.1; WOW 64) AppleWebKit/536.5 (KHTML, like Gecko) Chrome/19.0.1084.46 Safari/536.5" 779 | tutorialdata.zip:./www2/access.log | mrobichaud-mbp.sv.splunk.com | 1369 | 91.205.189.15 | GET | http://www.google.com |
| 3 | 2013-11-10T18:20:56.000-0800 | 182.236.164.11 -- [10/Nov/2013:18:20:56] "GET /cart.do?action=addtocart&itemid=298&productid=BS-AG-G908&JSESSIONID=SD6SL8FF10ADFF53101 HTTP 1.1" 200 2252 "http://www.buttercupgames.com/oldlink?itemid=EST-15" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:./www2/access.log | mrobichaud-mbp.sv.splunk.com | 2252 | 182.236.164.11 | GET | http://www.buttercupgames.com/oldlink?itemid=EST-15 |
| 4 | 2013-11-10T18:20:55.000-0800 | 182.236.164.11 -- [10/Nov/2013:18:20:55] "POST /oldlink?itemid=EST-18&JSESSIONID=SD6SL8FF10ADFF53101 HTTP 1.1" 408 893 "http://www.buttercupgames.com/product.screen?productid=5F-BV5-G01" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:./www2/access.log | mrobichaud-mbp.sv.splunk.com | 893 | 182.236.164.11 | GET | http://www.buttercupgames.com/product.screen?productid=5F-BV5-G01 |
| 5 | 2013-11-10T18:20:54.000-0800 | 182.236.164.11 -- [10/Nov/2013:18:20:54] "GET /category.screen?categoryid=ACCESSORIES&JSESSIONID=SD6SL8FF10ADFF53101 HTTP 1.1" 200 3920 "http://www.buttercupgames.com/oldlink? | tutorialdata.zip:./www2/access.log | mrobichaud-mbp.sv.splunk.com | 3920 | 182.236.164.11 | GET | http://www.buttercupgames.com/oldlink?itemid=EST-17 |

| | time | raw | source | host | bytes | clientip | method | referer | itemid | referer_itemid |
|---|---|---|---|---|---|---|---|---|---|---|
| 1 | 2013-11-10T18:22:16.000-0800 | 91.205.189.15 -- [10/Nov/2013:18:22:16] "GET /oldlink?itemid=348JSESSIONID=SD6SL7FF7ADFF53113 HTTP 1.1" 200 1665 "http://www.buttercupgames.com/oldlink?itemid=EST-14" "Mozilla/5.0 (Windows NT 6.1: WOW64) AppleWebKit/536.5 (KHTML, like Gecko) Chrome/19.0.1084.46 Safari/536.5" 159 | tutorialdata.zip: ./www2/access.log | mrobichaud-mbp.sv.splunk.com | 1665 | 91.205.189.15 | GET | http://www.buttercupgames.com/oldlink?itemid=EST-14 | 34 | EST-14 |
| 2 | 2013-11-10T18:22:15.000-0800 | 91.205.189.15 -- [10/Nov/2013:18:22:15] "GET /category.screen?categoryid=SHOOTER&JSESSIONID=SD6SL7FF7ADFF53113 HTTP 1.1" 200 1369 "http://www.google.com" "Mozilla/5.0 (Windows NT 6.1: WOW 64) AppleWebKit/536.5 (KHTML, like Gecko) Chrome/19.0.1084.46 Safari/536.5" 779 | tutorialdata.zip: ./www2/access.log | mrobichaud-mbp.sv.splunk.com | 1369 | 91.205.189.15 | GET | http://www.google.com | | |
| 3 | 2013-11-10T18:20:56.000-0800 | 182.236.164.11 -- [10/Nov/2013:18:20:56] "GET /cart.do?action=addtocart&itemid=29&productid=BS-AG-G90&JSESSIONID=SD6SL8FF10ADFF53101 HTTP 1.1" 200 2252 "http://www.buttercupgames.com/oldlink?itemid=EST-15" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip: ./www2/access.log | mrobichaud-mbp.sv.splunk.com | 2252 | 182.236.164.11 | GET | http://www.buttercupgames.com/oldlink?itemid=EST-15 | 29 | EST-15 |
| 4 | 2013-11-10T18:20:55.000-0800 | 182.236.164.11 -- [10/Nov/2013:18:20:55] "POST /oldlink?itemid=EST-18&JSESSIONID=SD6SL8FF10ADFF53101 HTTP 1.1" 408 893 "http://www.buttercupgames.com/product.screen?productid=5F-BV5-G01" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip: ./www2/access.log | mrobichaud-mbp.sv.splunk.com | 893 | 182.236.164.11 | GET | http://www.buttercupgames.com/product.screen?productid=5F-BV5-G01 | | |
| 5 | 2013-11-10T18:20:54.000-0800 | 182.236.164.11 -- [10/Nov/2013:18:20:54] "GET /category.screen?categoryid=ACCESSORIES&JSESSIONID=SD6SL8FF10ADFF53101 HTTP 1.1" 200 3920 "http://www.buttercupgames.com/oldlink?itemid=EST-17 | tutorialdata.zip: ./www2/access.log | mrobichaud-mbp.sv.splunk.com | 3920 | 182.236.164.11 | GET | http://www.buttercupgames.com/oldlink?itemid=EST-17 | | EST-17 |

FIG. 8G

| | Title | Actions | Owner | Tags |
|---|---|---|---|---|
| | | 1112 → (filter) | | (mine) (data set) (lookup) (accelerated) |
| ˅ | All Data ← 1104a | 1108a → Edit \| Use as Input ← 1106a | Admin | ← 1110 1102a |
| ˅ | Errors in the last 24 hours<br>Input *Mobile Payments*<br>Creator *Created by Search*<br>*search*<br>App<br>Schedule *Not scheduled  Edit*<br>Acceleration *Enabled  Edit*<br>Permissions *Shared in App. Owned by nobody.  Edit* | Edit \| Use as Input | | (mine) (accelerated) |
| ˃ | Page Names | Edit \| Use as Input | Admin | (lookup) |
| ˃ | Web Logs ← 1104b | 1108b → Edit \| Use as Input ← 1106b | User2 | (data set) 1102b |
| ˃ | MyReport ← 1104c | 1108c → Edit \| Use as Input ← 1106c | User1 | |
| ˃ | SupplementalData | 1108d → Edit \| Use as Input ← 1106d | Admin | 1102c |
| | | 1109a ⎫ Edit in Table<br>1109b ⎭ Edit in Search<br>Edit Permissions<br>1120 | | |
| ˃ | Zeta License Usage | ⎱t \| Use as Input   Extend in Table<br>        Extend in Search 1107b 1107a | Admin | |
| ˃ | FilteredTable | Edit \| Use as Input | Admin | 1102d |
| ˃ | Zeta License Usage | Edit \| Use as Input | User1 | |

| Search | Tables | Pivot | Reports | Alerts | Dashboards | | | | | Search & Reporting |
|---|---|---|---|---|---|---|---|---|---|---|

New Table

| Commands |
|---|
| from FilteredTable |
| fields _time, activity, salesforce_id,... |
| eval "date"=strftime(_time, "%m-%d-... |
| eval activity=replace(activity, "Spl... ✕ |
| + Add Columns |

| » | Previewing first 100 results of All time ∨ | | Refresh | | | | Save |
|---|---|---|---|---|---|---|---|
| ≡ | * | _time | ⊙ | date | a | activity | Platform a | salesforce_id |
| | 1 | 2015-04-20T17:59:12.553+00:00 | | 04-20-2015 | Enterprise | | 003400000I01dhuC2AAI |
| | 2 | 2015-04-20T17:56:59.774+00:00 | | 04-20-2015 | Enterprise | | 00Q40000016DoPEEA0 |
| | 3 | 2015-04-20T17:53:58.224+00:00 | | 04-20-2015 | Universal Fa | Equals... | 003400000SbrT4AAJ |
| | 4 | 2015-04-20T17:53:51.592+00:00 | | 04-20-2015 | Universal Fa | Not equals... | 003400000SbrT4AAJ |
| | 5 | 2015-04-20T17:50:34.810+00:00 | | 04-20-2015 | Splunk Light | Cut & Move | 00Q400000MRvd8EAD |
| | 6 | 2015-04-20T17:47:42.696+00:00 | | 04-20-2015 | Enterprise | Sort A to Z | 003400000I01dhuC2AAI |
| | 7 | 2015-04-20T17:43:58.228+00:00 | | 04-20-2015 | Enterprise | Sort Z to A | 003400000xRdyjAAC |
| | 8 | 2015-04-20T17:43:27.010+00:00 | | 04-20-2015 | Enterprise | New name Apply | 003400000xRdyjAAC |
| | 9 | 2015-04-20T17:43:17.461+00:00 | | 04-20-2015 | Splunk Light | Remove column | 00Q33000016kFYOEA2 |
| | 10 | 2015-04-20T17:42:46.156+00:00 | | 04-20-2015 | Splunk Light | Remove empty cells | 00Q33000016kFYuEAE |
| | 11 | 2015-04-20T17:37:20.848+00:00 | | 04-20-2015 | Universal Fa | Remove duplicate values | 00Q40000016jóm0EAA |
| | 12 | 2015-04-20T17:30:08.091+00:00 | | 04-20-2015 | Enterprise | Eval... | 00Q400000W2bC3EAJ |
| | 13 | 2015-04-20T17:28:25.854+00:00 | | 04-20-2015 | Enterprise | Transact... | 00Q33000016kFjIEAE |
| | 14 | 2015-04-20T17:26:48.216+00:00 | | 04-20-2015 | Enterprise | Rename values... | 00Q33000016kFaeEAE |
| | 15 | 2015-04-20T17:25:11.290+00:00 | | 04-20-2015 | Splunk Light | | Windows | 00Q40000000LrZUHEA3 |
| | 16 | 2015-04-20T17:20:27.885+00:00 | | 04-20-2015 | Enterprise | | Windows | 00Q40000000gJw6CEAS |
| | 17 | 2015-04-20T17:20:24.443+00:00 | | 04-20-2015 | Universal Forwarder | | Windows | 003400000i8895AAA |
| | 18 | 2015-04-20T17:20:18.737+00:00 | | 04-20-2015 | Enterprise | | Macos | 00Q33000016kFaZEAU |
| | 19 | 2015-04-20T17:18.12.003+00:00 | | 04-20-2015 | Enterprise | | Macos | 00Q33000016kFaeEAE |
| | 20 | 2015-04-20T17:15.30.876+00:00 | | 04-20-2015 | Enterprise | | Linux | 00Q40000000ywhVvEAI |

| Search Tables Pivot Reports Alerts Dashboards | | | | | |
|---|---|---|---|---|---|
| New Table | | | | | Search & Reporting Save |

| Commands | rename | | | | | | |
|---|---|---|---|---|---|---|---|
| from FilteredTable | Apply | | | | | | |
| fields_time, activity, salesforce_id, ... | | | | | | | |
| eval "date"=strftime(_time, "%m-%d-... | activity | | | | | | |
| eval "activity"=case(activity=="Do... | productDownloaded | | | | | | |
| rename activity as productDownload... ✕ | | | | | | | |
| + Add Columns | | | | | | | |

1226 ↗ 1215

1205

| Previewing first 100 results of All time ∨ | | | Refresh | | | |
|---|---|---|---|---|---|---|
| * | _time | ⓘ | date | *a* productDownloaded | *a* Platform *a* | salesforce_id |
| 1 | 2015-04-20T17:59:12.553+00:00 | | 04-20-2015 | Enterprise | Linux | 0034000001dJhuC2AAI |
| 2 | 2015-04-20T17:56:59.774+00:00 | | 04-20-2015 | Enterprise | Linux | 00Q4000001G0oPEEA0 |
| 3 | 2015-04-20T17:53:58.224+00:00 | | 04-20-2015 | Universal Forwarder | Linux | 0034000005brT4AAI |
| 4 | 2015-04-20T17:53:51.592+00:00 | | 04-20-2015 | Universal Forwarder | Linux | 0034000005brT4AAJ |
| 5 | 2015-04-20T17:50:34.810+00:00 | | 04-20-2015 | Splunk Light | Windows | 00Q4000000MRvd8EAD |
| 6 | 2015-04-20T17:47:42.696+00:00 | | 04-20-2015 | Enterprise | Linux | 0034000001dJhuC2AAI |
| 7 | 2015-04-20T17:43:58.228+00:00 | | 04-20-2015 | Enterprise | Windows | 0034000000xRdyjAAC |
| 8 | 2015-04-20T17:43:27.010+00:00 | | 04-20-2015 | Enterprise | Windows | 0034000000xHdyjAAC |
| 9 | 2015-04-20T17:43:17.461+00:00 | | 04-20-2015 | Splunk Light | Windows | 00Q33000016kFYOEA2 |
| 10 | 2015-04-20T17:42:46.156+00:00 | | 04-20-2015 | Splunk Light | Windows | 00Q33000016kFvItEAE |
| 11 | 2015-04-20T17:37:20.848+00:00 | | 04-20-2015 | Universal Forwarder | Windows | 00Q4000001616m0EAA |
| 12 | 2015-04-20T17:30:08.091+00:00 | | 04-20-2015 | Enterprise | Macos | 00Q4000000W2bC3EAJ |
| 13 | 2015-04-20T17:28:25.854+00:00 | | 04-20-2015 | Enterprise | Windows | 00Q33000016kFjEAE |
| 14 | 2015-04-20T17:26:48.216+00:00 | | 04-20-2015 | Enterprise | Macos | 00Q33000016kFaeEAE |
| 15 | 2015-04-20T17:25:11.290+00:00 | | 04-20-2015 | Splunk Light | Windows | 00Q4000000Lr2UHEA3 |
| 16 | 2015-04-20T17:20:27.885+00:00 | | 04-20-2015 | Enterprise | Windows | 00Q4000000gJw6CEAS |
| 17 | 2015-04-20T17:20:24.443+00:00 | | 04-20-2015 | Universal Forwarder | Windows | 0034000001dI89SAAA |
| 18 | 2015-04-20T17:20:18.737+00:00 | | 04-20-2015 | Enterprise | Macos | 00Q33000016kFaZEAU |
| 19 | 2015-04-20T17:18:12.093+00:00 | | 04-20-2015 | Enterprise | Macos | 00Q33000016kFaeEAE |
| 20 | 2015-04-20T17:15:30.876+00:00 | | 04-20-2015 | Enterprise | Linux | 00Q4000000wnVvEAI |

Edit Permissions

Pipeline  SupplementalData

Owner  Admin

App  search

Display For  | Owner | App |

Run As  | Owner | User |  ← 1708
1706    Learn More

| | Read | Write |
|---|---|---|
| Everyone | ✓ | ☐ |
| admin | ☐ | ✓ |
| can_delete | ☐ | ☐ |
| power | ☐ ← 1710 | ☐ |
| splunk-system-role | ☐ | ☐ |
| user | | |

All apps

Cancel    Save

| time | date | AccountName | AccountRegion | AccountSubRegion | AccountTheater | |
|---|---|---|---|---|---|---|
| 1 2015-04-16T10:23:26.536-07:00 | 04-16-2015 | Account ABC | Major Accounts | East | AMER | |
| 2 2015-04-16T23:18:02.743-07:00 | 04-16-2015 | Account DEF | North Asia | Greater China | APAC | |
| 3 2015-04-16T23:15:26.151-07:00 | 04-16-2015 | Account GHI | North | Nordics | EMEA | |
| 4 2015-04-16T22:38:31.891-07:00 | 04-13-2015 | Account JKL | Territory | Central | AMER | |
| 5 2015-04-08T15:42:06.895-07:00 | 04-08-2015 | Account MNO | LATAM | MCA | AMER | |
| 6 2015-04-16T18:08:17.107-07:00 | 04-16-2015 | Account PQR | Major Accounts | West | AMER | |
| 7 2015-04-01T06:24:27.162-07:00 | 04-01-2015 | Account STU | North | Benelux | EMEA | |

Commands:
- source types product_downloads
- fields _time, activity, Platform, sales...
- eval "date"=strftime(_time,"%m-%d-%...
- rename activity as productDownloa...
- eval "productDownloaded" = case(pr...
- lookup salesforce salesforce_id OU...
- fields - salesforce_id
- where AccountName != ""
- sort AccountName
- search AccountName != "Splunk Inc"
- dedup AccountName, productDownl... ×
- + Add Columns

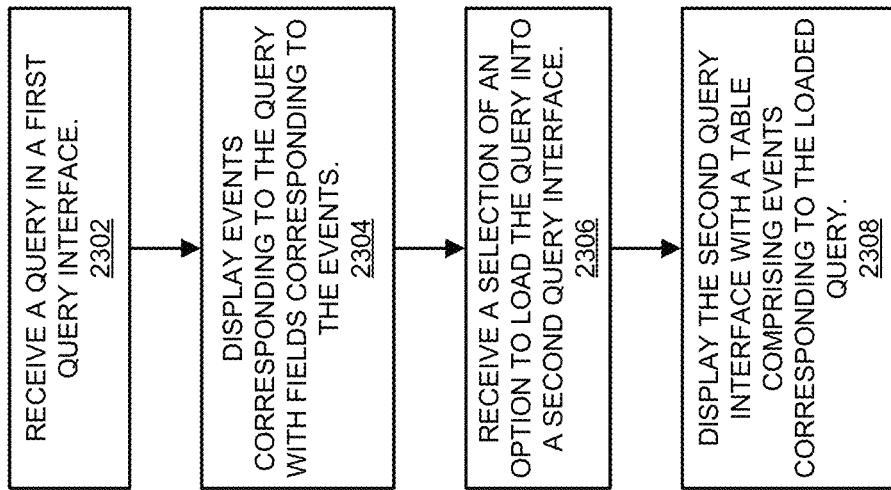
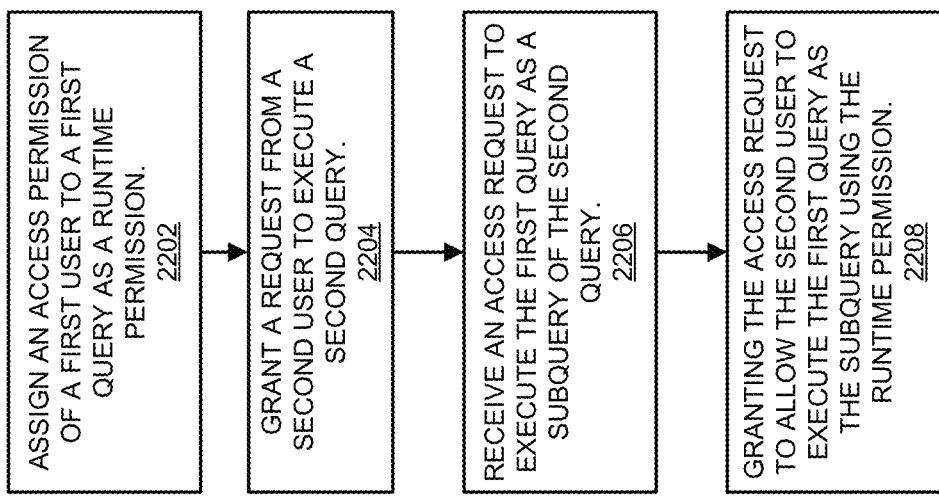

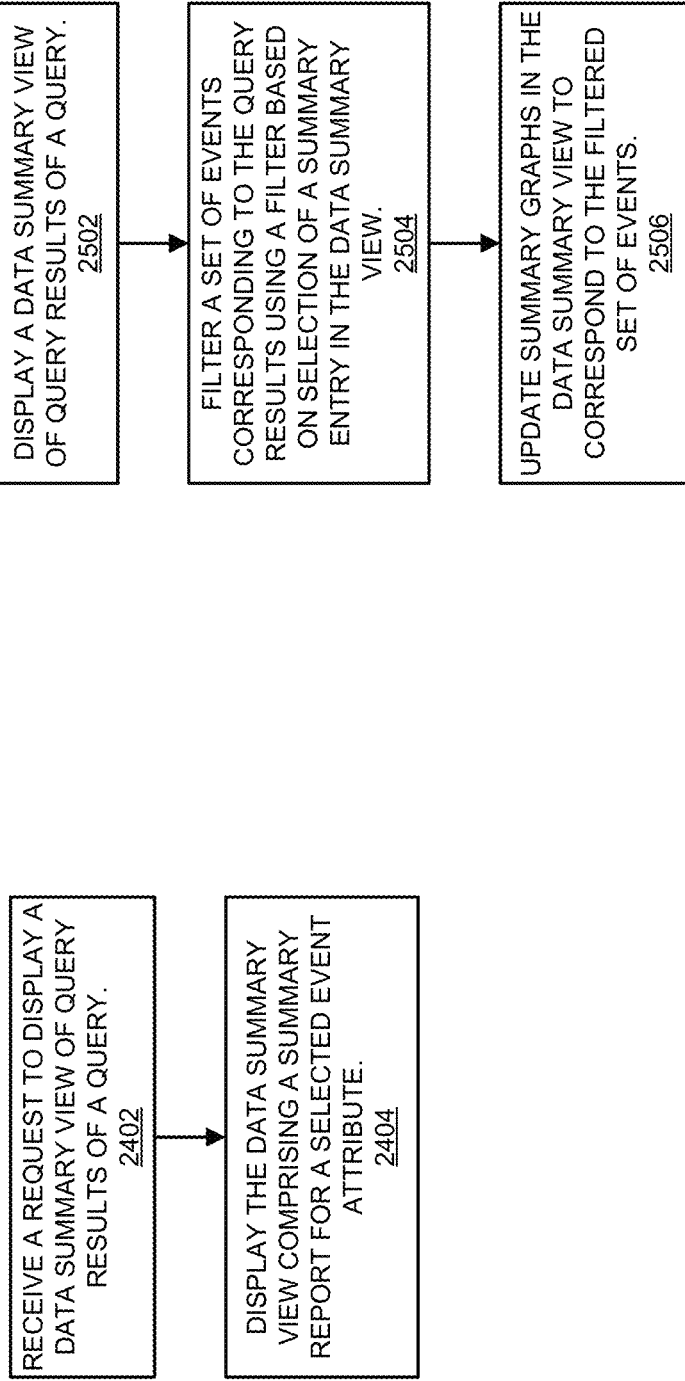

SUMMARIZED VIEW OF SEARCH RESULTS WITH A PANEL IN EACH COLUMN

CROSS-REFERENCE TO RELATED APPLICATIONS

This application is a Continuation of U.S. patent application Ser. No. 16/260,985, filed on Jan. 29, 2019, which itself is a Continuation of U.S. Pat. No. 10,204,093 filed Jul. 31, 2015, which itself is a Continuation-in-part of U.S. Pat. No. 10,061,842 filed Jan. 30, 2015. The contents of the foregoing are incorporated herein by reference in their entirety.

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

SUMMARY

Embodiments of the present invention are directed to a data summary view with filtering.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 8A illustrates a search screen in accordance with the disclosed embodiments.

FIG. 8B illustrates a search screen in accordance with the disclosed embodiments.

FIG. 8D illustrates a search screen in accordance with the disclosed embodiments.

FIG. 8E illustrates a search screen in accordance with the disclosed embodiments.

FIG. 8F illustrates a search screen in accordance with the disclosed embodiments.

FIG. 8G illustrates events in a table format including fields extracted from the events.

FIG. 11 illustrates a selection interface in accordance with the disclosed embodiments.

FIG. 12A illustrates a search screen in accordance with the disclosed embodiments.

FIG. 12B illustrates a search screen in accordance with the disclosed embodiments.

FIG. 12C illustrates a search screen in accordance with the disclosed embodiments.

FIG. 12D illustrates a search screen in accordance with the disclosed embodiments.

FIG. 12E illustrates a search screen in accordance with the disclosed embodiments.

FIG. 12G illustrates a search screen in accordance with the disclosed embodiments.

Figure 13:
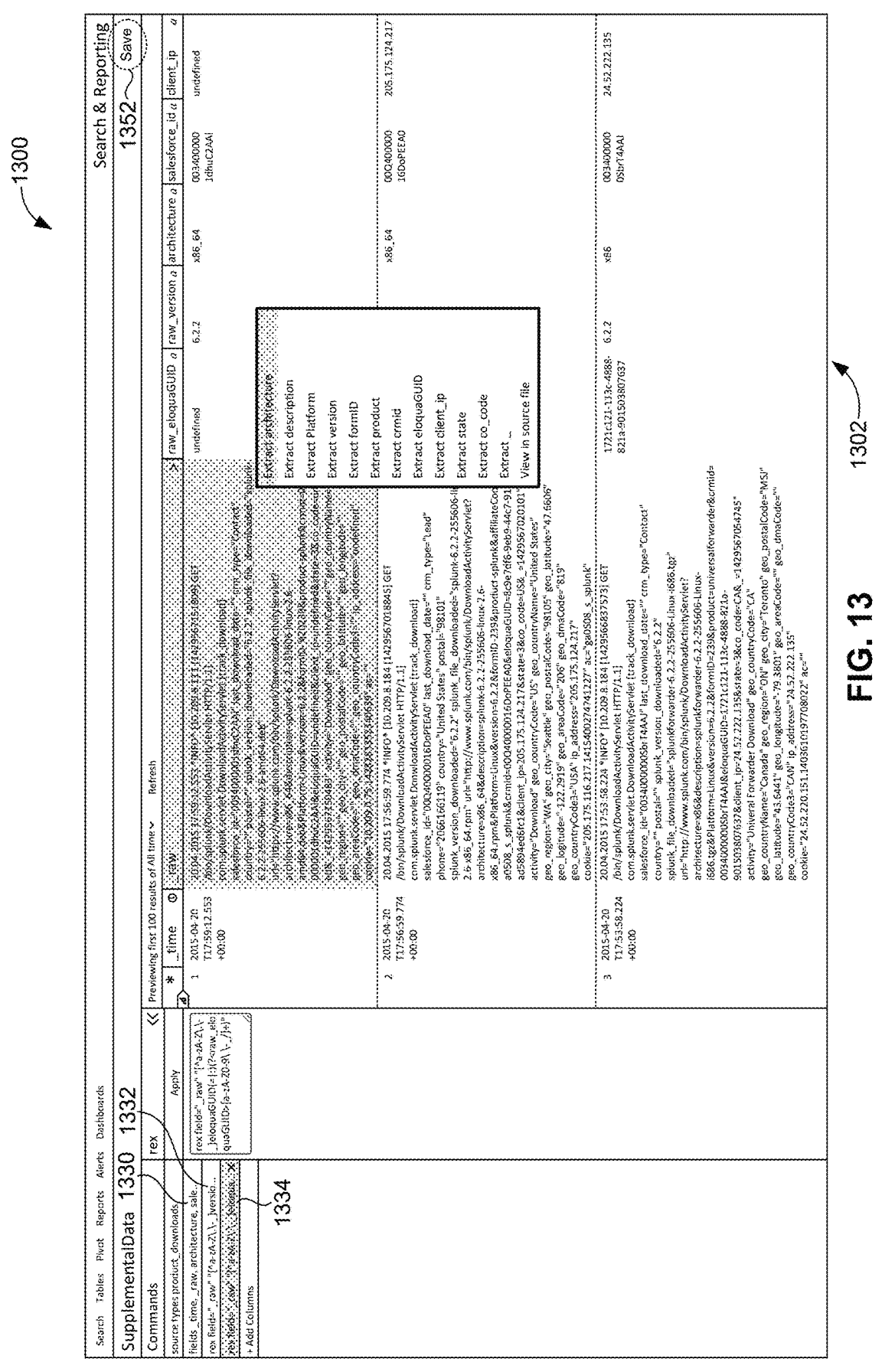

FIG. 13 illustrates a search screen in accordance with the disclosed embodiments.

FIG. 14A illustrates a search screen in accordance with the disclosed embodiments.

FIG. 14B illustrates a search screen in accordance with the disclosed embodiments.

FIG. 15 illustrates a search screen in accordance with the disclosed embodiments.

FIG. 17 illustrates a permissions form in accordance with the disclosed embodiments.

FIG. 19A illustrates a search screen in accordance with the disclosed embodiments.

FIG. 22 presents a flowchart illustrating utilizing runtime permissions for queries in accordance with the disclosed embodiments.

FIG. 23 presents a flowchart illustrating integrating query interfaces in accordance with the disclosed embodiments.

FIG. 24 presents a flowchart illustrating utilizing a data summary view in accordance with the disclosed embodiments.

FIG. 25 presents a flowchart illustrating utilizing a data summary view with filtering in accordance with the disclosed embodiments.

DETAILED DESCRIPTION

Figure 1:
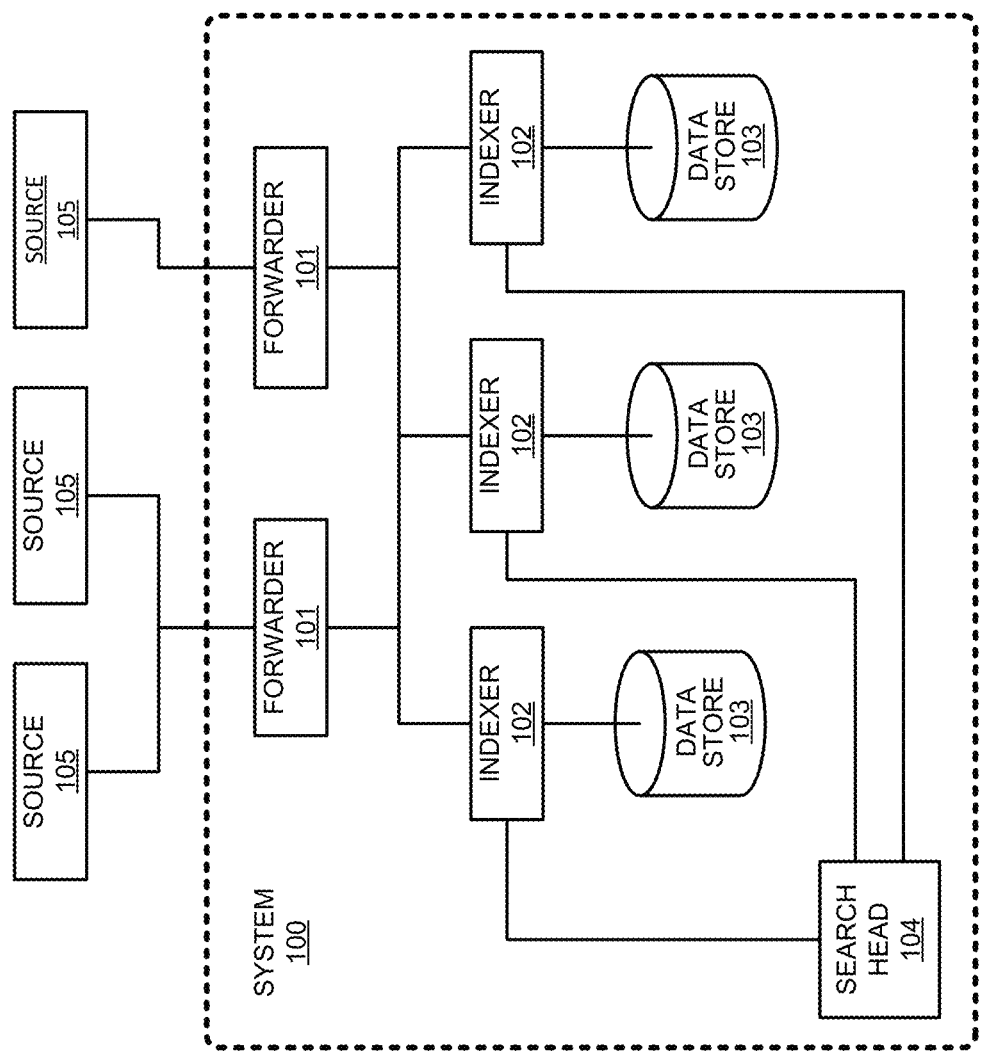
FIG. 1 presents a block diagram of an event-processing system in accordance with the disclosed embodiments.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
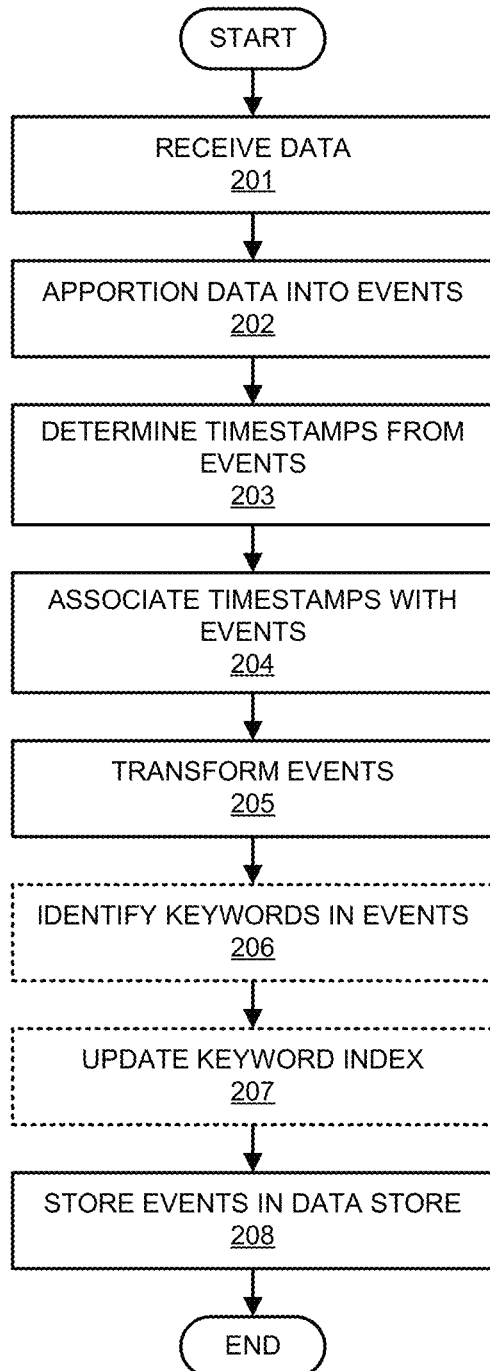
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored in flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
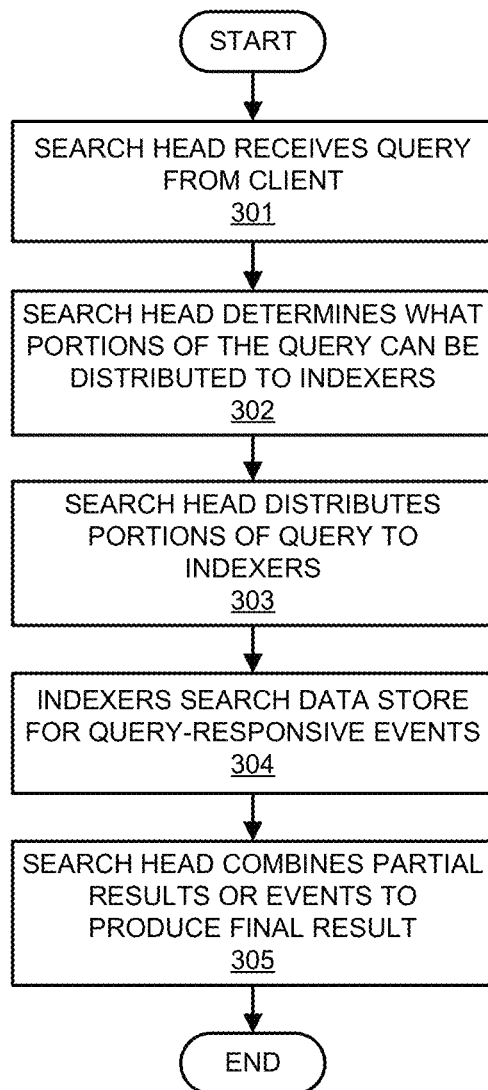
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
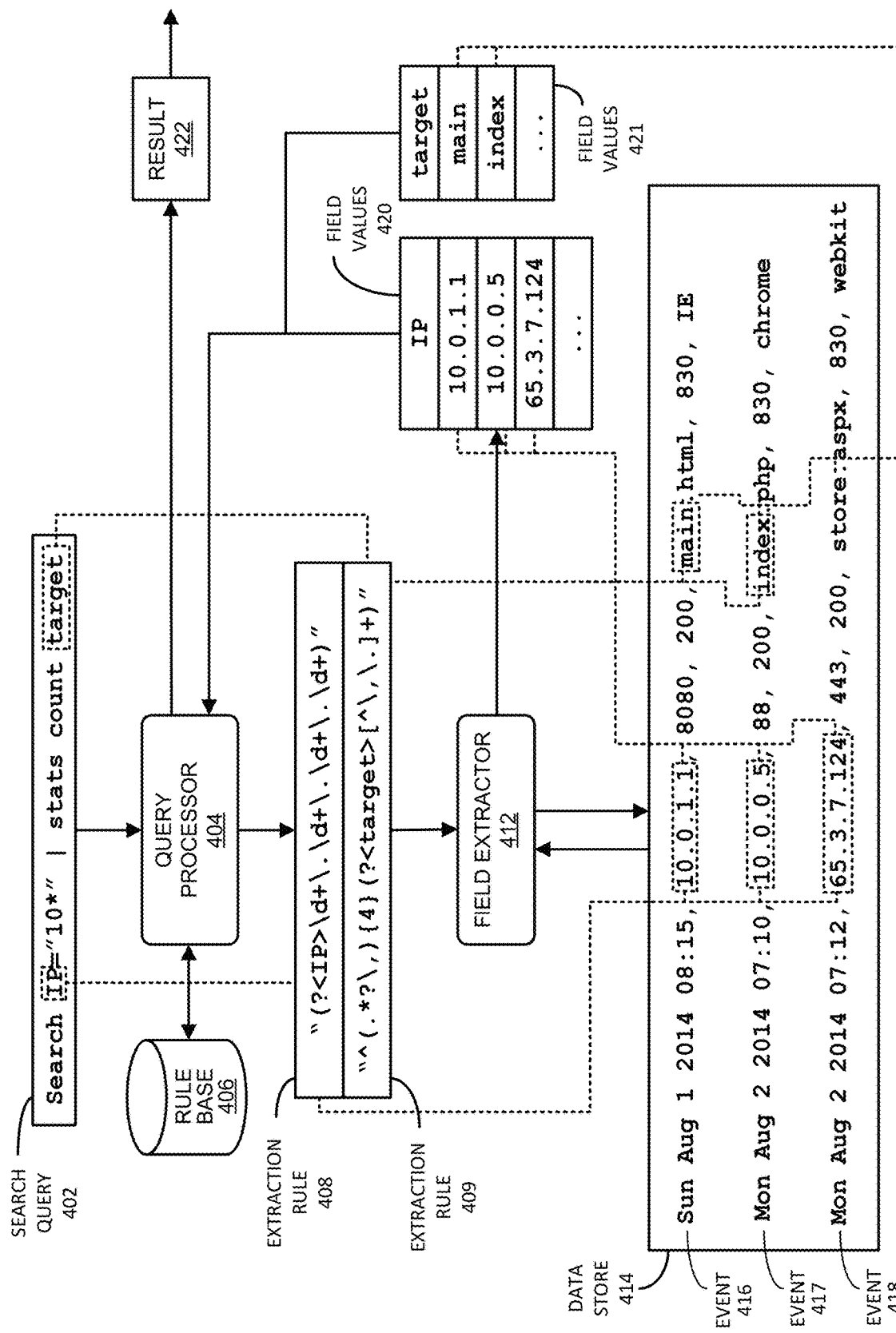
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
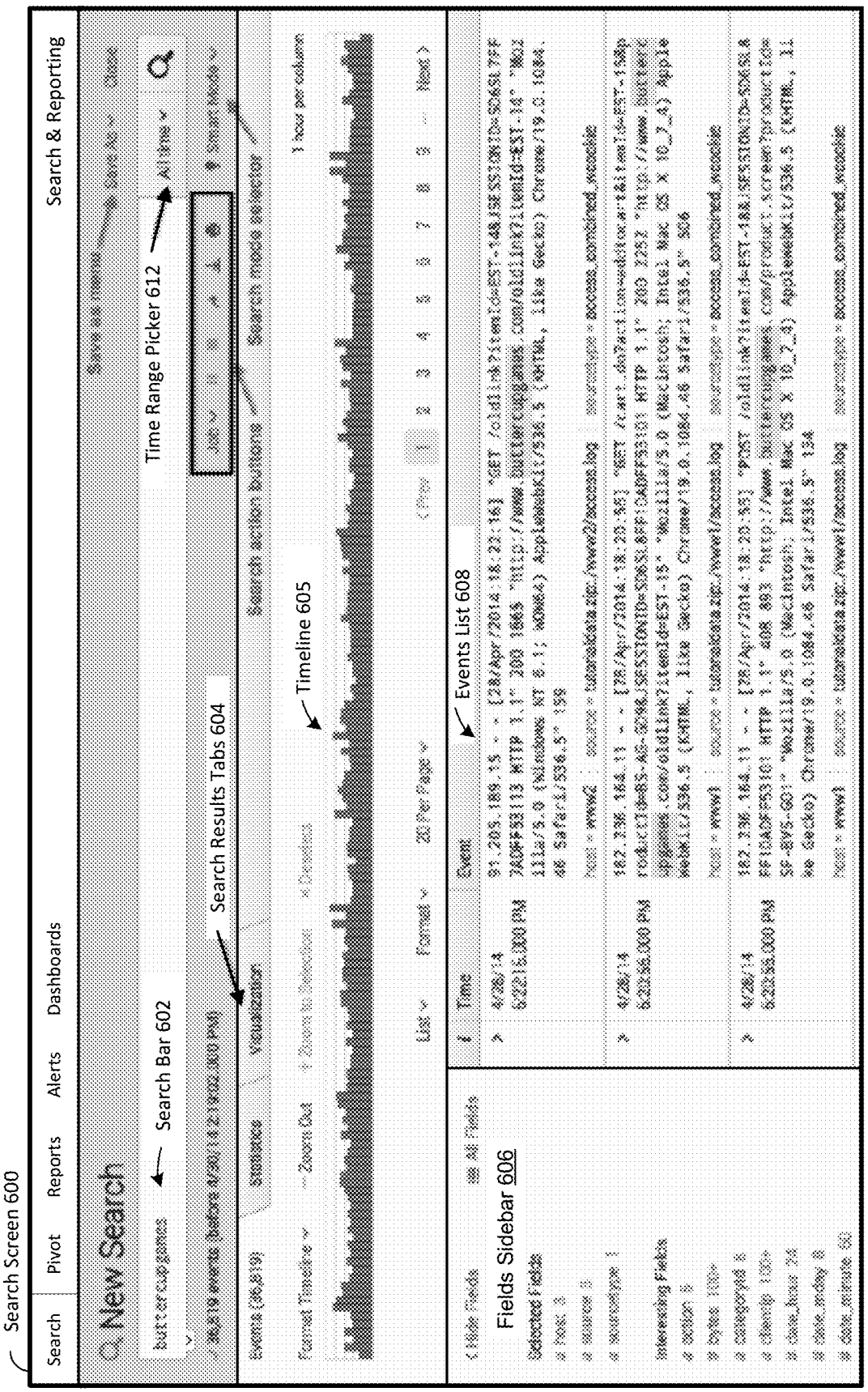
FIG. 6A illustrates a search screen in accordance with the disclosed embodiments.
Figure 6B:
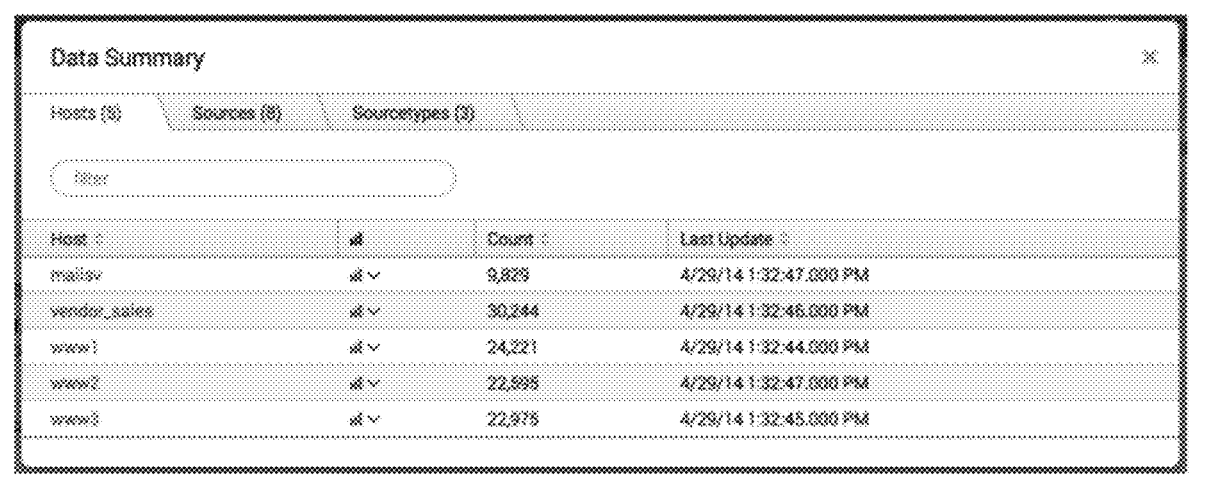

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 include: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can be split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (Me process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls, and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
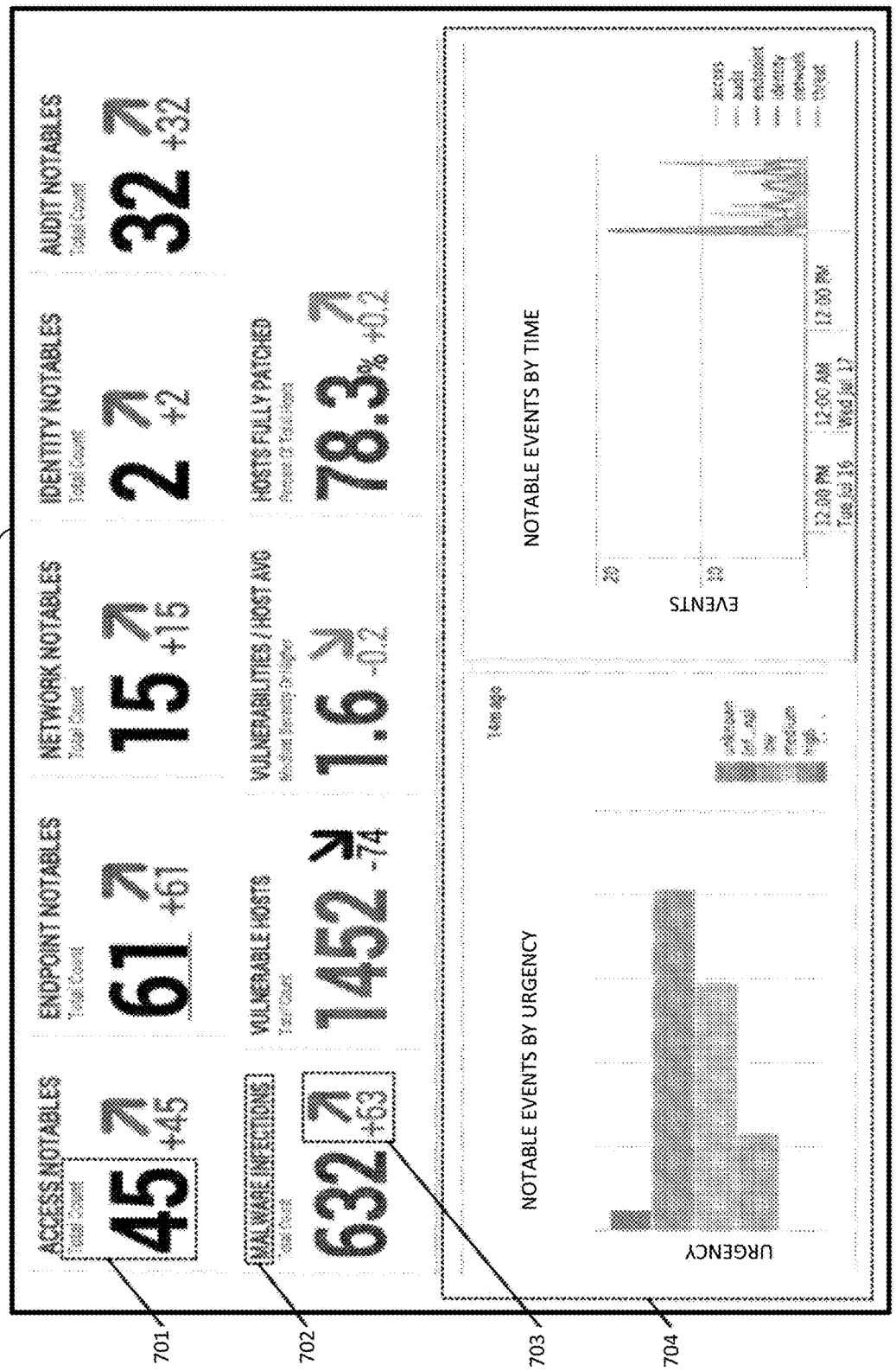
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
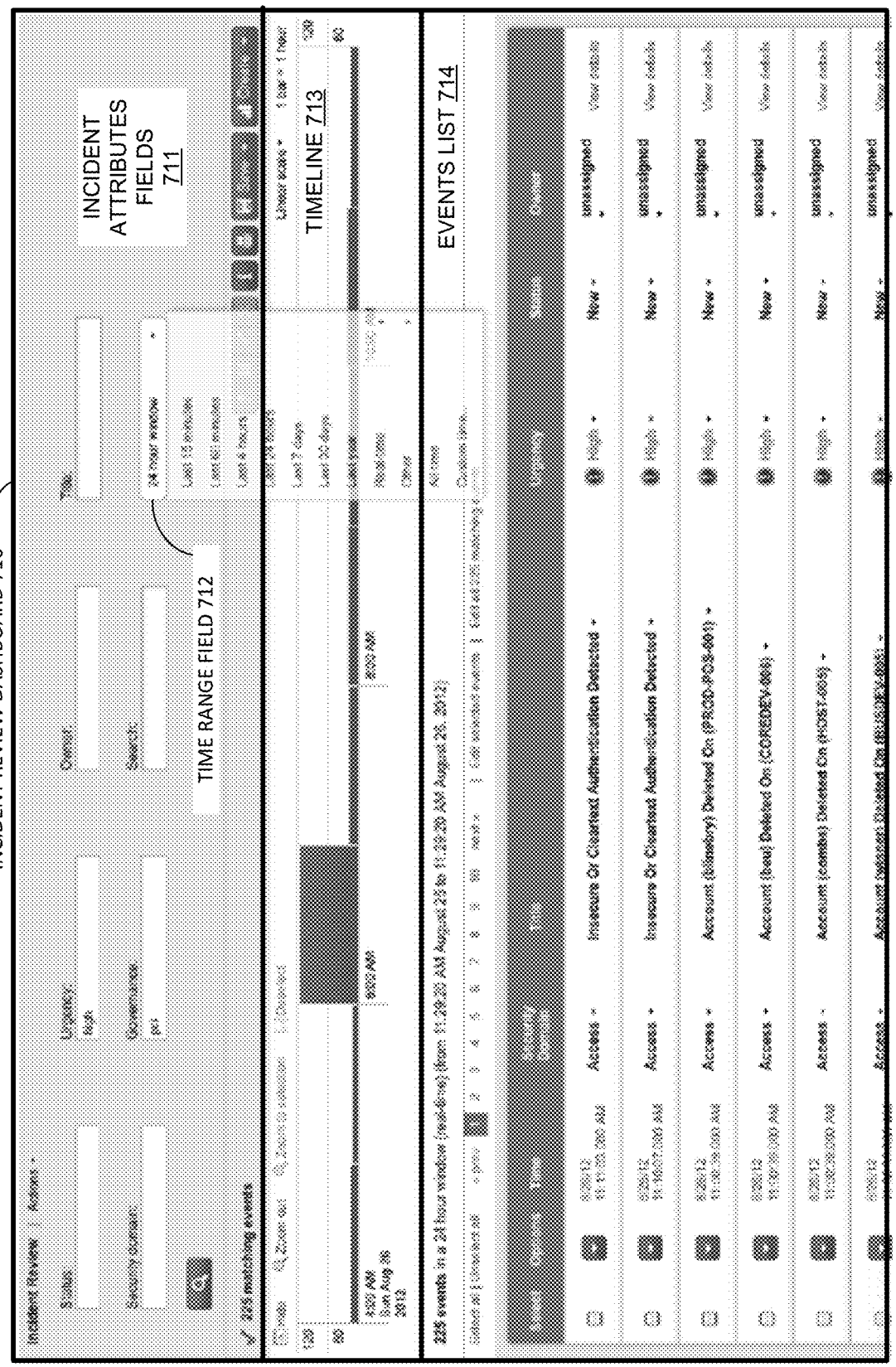
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware-.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
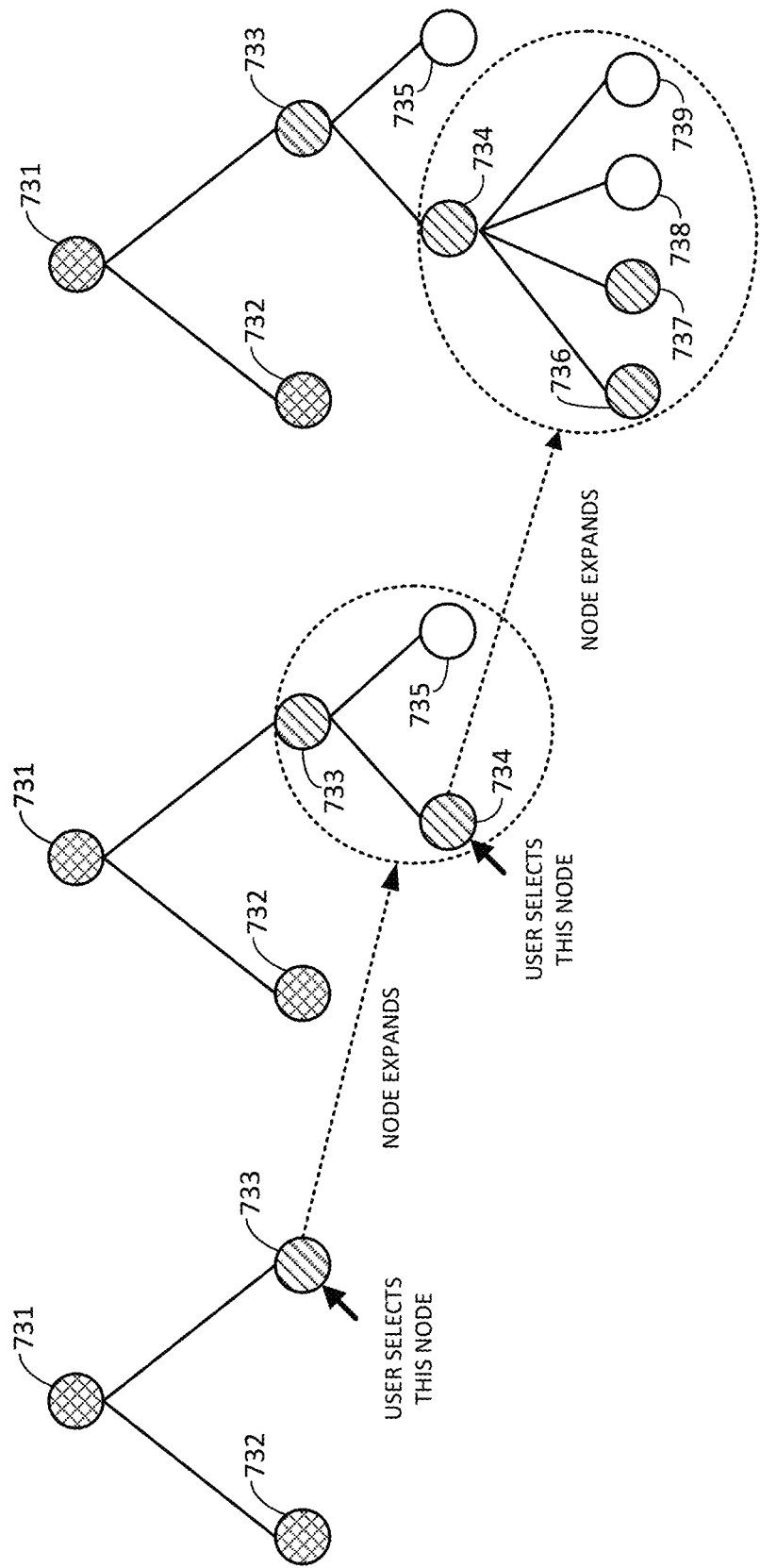
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
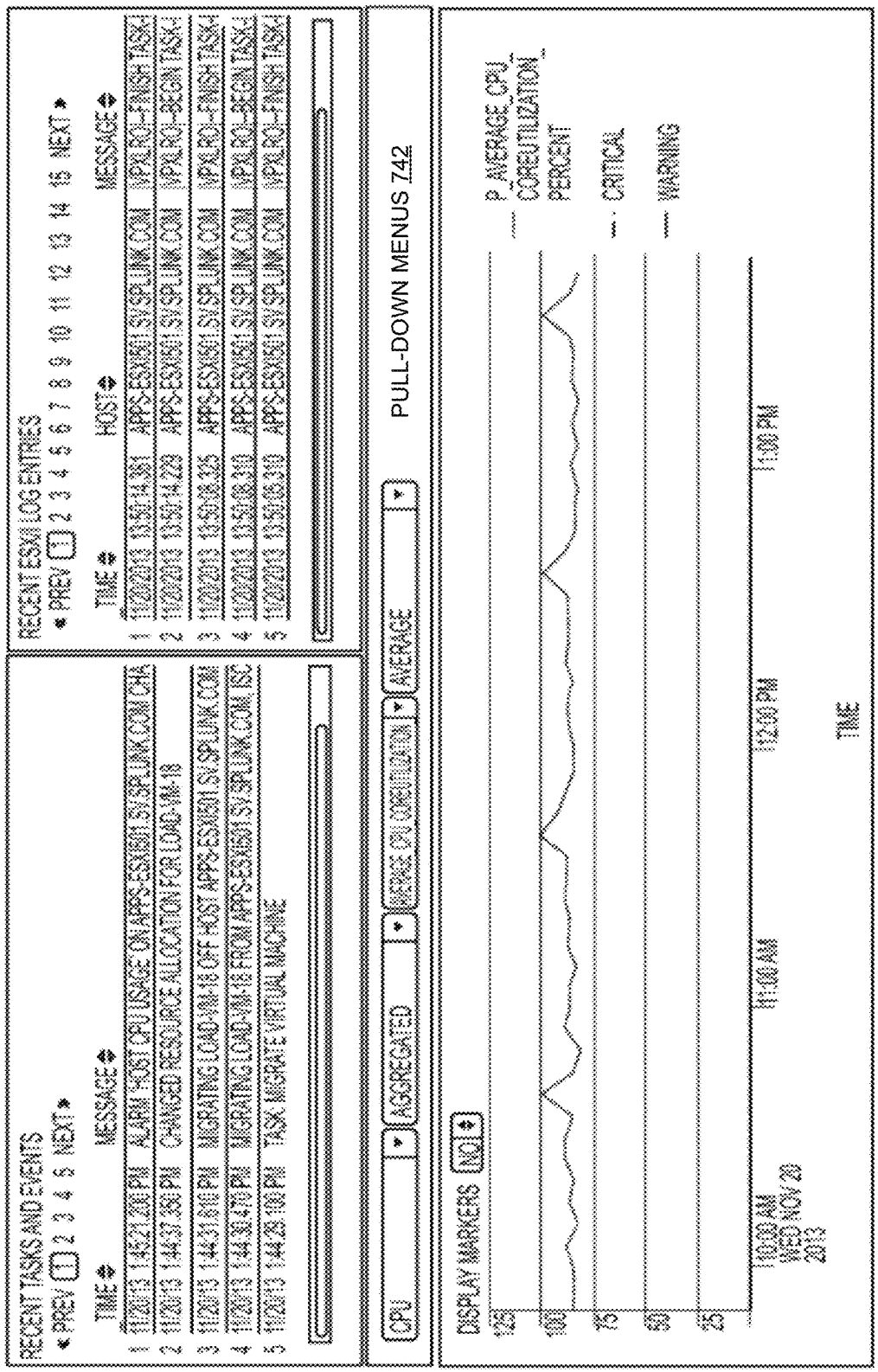
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data, and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.0 ADDITIONAL EXEMPLARY SEARCH SCREEN

FIG. 8A illustrates exemplary search screen 800 in accordance with some implementations of the present disclosure. Search screen 800 may be utilized as part of a search interface to display one or more events returned as part of a search result set based on a search query. Display of an event may include display of one or more event attributes of the event, examples of which include extracted fields, metadata, event raw data, and/or other types of data items assigned to the event. Search screen 800 may also be utilized as part of a search interface that allows a user to modify the search query. Some exemplary options for modifying the search query include any combination of deleting commands from the search query, adding commands to the search query, reordering one or more commands in the search query, and modifying variables, parameters, arguments, and/or other properties of commands in the search query.

Search screen 800 may also be utilized to update the search result set to correspond to the modified search query and to update the events that are displayed in search screen 800 to correspond to the updated search result set. In some cases, based on a search query being modified, the search query could be completely re-executed to retrieve new search results and generate the updated search result set. In other cases, the search query may only be partially executed. For example, in implementations where a pipelined search language, such as SPL, is employed for search queries, additional commands that are added to a search query may be applied to at least some previous search results. These and other variations are possible for updating the search result set to correspond to a search query.

By interacting with search screen 800 to create and/or modify search queries, a user may utilize the search interface to filter, sort, clean, enrich, analyze, report on, and/or otherwise carryout functionality provided for by commands in search queries. Furthermore, as the user generates modified search queries, the search result set can be updated, with events displayed in search screen 800 being updated to reflect the modifications. Utilizing this approach, a user may iteratively modify a search query and view the impact of the modification via updated search results. This approach can be employed to enable users to effectively and efficiently generate queries that return expected and desired results, even without extensive knowledge of the underlying commands and/or search language employed by the queries.

2.1 Exemplary Table Format

In various implementations, one or more events can be displayed in a table format, such as table format 802 in search screen 800. The table format can be employed in various interfaces for interacting with displayed events in various ways and its use is not limited to search interfaces or search screens. Events can be used to populate the table format, and may be search results, such as in search screen 800, but could more generally be any type of events. Furthermore while in search screen 800, events are displayed via table format 802, other formats are possible in various implementations contemplated herein.

Table format 802 comprises one or more columns, such as columns 804*a*, 804*b*, 804*c*, and 804*d* and one or more rows, such as rows 806*a*, 806*b*, 806*c*, 806*d*, and 806*e*. Table format 802 can include additional rows and/or columns, not shown in FIG. 8A, which may optionally be viewed by scrolling search screen 800, or by other suitable means. The scrolling may reveal additional events and/or additional event attributes on search screen 800.

In the example shown, each row corresponds to an event. By way of example, search screen 800 is shown as displaying events 1, 2, 3, 4, and 5, which are each search results of a search result set that can include any number of additional results that are not shown. A search results set may generally include any number of search results. Each column corresponds to an event attribute, such as an extracted field, metadata about events (e.g., a default field), or event raw data. Each event attribute is assigned a respective attribute label, which can be utilized to represent the corresponding attribute in the table format. For example, row 806*a* corresponds to event 1 and column 804*a* corresponds to an event attribute of event 1 having an attribute label of _time, comprising a timestamp data item. Other attribute labels shown in FIG. 8A include _raw, corresponding to event raw data, source and host corresponding to metadata, and bytes, clientip, method, and referer, corresponding to extracted fields.

The rows in table format 802 form cells with the columns, and each cell comprises a data item of an event attribute of a corresponding column. For example, in search screen 800, the event attribute having attribute label _time has a value of 2013-11-10T18:22:16.000-0800 for event 1, 2013-11-10T18:22:15.000-0800 for event 2, and so on. Data items of events are shown in FIG. 8A by a textual representation of their value. Although not the case in the table formats shown herein, it is possible that the underlying value could vary from the textual representation. As an example, numeric data items could be textually represented in rounded form. Furthermore, some of the data items could be represented by means other than a textual representation.

Data items in a column are assigned to an event attribute forming sets of attribute-data item pairs, with each data item corresponding to a respective event for that event attribute. Search screen 800 shows data items of multiple events for each event attribute. The displayed event attributes correspond to the search result set, but other event attributes corresponding to the search result set could potentially be hidden from view or not included in a column.

In the present example, each row in table format 802 corresponds to a respective event and each column corresponds to a respective event attribute of multiple events, with each cell comprising one or more data items of the respective event attribute of the respective event. In some cases, columns of the table format may be reordered in a displayed search interface based on a user interaction with the table format. For example, a user may select a column to move (e.g., using a mouse) and drag the selected column to a new position in the table format.

A search query corresponding to the search result set that is utilized to populate the cells of table format 802 can have its constituent commands be at least partially represented in search screen 800. One such approach is illustrated by command entry list 808 in search screen 800. Exemplary command entry lists will later be described in additional detail, and for purposes of the present disclosure, can be employed with other types of interfaces, which do not necessarily include events displayed in a table format.

Command entry list 808 corresponds to at least a partial representation of the commands of the search query and comprises one or more command entries. Each command entry is respectively representing one or more commands of the search query. Furthermore, the list of search command entries is displayed in a sequence corresponding to a sequence of the search commands within the search query. Another approach to at least partially representing search commands of the search query in search screen 800 comprises utilizing a search bar, in addition to, or instead of a command entry list. The search bar can accept user input in the form of textual input to a search string that corresponds to the search query.

2.2 Exemplary Interactions with a Table Format

In some implementations, a user can interact with one or more events of a set of events (e.g., a search result set) that are used to populate a table format by interacting with the table format. For example, a user can interact with table format 802, which is populated with at least some data items from events that correspond to the search result set.

In some respects, a user can make a selection of one or more portions of the table format. Based on the selection, the system causes for display one or more options (e.g., a list of options) corresponding to the selected one or more portions. Based on a user selecting one of the displayed options, operations corresponding to the displayed option can be carried out by the system.

In implementations where the table format is part of a search system, the interactions can be made to create and/or modify search queries. In some approaches, a user makes a selection of one or more portions of the table format. Based on the selection, the search system causes for display one or more options (e.g., a list of options) corresponding to the selection. The search system can cause one or more commands to be added to a search query that corresponds to the set of events used to populate the table format, based on a user selecting one of the options from the list of options. The one or more commands that are added to the search query can be based on (e.g., generated based on) at least the option that is selected by the user, and potentially other factors, such as one or more data items and/or one or more event attributes in the selected one or more portions of the table format.

Examples of selectable portions of a table format include selectable rows, columns, cells, and text, which are described in additional detail below. Depending on the implementation employed, any combination of these table elements may or may not be selectable. As an example, in some implementations, one or more cells may be selectable without necessarily requiring other portions of the table format to be selectable (i.e., only cells could be selectable). The same is true for other types of table elements, such as columns, and text. Furthermore, in some cases portions of the table format are individually selectable (e.g., individual cells or individual columns could be selected). In addition, or instead, portions may be selectable in groups (e.g., multiple cells or multiple columns could be selected).

Figure 8B:
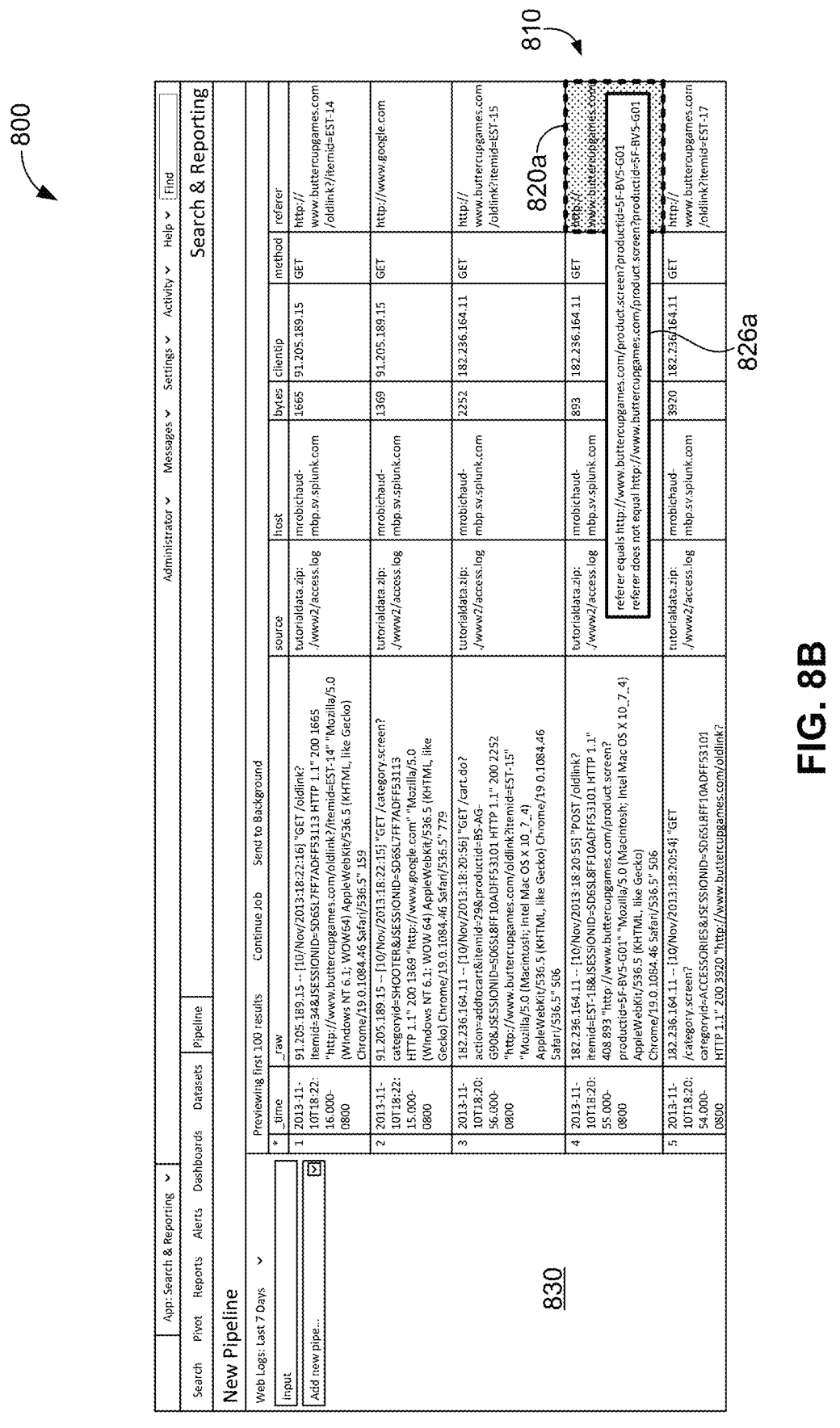
Figure 8C:
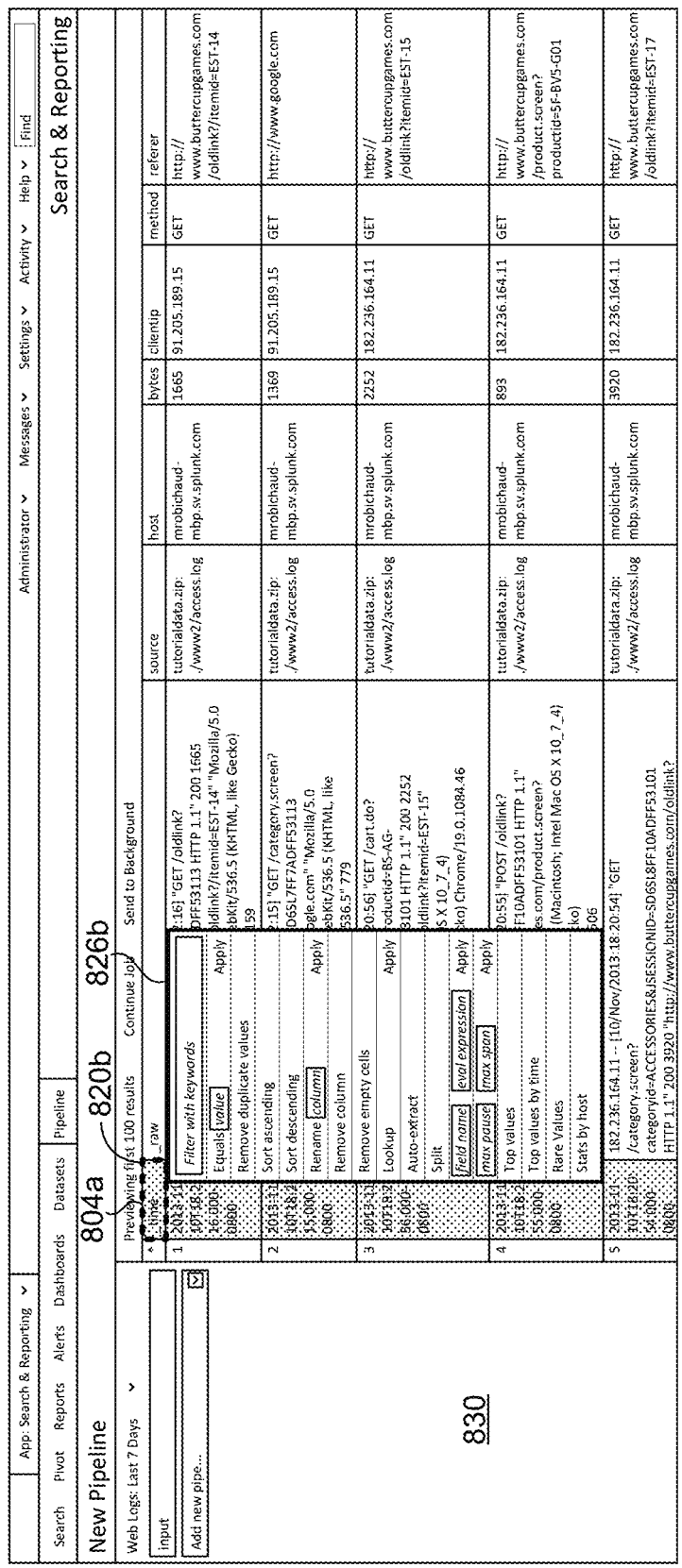
FIG. 8C illustrates a search screen in accordance with the disclosed embodiments.
Figure 8D:
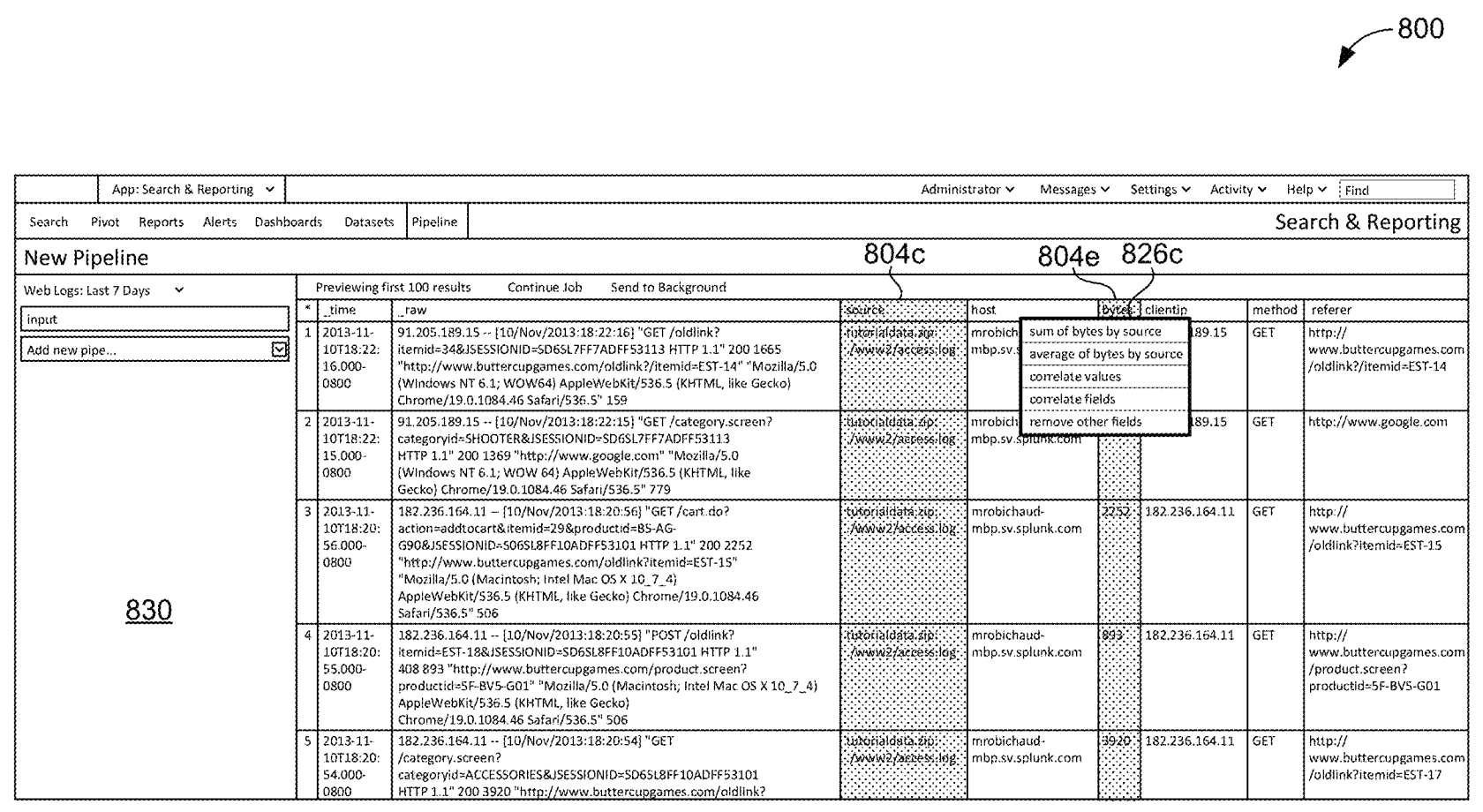
Figure 8E:
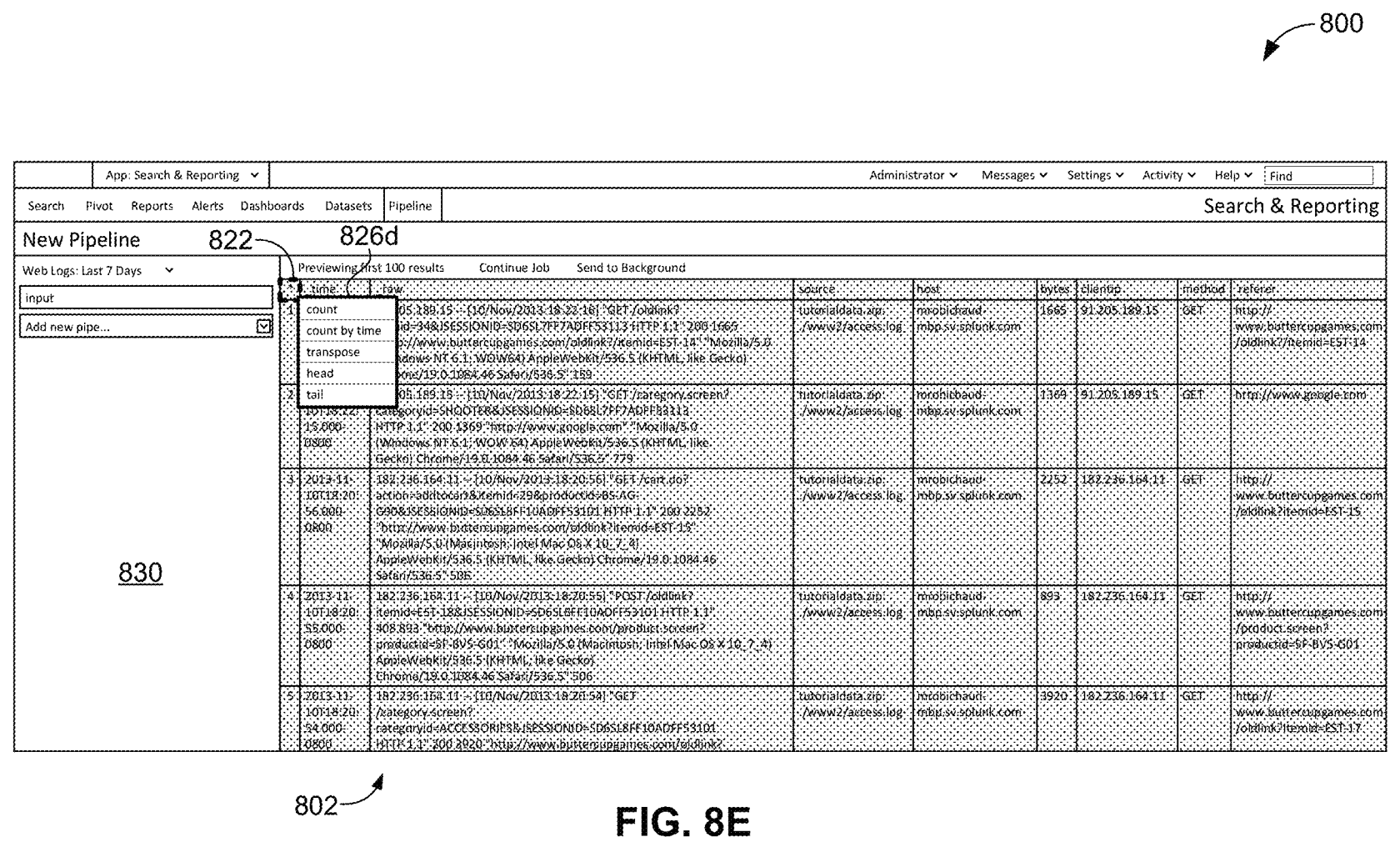
Figure 8F:
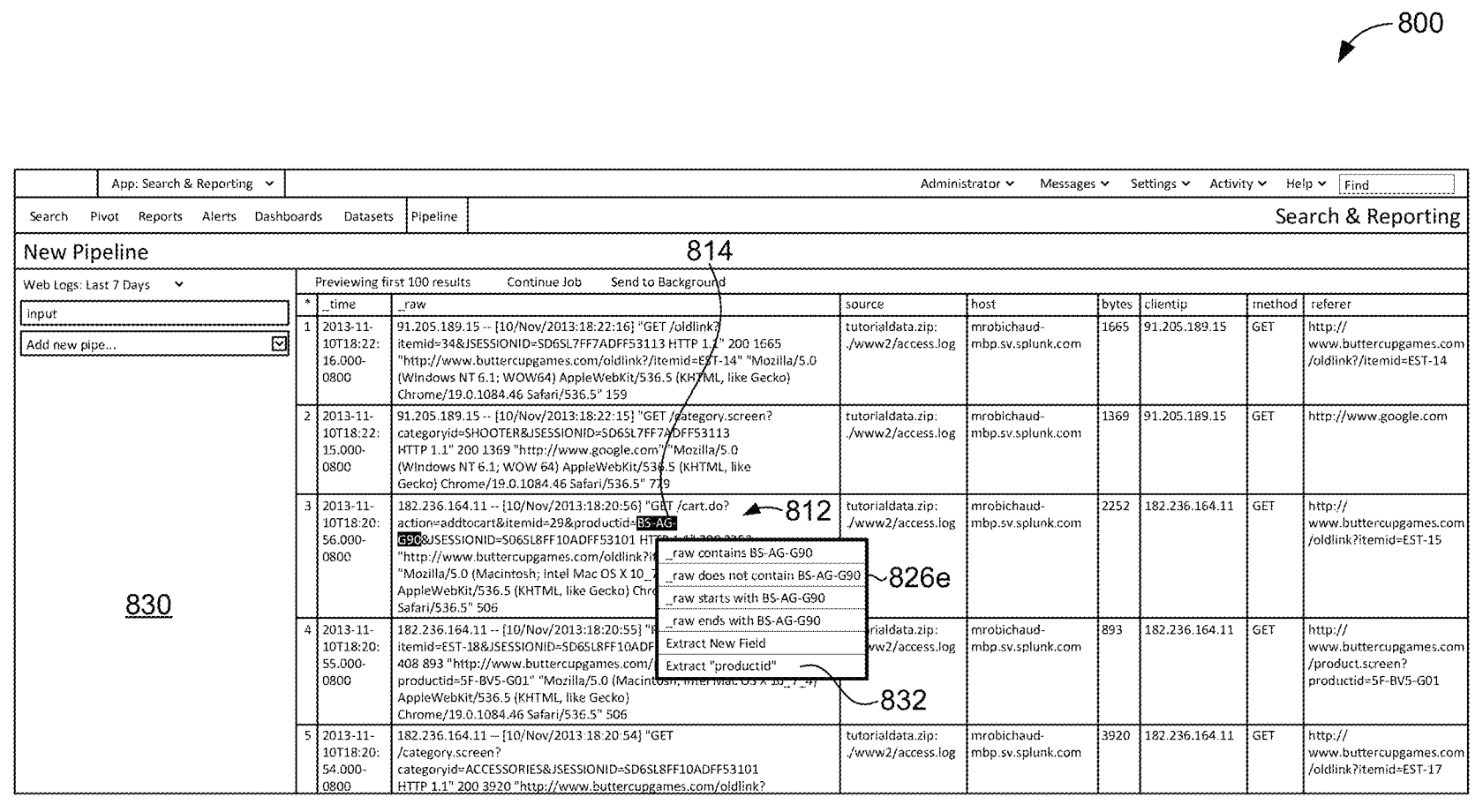

FIGS. 8B, 8C, 8D, 8E, and 8F represent search screen 800 after respective portions of table format 802 have been selected by a user. FIG. 8B illustrates where a selected portion is an individual cell (e.g., cell 810), although in some implementations a user may select multiple cells. FIG. 8C illustrates where a selected portion is an individual column (e.g., column 804a). FIG. 8D illustrates where multiple columns are selected (e.g., columns 804b and 804c). FIG. 8E illustrates where table format 802 itself is selected. FIG. 8F illustrates where a portion of a textual representation (text) of one or more data items (e.g., portion 814 (a text portion) of textual representation 812) is selected. It is noted that, where multiple columns are selected by a user, the selected columns need not be adjacent to one another, as shown. Similarly, where multiple cells are selected in the table format, those selected cells need not be adjacent to one another.

Although many approaches exist for selection of portions of a table format, in some implementations, a selectable portion(s) may be highlighted or otherwise emphasized when a pointer that is displayed in the user interface moves over a particular region of the display (e.g., a region of the table format) that corresponds to the selectable portion(s). This feature is also referred to as highlight with rollover (e.g., detected when a pointer moves over a region). One or more highlighted selectable portions can then be selected in response to additional user input, such as a mouse click or touch input to select the selectable portions. A shift-click or other method could be utilized to select additional selectable portions.

By way of example, in search screen 800, each cell is individually selectable and the region for each cell is substantially coextensive with the cell. For example, in FIG. 8B, region 820a can be used to select cell 810, which is shown as being emphasized and selected. Furthermore, each column is individually selectable and the region for each column is coextensive with the column's header, which comprises an attribute label of the event attribute of the column. For example, in FIG. 8C, region 820b can be used to select column 804a, which is shown as being emphasized and selected. In implementations where rows are selectable, the region for a row could similarly correspond to the row's header (displaying the event number in the present implementation).

Selection of a textual representation, or a portion thereof, could optionally be handled, at least partially using highlight with rollover. In search screen 800, a portion of a textual representation may be selected by the user using a click, drag to highlight, and release, as one example. Any of the various characters in text of a textual representation may be highlighted and selected, and in some implementations, multiple textual representation portions could be selected from multiple cells.

2.3 Exemplary Options

A variety of approaches are available for presenting options that are displayed based on and corresponding to the selection of one or more portions of the table format. In some implementations, options can be presented as a list of selectable options. Options may appear in sidebar 830, or elsewhere. In FIGS. 8B, 8C, 8D, 8E, and 8F, options are displayed in option menus. Display locations of option menus can be based on the one or more portions of the table format that are selected by the user. For example, option menus can be configured to appear proximate to (e.g., over, or adjacent to) the one or more selected portions of the table format, as illustrated by option menus 826a, 826b, 826c, 826d, and 826e.

Figure 9:
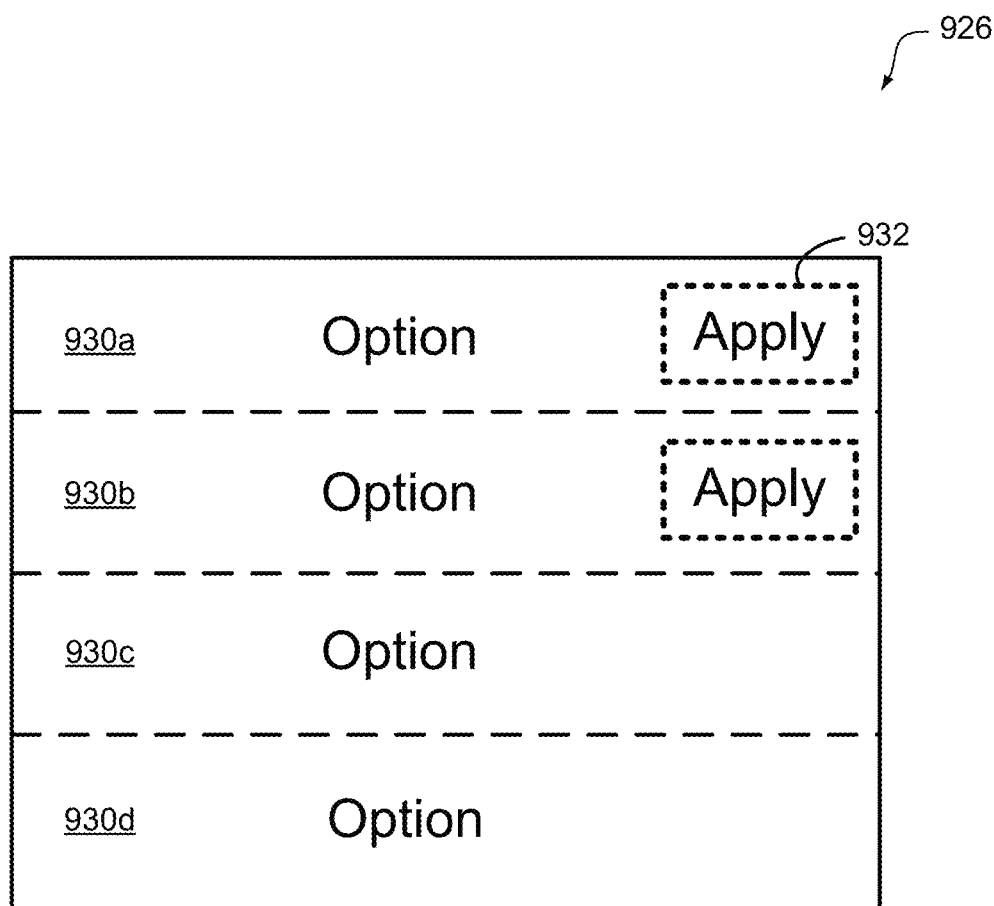
FIG. 9 illustrates an option menu in accordance with the disclosed embodiments.

FIG. 9 shows exemplary option menu 926 in accordance with implementations of the present disclosure. Option menu 926 comprises options 930a, 930b, 930c, and 930d, and is utilized to describe exemplary configurations for option menus, such as any of option menus 826a, 826b, 826c, 826d, and 826e. In the present implementation, each option can correspond to one or more commands that may be included in a search query. However, in some cases, options need not correspond to one or more commands that may be included in a search query. Instead, the option may be operable to interact with the system in some other manner. Where, an option corresponds to a command, the command may be provided to a search query utilizing a format that includes a command identifier that identifies the command and one or more command elements of the command, at least some of which may be optional (e.g., arguments, parameters, values, command options, and the like). In particular, each command could correspond to a pipelined search language command, such as an SPL command, or another type of command compatible with processing of the search query.

In various implementations, option menu 926 is a contextual menu. In this regard, one or more of the options in option menu 926 can be included based on context related to the selection that prompted option menu 926. For example, option 930a may be included in option menu 926 in some contexts, but not in others. This may be desirable in that it may be more intuitive for some options to be invoked in some selection contexts, but not in others. Furthermore, one or more options in option menu 926 may be a contextual option. In this regard, one or more commend elements for any commands corresponding to an option may be incorporated into the commands based on selection context. Furthermore, at least some of the label of the option in option menu 926 can be based on selection context.

In some respects, context can be based, at least partially on the type or types of table elements of the table format selected by the user. In various implementations, the presented option menu may include different options depending on whether the selected portion of the table format is a column, a cell, a portion of a textual representation of a data item, or the table itself. For example, option 930c may be included in option menu 826b for a selection of column 804a, but not in option menu 826a for a selection of cell 810. This may be desirable in that it may be more intuitive for some options to be invoked through selecting a column as opposed to a cell, or vice versa. As an example, the option may correspond to a command that operates on cells of a column, or the column itself, and therefore might be more intuitive when included as an option for a selected column. As such, the option might be contextually included based on selection of a column, but not based on selection of a cell.

Context can further be based on a number of selected portions of the table format, or a number of selected portions of the table format of one or more particular types of table elements. For example, option 930d may be included in option menu 826c of FIG. 8D for a selection of multiple columns 804b and 804c, but not in option menu 826b of FIG. 8C for a selection of only column 804a. In this way options included in option menu 826c may be different than the options included in option menu 826b based on the selected portion comprising two columns in of FIG. 8D, but only one column in FIG. 8C (e.g., based on the number being greater than one column, or based on the number being equal to a designated number of columns). As another possibility, where selection portions of a table format comprise a first selected cell and a second selected cell, an option may be caused to be included in option menu 926 based on a determination that the first and second cells are in different columns in the table format.

Context can also be based on the event attribute(s) corresponding to the selected portion(s) of the table format. For example, one or more options may be included in option menu 926 based on the user selecting a column, cell, or textual representation corresponding to event raw data (e.g., _raw), or based on the user selecting a table portion corresponding to event timestamps (e.g., time).

Thus, for example, an option may be included in option menu 926 based on a determination that at least one of one or more data items of at least one selected one or more cells comprises event raw data, and/or that at least one of selected one or more columns represent event raw data of a set of events. Furthermore, an option may be included in option menu 926 based on a determination that at least one of one or more data items of at least one selected one or more cells comprises a timestamp of event raw data, and/or that at least one of selected one or more columns represent data items comprising timestamps of a set of events.

Furthermore, context can be based on one or more data types assigned to the selected portion(s) of the table format. Examples of data types include numeric data types, categorical data types, and user defined data types. A numeric data type may correspond to numbers and a categorical data type may correspond to a combination of numbers, letters, and/or other characters. A cell may be identified as comprising a numeric data type or a categorical data type by the system analyzing the data item represented in the cell. A column may be identified as comprising a numeric data type or a categorical data type by the system analyzing at least some of the data items represented in the column (e.g., in cells). Such determinations may be made based on the selection of the table format and prior to selecting an option, or could be performed prior to the selection of the table format. Furthermore, in some cases, the data type could be selected by a user.

Thus, for example, an option may be included in option menu 926 based on a determination by the system that at least one of one or more data items of at least one of selected one or more cells is of a numeric data type (e.g., based on the overall data type of the cell's corresponding column, or based on the cell's particular data type), and/or that at least one of selected one or more columns represent data items of a numeric data type. Similarly, an option may be included in option menu 926 based on a determination that at least one of one or more data items of at least one selected one or more cells is of a categorical data type, and/or that at least one of selected one or more of the columns represent data items of a categorical data type. As an example, where each selected column has a numeric data type, an option may be presented that corresponds to one or more commands that apply at least one statistical functions to the data items of the columns, and/or generate a graph where each axis represents a respective one of the columns. As a further example, the one or more commands be operable to remove one or more non-numeric cells from selected one or more cells and/or selected one or more columns, where at least one non-numeric cell is detected in a selection.

As a further example, context can be based on a source of data items in the selected portion(s) of the table format. For example, one or more options may be included in or excluded from option menu 926 based on a determination by the system that at least one of one or more data items of at least one of selected one or more cells comprises a statistical value generated by one or more statistical functions performed on values of data items of at least some events and/or that at least one of selected one or more columns represents data items comprising statistical values generated by one or more statistical functions performed on values of data items of at least some events. As an example, the system may refrain from offering one or more options related to extracting new data items from data items that comprise statistical values. A statistical value may refer to a value generated from an event using one or more statistical functions (e.g., average, sum, mean, median, mode, standard deviation, variance, count, range), such that the value no longer corresponds directly to event raw data. In some cases, a value may be determined as a statistical value based on identifying the value as an output of a statistical command in a search query. For example, statistical commands may be commands known to produce one or more statistical values an output.

As another example, one or more options may be included in or excluded from option menu 926 based on a determination by the system that at least one of one or more selected one or more cells is an empty cell, and/or that at least one of selected one or more columns comprises one or more empty cells. As an example, the system may offer one or more options related to one or more commands that are operable to remove or otherwise perform some operation on empty cells based on a determination that a selection comprises at least one empty cell. Furthermore, one or more options displayed for selections comprising empty cells may exclude one or more options otherwise displayed where the selection does not comprise empty cells.

In further cases, one or more options may be included in or excluded from option menu 926 based on a determination by the system that at least one of one or more data items of at least one of selected one or more cells comprises multiple values, and/or that at least one of selected one or more columns represents one or more cells comprising multiple values. A data item that comprises multiple values may comprise an array, matrix, or other representation of multiple values for a single event attribute of a single event. Each value could be displayed in the same cell and may be displayed in a manner that indicates the values as being different values for the same event and event attribute. As an example, where a user selects a portion of a textual representation of a data item in a cell, the system may offer or refrain from offering one or more options corresponding to one or more commands, based on whether the data item comprises multiple values.

In option menu 926, options 930a and 930b are examples of form-based options, which include at least one form element that can be modified by a user. A form-based option may have at least some defaults entered into the form. Examples of form elements that may be included in a form-based option include one or more of a text box, dropdown list, radio button, checkbox, and the like. Where an option corresponds to one or more commands, a form element could be employed for selecting and/or entering one or more command elements for a command and/or a command identifier (so as to select from the one or more commands). Optionally default command elements and/or command identifiers may be automatically entered into the form prior to or after selection of the option. An exemplary form element could be a dropdown list that comprises a list of possibilities for command elements and/or command identifiers. As another example, a text box could be used to enter one or more command elements of a command. The text box could comprise placeholder text that is descriptive of a command element corresponding to the text box.

A form-based option may be selected by a user using a corresponding apply button, or other suitable means. For example, option 930a could be selected by clicking on apply button 932 after providing input to configure the form, or optionally without configuration where the form comprises one or more default values. An option, such as option 930c, could be a nested form-based option, where option menu 926 comprises a link that can be selected by the user to open a form of the nested form-based option. The form may open within or outside of option menu 926 (e.g., replace the link with the form, expand the link to display the form, or appear outside of the option menu). The form could similarly include an apply button to select the option. Option 930d is an example of an option that does not include a form. As an example, option 930d may be selected upon mouse up or mouse down. The option could include one or more default command elements. In addition, or instead one or more of the command elements could be contextually generated, for example, based on the user selection.

As described above, the system can cause one or more commands to be added to a search query that corresponds to a group of events used to populate the table format, based on a user selecting one of the options from the list of options. For example, upon a user selecting an option, the one or more commands could be automatically added to the search query. Where the search query employs a pipelined search language, the one or more commands can be added sequentially to the end of the search query. In implementations where the search query is displayed to the user, for example, in a search bar, the one or more commands may be added to the search bar. In implementations where the search query is represented by a command entry list (e.g., command entry list 808), the command entry list may be updated to represent the one or more commands as one or more command entries.

The one or more commands that are added to the search query may be in proper syntax for the search query, complete with command identifiers and any command elements that are needed or desired for execution of the commands. In some cases, one or more added command elements for a command are default command elements associated with a selected option. Furthermore, one or more added command elements for a command could be provided by the form of a form-based option. As another option, the command elements could be contextually generated based on the portion(s) of the table format selected by the user.

The one or more commands corresponding to an option can be contextually based on an event attribute that corresponds to a selected portion of the table format. For example, the event attribute can be used to generate at least a portion of one or more of the commands for the option. As an example, the event attribute, and/or one or more data items assigned to the event attribute can be incorporated into at least one command element of one or more commands that correspond to the option, or used to generate at least one value for the at least one command element. A reference to an event attribute (e.g., an attribute label of the event attribute) or a data item (a value thereof), or data generated therefrom, could be included in a form element of an option as a default command element for a command. In addition, or instead, one or more references (or values, or data generated therefrom) could be included as text in a command string added to the search query and used to invoke a command. The command string can include a command identifier along with the reference(s), value(s), or data generated therefrom, used for a command element. As one example, a command element that is based on the event attribute may be a command element that instructs the command as to which event attribute and/or data item or items assigned to an event attribute to operate on, for example, within events input into the command.

Thus, where a user selects a column, one or more commands for an option may be based on (e.g., generated using) any event attributes corresponding to the column. For example, at least one command element may be generated from the event attribute(s) and/or one or more data items that are assigned to the event attribute(s), or values thereof. As an example, the user could select column 804a, as in FIG. 8C. A command element for a command corresponding to an option in option menu 826b could instruct the command to operate on data items of an event attribute having the attribute label _time, based on column 804a comprising the event attribute, or could provide data generated from one or more of the data items as input to the command. Similarly, a user could select both columns 804b and 804c, as in FIG. 8D. A command element of a command corresponding to an option in option menu 826c could instruct the command to operate on at least some data items of the event attributes having the attribute labels of source and host, based on columns 804b and 804c respectively comprising those event attributes, or could provide data generated from one or more of the data items as input to the command.

For a cell, the user could select cell 810, as in FIG. 8B, and a command element of a command corresponding to an option in option menu 826a could be generated to instruct the command to operate on the data item assigned to the event attribute having the attribute label referer, to use the value of that data item as an input to the command, or to generate data from the value of the data item as an input to the command, each based on cell 810 corresponding to a data item assigned to the event attribute.

For text, the user could select portion 814 of textual representation 812, as in FIG. 8F, and a command element of a command corresponding to an option in option menu 826e could be generated to instruct the command to operate on at least the portion of the text in the data item assigned to the event attribute having the attribute label "_raw," to use at least the portion as an input to the command, or to generate data based on the portion as an input to the command (e.g., a keyword that includes the portion), all based on portion 814 being in a data item assigned to the event attribute.

As discussed above, based on the selection of one or more displayed options, operations corresponding to a displayed option that is selected by the user can then be carried out by the system. As one example, when an option is selected (e.g., in option menu 926), the operations may be automatically performed. Furthermore, the screen can be updated based on any changes corresponding to the selected options. For example, in search screen 800, when a user selects an option, the set of events utilized to populate table format 802 (e.g., a search results set) may be automatically updated by the operations associated with the option. As an example, one or more portions of a search query could be executed, as needed to accurately portray events corresponding to the search query in the table format. Furthermore, the displayed table format 802 may be automatically updated to reflect changes to the set of events. More particularly, where one or more commands are added to a search query, or the search query is otherwise modified by an option, table format 802 can be automatically updated to correspond to the modified search query. This could result in more or fewer events being included in the table format, and/or more or fewer event attributes being included in the table format, depending on the commands.

Thus, for example, a user may directly interact with the table format to manipulate a corresponding search query and automatically see the results of the manipulations reflected in the table format. In doing so, the user need not necessarily directly code the search query, which can require extensive knowledge of the underlying search query language. Instead, complicated aspects of coding the search query can be embedded in the options, and results of the options (and any underlying commands) can quickly be portrayed to the user. For example, the user could select an option to remove a column comprising an event attribute, and a command assigned to the option that operates to remove the event attribute from inputted events can automatically be added to the search query. At least the added command could automatically be executed, and the displayed table format could be updated to no longer include the column, as the event attribute would be excluded from search results.

It should be noted that execution of a search query (or one or more portions thereof), as described herein can comprise an automatic reformulation of the search query (or one or more portions thereof), so as to more efficiently achieve equivalent search results as the search query.

Below, various potential options are described with respect to user selections of a table format. Although options may be described as corresponding to a single command, similar functionality may be achieved utilized multiple commands. It is further noted that an omission of a particular option type from a particular option menu is not intended to limit the option from potentially being included from the option menu. As an example, although extraction type options are only shown in option menu 826e of FIG. 8F, similar options are contemplated as being included for extracting new fields for option menus 826a, 826b, 826c, and 826d.

In FIG. 8B, option menu 826a is shown as including two options. The first option corresponds to a command that is operable to filter out each event input into the command that does not include the value "http://www.buttercupgames.com/product.screen?productid=5F-BV5-G01" for a data item of an event attribute labeled "referer." The value and attribute may be provided to the command from the value and event attribute associated with the user selection. The second option is similar to the first option, but filters out each event input into the command that does include the specified value.

In FIG. 8C, option menu 826b is shown as including sixteen options, with a filter text box at the top. The filter text box can be used to filter out events input into a command that do not include any keywords entered into the text box by a user. Those keywords may be incorporated into the command. The first option may be similar to the first option in option menu 826a, where the value may be entered by the user.

The second option is associated with a command that is operable to remove events input into the command that contain an identical combination of values for an event attribute. The event attribute may be provided to the command as the event attribute associated with the selected column.

The third option may correspond to a command that is operable to sort the events input into the command in ascending order of values for an event attribute, where the event attribute may be provided to the command as the event attribute associated with the selected column.

The fourth option is similar to the third option, but sorts the events in descending order of the values.

The fifth option corresponds to a command that is operable to change the attribute label of an event attribute for an associated column. The event attribute may be provided to the command as the event attribute associated with the selected column. Furthermore, the new attribute label for the command may be entered into the text box by a user.

The sixth option corresponds to a command that is operable to remove an event attribute from events input into the command. The event attribute may be provided to the command as the event attribute associated with the selected column.

The seventh option corresponds to a command that is operable to remove events input into the command that have an empty cell, or no value, for a given event attribute of events. The event attribute may be provided to the command as the event attribute associated with the selected column.

The eight option corresponds to a command that is operable to apply a lookup table to changes values for a given event attribute of events. The event attribute may be provided to the command as the event attribute associated with the selected column.

The ninth option corresponds to a command that is operable to extract all fields discovered within data items for a given event attribute of events. Such an option is later described in additional detail. The event attribute may be provided to the command as the event attribute associated with the selected column.

The tenth option corresponds to a command that is operable to split a given event attribute for events input to the command into one or more other event attributes (e.g., resulting in additional columns). The event attribute may be provided to the command as the event attribute associated with the selected column.

The eleventh option corresponds to a command that is operable to evaluate an expression for each value of a given event attribute for events input into the command and assign the resulting value to an event attribute for the event that had its value evaluated. The event attribute may be provided to the command as the event attribute associated with the selected column. Furthermore, a user may use the first text box to specify an attribute label for the resulting value and use the second text box to specify the evaluation expression, which are used as command elements in the command. If an event attribute already exists that has the attribute label entered by the user, that event attribute may optionally be overwritten with the resulting values.

The twelfth option corresponds to a command that is operable to find transactions based on events input to the command that meet various constraints. Events may be grouped into transactions based on the values of a given event attribute. The event attribute may be provided to the command as the event attribute associated with the selected column. Furthermore, a user may use the first text box to specify a max pause value for the command and use the second text box to specify a max span value for the command. The maxspan constraint requires the transaction's events to span less than maxspan. The maxpause constraint requires there be no pause between a transaction's events of greater than maxpause.

The thirteenth option corresponds to a command that is operable to display the most common values for a given event attribute in a set of events input to the command. The event attribute may be provided to the command as the event attribute associated with the selected column.

The fourteenth option corresponds to a command that is similar to the command of the thirteenth option, but groups the top values by the event attribute having the attribute label "_time."

The fifteenth option corresponds to a command that is operable to display the least common values for a given event attribute in a set of events input to the command. The event attribute may be provided to the command as the event attribute associated with the selected column.

The sixteenth option corresponds to a command that is operable to provide statistics on values for a given event attribute in a set of events input to the command grouped by the event attribute having the attribute label "host." The given event attribute may be provided to the command as the event attribute associated with the selected column.

In FIG. 8D, option menu 826c is shown as including five options. The first option corresponds to a statistical command that is operable to perform a summation of values of events input to the command for a first event attribute grouped by a second event attribute. The first and second event attributes may be provided to the command as the event attributes associated with the selected columns. Such a command might only be included in option menu 826c where at least one of the selected columns is of a numerical data type (e.g., where one is of a numerical data type and another is of a categorical data type). Furthermore, the event attribute associated with a selected column having a numerical data type may be used as the first event attribute and the event attribute associated with a selected column having a categorical data type may be used as the second event attribute.

The second option corresponds to a command that is similar to the command of the first option, but is operable to perform an average rather than a summation.

The third option corresponds to a command that is operable to correlate values between event attributes of events input to the command to show the co-occurrence between the values. The command may build a contingency table, comprising a co-occurrence matrix for the values of the event attributes. The event attributes may be provided to the command as the event attributes associated with selected columns.

The fourth option corresponds to a command that is operable to correlate event attributes of events input to the command to show the co-occurrence between the event attributes. The event attributes may be provided to the command as the event attributes associated with selected columns.

The fifth option corresponds to a command that is operable to filter out all event attributes from events input to the command except for given event attributes. The given event attributes may be provided to the command as the event attributes associated with selected columns.

In FIG. 8E, option menu 826d is shown as including five options. The first option corresponds to a command that is operable to count the number of events input into the command.

The second option corresponds to a command that is operable to count the number of events input into the command by the event attribute having the attribute label "time."

The third option corresponds to a command that is operable to transpose events input to the command and event attributes of the commands, such that each row may become a column.

The fourth option corresponds to a command that is operable to return the first N events input to the command where N is a positive integer (e.g., 10).

The fifth option corresponds to a command that is operable to return the last N events input to the command where N is a positive integer (e.g., 10).

In FIG. 8F, option menu 826e is shown as including six options. The first option corresponds to a command that is operable to filter out events input to the command that do not include a given keyword or phrase for a given event attribute. The given event keyword or phrase may be provided to the command as identified from at least a selection portion of the textual representation of a data item, and the given event attribute can be provided by the event attribute associated with the data item.

The second option corresponds to a command that is similar to the first option, but removes events that do not include the given keyword or phrase for the given event attribute.

The third option corresponds to a command that is similar to the first option, but removes events that do not start with the given keyword or phrase for the given event attribute.

The fourth option corresponds to a command that is similar to the first option, but removes events that do not end with the given keyword or phrase for the given event attribute.

The fifth option is operable to initiate a field extraction workflow for extracting one or more new fields.

The sixth option corresponds to a command that is operable to extract a new field having a given field label from a given event attribute for event input to the command. The given field label may be generated from the selected portion of the textual representation of a data item, and the given event attribute can be provided by the event attribute associated with the data item. Such an extraction may be a suggested field extraction, later described in additional detail below.

2.4 Command Entry List

In some respects, the present disclosure relates to a command entry list, an example of which was briefly discussed with respect to command entry list 808. Command entry list 808 corresponds to an exemplary implementation of a command entry list in a search screen of a search system. However, concepts related to a command entry list are not intended to be specifically tied to such implementations. To this effect, command entry lists are discussed in additional detail below with respect to FIG. 10 and command entry lists 1008a and 1008b.

Command entry lists 1008a and 1008b each represent potential implementations of command entry lists, in accordance with concepts disclosed herein. Command entry lists 1008a and 1008b each comprise a list of command entries, which can be displayed in a search interface (such as is command entry list 808), or other interface. As shown, command entry lists 1008a and 1008b each comprise command entries 1040a, 1040b, 1040c, and 1040d. Although the command entries are listed in a vertical column (with one command entry per row), other list formats could be employed.

Figure 10:
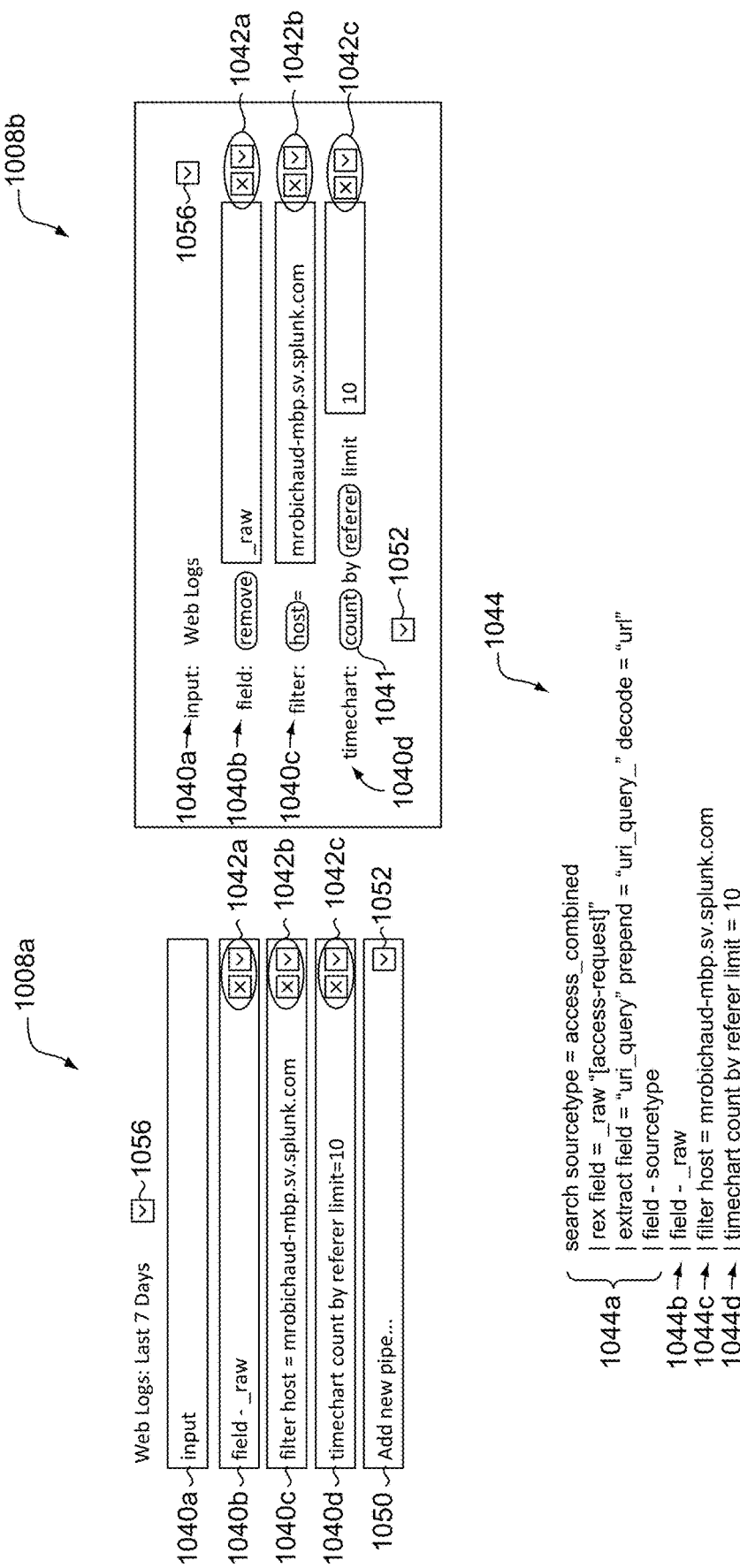
FIG. 10 illustrates command entry lists in accordance with the disclosed embodiments.

Each command entry in a command entry list may represent one or more commands of a plurality of commands of a search query. By way of example, FIG. 10 shows search query 1044 which may corresponds to each of command entry lists 1008a and 1008b. Command entry 1040a corresponds to commands 1044a, command entry 1040b corresponds to command 1044b, command entry 1040c corresponds to command 1044c, and command entry 1040d corresponds to command 1044d, by way of example.

As shown, the list of command entries of command entry lists 1008a and 1008b are displayed in a sequence corresponding to the plurality of commands of the search query. In particular, the command entries are displayed in the list in the same sequence as their corresponding commands appear in the search query. As the search query utilizes a pipelined search language in the present examples, each command entry that corresponds to a command may be considered a data processing pipe and the sequencing can portray to the user the relationship between commands in terms of inputs and outputs for the data processing pipes. It is noted that, the display in the sequence could be visually conveyed using a variety of possible approaches, such as by depicting a combination of alphanumeric characters proximate to each command entry, and/or the by the positioning of the command entries on screen. Furthermore, in some implementations, the list of command entries of a command entry list need not be displayed in a sequence corresponding to a plurality of commands of a search query in every implementation of the present disclosure.

Command entries 1040b, 1040c, and 1040d each display a representation of their respective underlying commands. In the approach depicted in command entry list 1008a, each command is listed as the command would appear in search query 1044. Pipes (e.g., "|") or command separators, are omitted from display, and may be implied from the depiction of the command entries. However, in some implementations, command separators might be depicted, or a subset of command separators might be depicted, for example, within a command entry that corresponds to multiple commands. In the approach depicted in command entry list 1008b, various portions of commands are formatted in different manners, to improve legibility for users. For example, command identifiers are followed by colons and are aligned to the colons, and might be bolded. Command element parameters are formatted in a distinguishable manner using a different color of text than other portions, and command modifiers are distinguishable as unformatted text. Command variables are depicted in text boxes.

In some respects, through interaction with a command entry list, a user can modify the search query. For example, one to all of the command entries can correspond to a respective form for modifying its respective underlying commands in the search query. In the approach depicted in command entry list 1008a, text of any portion of a command may be modified. For example, each command entry comprises a text box that includes the command. A user may modify the command by modifying the text in the text box. The corresponding command in search query 1044 can be updated accordingly to correspond to the modified command. Thus, a user could change "limit=10" in command entry 1040d to "limit=20," and command 1044d may be modified to reflect the changes made using command entry 1040d. Such changes may be reflected automatically, or may first require the user to apply the changes.

In the approach depicted in in command entry list 1008b, portions of the commands are represented by a respective form element. Users may optionally be restricted from modifying at least some portions of the commands in the command entries, such as command identifiers. Furthermore, some portions of the commands may have respective dropdown lists, or option menus, associated therewith that can be used to select fields, aggregation methods, or other command parameters to be used as the portion of the command. The options presented for a given portion of a command may be included based on the type of command element suitable for the position of the given portion in the command. As shown, count, referer, host, and remove all have corresponding option menus, indicated as rounded rectangular boxes (e.g., 1041 in FIG. 10).

In some cases, a user interaction with the command entry list may break a dependency of a command element(s) of one or more command entries. For example, a user could change "field—_raw" in command entry 1040b to "field—host" and command 1044b may be modified to reflect the change made to command entry 1040b. In the present example, "_raw" and "host" are used as command elements that instruct the command having command identifier "field" as to which event attribute to operate on. When executed, data items of the event attribute may be removed from events input into the command. Thus, due to the modification "_raw" data items may no longer be removed, but "host" data items may be removed instead. However, as shown, command entry 1040c has a command element instructing the command to operate on an event attribute referenced by "host." In some implementations, in response to the user adding "host" to command entry 1040b, the system may optionally detect that the modification to command entry 1040b breaks a dependency of the command element (e.g., event attribute) referenced in command entry 1040c and automatically throw that command entry into an error state. In the error state, the commands associated with the command entry may be excluded from execution in the search query and a visual indication may be displayed to the user that the command entry is in the error state.

Although some modifications may throw one or more command entries into an error state, in some cases, a broken dependency caused by a user interaction may be automatically identified and corrected in the search query. For example, assume that a first command entry represents a command in a search query that is executable to extract a new field from an event attribute and names that field "referer." The command may include a command element "referer," which instructs the command to label the new field "referer." Also assume that a second command entry represents a subsequent command in the search query that is executable to operate on a field labeled "referer." In accordance with implementations of the present disclosure, the system may automatically detect a dependency between the commands of the command entries when a user renames "referer" through interaction with the first command entry. Based on detecting the dependency, the system may automatically rename the command element (e.g., event attribute) in the command(s) represented by the second command entry (and potentially any other dependent commands in the search query) to correspond to or match the renamed command element represented by the first command entry. Thus, where a user interaction comprises a user renaming a command element in one or more commands using a form element in a designated command entry that represents the command element, and one or more other command elements in one or more other commands can be automatically renamed in the search query so as to correspond to the renamed command element. In this way, error states can be avoided for command entries representing commands that include command elements that depend on (e.g., reference) command elements of other commands.

The approach depicted in command entry list 1008b may be similar to command entry list 1008a, but with only designated portions of a command being directly modifiable by a user, while at least some portions are not directly modifiable by the user. By way of example, command identifiers are not directly modifiable through the depicted command entries. However, as indicated using underlining, command variables are directly modifiable as text boxes. Command element parameters may optionally be modifiable using respective dropdown lists, as one example.

As shown in FIG. 10, each command entry has one or more corresponding selectable options to modify the command entry list with respect to the command entry. The selectable options are accessible through respective form elements. As an example, in each of command entry lists 1008a and 1008b, command entries 1040b, 1040c, and 1040d each comprise respective options 1042a, 1042b, and 1042c. The options for a command entry are selectable for the command entry by way of one or more respective form elements, which are visually and operably associated with the command entry. In command entry list 1008a, two form elements are employed for each of command entries 1040b, 1040c, and 1040d. In particular, a button (e.g., x-button), and dropdown list are included for each command entry. The option corresponding to the button (which in other implementations could be selectable in some other manner) in command entry list 1008a is operable to delete at least the corresponding command entry from command entry list 1008a. Similar functionality may be incorporated into the options, as shown in command entry list 1008b.

Deleting the corresponding command entry may automatically shift positions of the subsequent command entries in the command entry list to fill the gap left by deleting the command entry, while otherwise retaining sequencing of the command entries in the command entry list. Furthermore, deleting the command entry may delete (e.g., automatically) the one or more commands that correspond to the command entry from search query 1044 (and optionally one or more command separators). Similar to the command entries, any subsequent commands in the search query may have their sequencing retained, with a command that immediately preceded any deleted command(s) being configured to receive the input that would otherwise had been provided to the deleted command(s). Thus, through selection of the option, both the search query and the command entry list may be updated.

As other potential options, the options for a command entry can be selectable to reorder the command entry within the command entry list. One exemplary reorder option is a shift up option, which is operable to swap positions of the command entry associated with the option with the command entry immediately preceding the command entry in the list. Swapping a position of the command entry may automatically swap position of the one or more commands represented by the associated command entry with the one or more commands represented by the immediately preceding command entry in search query 1044. Another example of a reorder option is a shift down option, which is similar to the shift up option with the immediately preceding command entry being substituted with the immediately following command entry for swapping. It will be appreciated that other reordering options are possible, and each may comprise modifying the sequencing of command entries in the command entry list and modifying the search query to reflect corresponding changes. Furthermore, in some cases, a user may interact with the command entry list by selecting a command entry (e.g., using a mouse), and dragging the command entry to a different position in the command entry list, thereby reordering the command entry list.

In addition to command entries, a command entry list may include a blank entry, such as blank entry 1050. Blank entry 1050 is operable to add new command entries to the command entry list. In command entry list 1008a, blank entry 1050 comprises a form that is operable by a user to input a command into blank entry 1050. In the example shown, the form comprises a text box for inputting the command as text, although other form elements could be employed. As shown, the text box is created with placeholder text that reads "Add new pipe . . . " and may be utilized to apply blank entry 1050, with a command entered therein by a user, to command entry list 1008a as a new command entry and/or to include the command entered therein in search query 1044 (e.g., add the new command entry to the end of the list of command entries and/or add the new command(s) to the end of the search query). One or more associated options 1052 may be incorporated into one or more form elements in addition to or instead of the text box. Options 1052 may provide a menu of commands that a user can add to the command entry list to create a new command entry by selecting its associated option.

It should be noted that changes made to the command entry list using a form element may be applied to the search query as part of operations associated with the form element or the form containing the form element (e.g., automatically). However in some implementations, the user may make multiple changes to command entries or sequencing of the command entries in the command entry list, and the changes are individually or collectively applied to the search query by the user, for example, using one or more apply buttons, and/or save features.

In FIG. 10, command entry 1040a is an input command entry. An input command entry can optionally be included in a command entry list and corresponds to an input query (e.g., 1044a), or pipeline, which serves as an input to the subsequent commands of the search query. Therefore, an input command entry may be the first command entry in a command entry list, if present. The input command entry may be permitted to represent more than one command, while command entries 1040b, 1040c, and 1040d may optionally be restricted to representing single commands. One or more commands corresponding to an input command entry may optionally be hidden from display in the interface and/or the command entry list (although they may optionally be capable of being revealed in some manner). Furthermore, the interface and/or the command entry list may restrict the user from directly modifying the commands represented by the input command entry.

In some implementations, an input command entry corresponds to a saved input query or pipeline that is selected by the user as an input. "Web Logs" in FIG. 10 is an example of a label corresponding to a saved input query or pipeline that can be displayed with the command entry list. The user can optionally be permitted to selectively replace the saved input query with a different input search query (e.g., another saved query) through the interface comprising the command entry list. As an example, form element 1056 could comprise an option operable to initiate such a selection. It should be appreciated that search query 1044 can be updated accordingly to replace commands of a previous input search query (e.g., commands 1044a) with a newly selected input search query or pipeline.

From the foregoing, it should be appreciated that one or more command entry lists can be employed to create and/or modify a search query. It is further noted that, command entry lists can be incorporated into interfaces that allow search queries to be created and/or modified using additional means. Command entry list 808 in FIG. 8A is one such example where, as described above, a user may modify or create the search query, for example, through interactions with table format 802, or possibly using a search bar. Thus, the search query described with respect to search screen 800 could correspond to search query 1044 of FIG. 10.

In these cases, where the search query is modified through table interactions, the search bar, or other means, the changes may be propagated to the command entry list (automatically or otherwise). To illustrate the foregoing, when a user selects an option, such as one of the options in option menu 926, one or more commands corresponding to the option can be automatically added to the end of command entry list 808 as a command entry. In some cases, where the option is a form-based option, the form corresponding to the option might be reproduced in the command entry, as completed by the user. In particular, each of command entries 1040b, 1040c, and 1040d in command entry list 1008b could correspond to a form of a respective option previously selected by a user. The form elements utilized for creation and/or modification of the command in the form of the option can be reproduced, as shown.

2.5 Exemplary Pipeline Selection Interface

In further respects, implementations of the present disclosure relate to data processing pipelines (or simply pipelines) that are defined by one or more search queries. A data processing pipeline can correspond to a set of sequenced commands configured such that inputs to the pipeline are operated on by a first command in the sequence, and each subsequent command operates on results produced by the preceding command in the sequence, until a final command in the sequence provides one or more outputs to the pipeline. The sequence of the commands can be defined by a search query, such as by using a pipelined search language like SPL.

In various implementations, a search query can be created that defines a data processing pipeline that extends another data processing pipeline, which itself may be defined by a search query. In some cases, to create such a search query, one or more data processing pipelines can be selected as a basis for the search query (e.g., as an input search query or pipeline, as described above). In doing so, the full search query need not be created (e.g., by a user), instead, only an additional query may be defined that corresponds to an extended portion of the selected data processing pipeline(s).

In some implementations, a user can select the one or more saved data processing pipelines as a basis for the search query using a selection interface. The selection interface could optionally be displayed with another interface, such as a search interface, in the same screen as the other interface, or in a different screen. An example of a suitable selection interface is described with respect to selection interface 1100 of FIG. 11.

As shown, selection interface 1100 comprises a plurality of pipeline entries, such as pipeline entries 1102a and 1102b, which are listed in selection interface 1100. Each pipeline entry represents a saved pipeline (e.g., a persistently stored pipeline) and displays a pipeline label assigned to the saved pipeline. For example, pipeline entry 1102a has pipeline label 1104a that reads "All Data," and represents a respective saved pipeline that could optionally serve as a basis for all other pipelines. As another example, pipeline entry 1102b has pipeline label 1104b that reads "Web Logs," and represents a respective saved pipeline. Each saved pipeline can represent a saved search query that defines the saved pipeline. As an example, the saved pipeline corresponding to pipeline entry 1102b can represent a saved search query comprising commands 1044a of FIG. 10, by way of example.

Each pipeline entry is selectable to load the saved pipeline that corresponds to the pipeline entry. For example, each pipeline entry can have one or more links that are selectable to load the corresponding pipeline. In the example shown, two links are included for each pipeline entry, which are "edit pipeline" links and "use as input" links. As shown, pipeline entry 1102a comprises edit pipeline link 1108a and use as input link 1106a and pipeline entry 1102b comprises edit pipeline link 1108b and use as input link 1106b.

To this effect, in some implementations, a user may assign one or more tags to any pipeline entry. As an example, pipeline entry 1102a has an assigned "data set" tag. Other tags for other shown include "mine," "accelerated," and "lookup." A user can filter out pipeline entries from selection interface 1100 based on their assigned tags. For example, filter form 1112 can be used to select which tag(s) pipeline entries should have to be included in selection interface 1100. As another possible feature, each pipeline entry has a down chevron, which is selectable to show configuration settings for that pipeline entry. As shown, the pipeline entry with a pipeline label that read "Errors in the last 24 hours" has been selected, and thereby expanded to show its configuration settings. Some of the configuration settings may be changed through selection interface 1100, such as those shown as including "Edit" links that may be selected to edit a corresponding setting.

In response to a user selecting an edit pipeline link, the system may cause the corresponding pipeline of the pipeline entry to be loaded for editing. By selecting edit pipeline link 1108b, for example, a saved pipeline corresponding to commands 1044a in FIG. 10 could be loaded into an interface where the user may modify the pipeline. Loading a saved pipeline may comprise loading at least some of a saved search query corresponding to the saved pipeline. Thus, commands 1044a could be loaded into an interface. A user may modify at least a portion of the saved search query by adding, deleting, and/or modifying one or more commands of the pipeline using the interface.

The saved pipeline may be loaded into a search interface, which may correspond to search screen 800, as one example. Thus, the saved pipeline could be used as the search query described above that can be modified using the search interface. In addition, or instead, the saved pipeline could be loaded as the search query described above as being modified using a command entry list by populating the command entry list with command entries representing the saved pipeline. However, the saved pipeline may be loaded into other interfaces, which may still implement an interactive table format or command entry list, as described above, or another type of interface. The interface may or may not display events that correspond to the search query. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. A saved data set could be saved as a table, or in another format. By loading the saved data set, the saved pipeline need not be executed to load the events, thereby saving system resources. Furthermore, where one or more commands are added to the saved pipeline, the one or more commands may use the data set as an input data set for further processing, rather than executing the entire pipeline.

Any modifications that may have been made to the loaded pipeline may be saved, for example, to the saved pipeline, such that the saved pipeline is updated to correspond to the modified search query (the save process may be initiated by the user, for example, by selecting a save option in the interface). Furthermore, an updated output data set may be saved in association with the updated saved pipeline, which may replace a previously saved data set. The updated saved pipeline and/or updated saved data set may then be accessed using the pipeline entry in the selection interface, for example, through edit pipeline link 1108b or use as input link 1106b.

In response to a user selecting a use as input link, the system may cause the corresponding pipeline of the pipeline entry to be loaded as an input pipeline for an existing search query, or as a basis for a new pipeline that may be created based on the input pipeline. By selecting use as input link 1106b, for example, a saved pipeline corresponding to commands 1044a in FIG. 10 could be loaded into an interface for creating and/or modifying a search query that builds on, or extends, the saved pipeline. Loading a saved pipeline may comprise loading at least some of a saved search query corresponding to the saved pipeline. Thus, commands 1044a could be loaded into the interface. A user may possibly delete and/or modify the loaded one or more commands using the interface. However, in some cases, the one or more commands may be hidden from the user and/or the interface may preclude the one or more commands from being modified (e.g., as a default that may be overridden by the user). Furthermore, the user may be precluded from modifying the underlying saved pipeline using the interface (at least directly).

The saved pipeline may be loaded into a search interface, which may correspond to search screen 800, as one example. Thus, the saved pipeline could be used at least as a basis for the search query described above that can be modified using the search interface. In addition, or instead, the saved pipeline could be loaded as at least a basis of the search query described above that may be modified using a command entry list by populating the command entry list with one or more command entries representing the saved pipeline. However, the saved pipeline may be loaded into other interfaces, which may still implement an interactive table format or command entry lists, as described above, or another type of interface. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. By loading the saved data set, the saved pipeline need not be executed, thereby saving system resources. Furthermore, where one or more commands are added to the saved pipeline, the one or more commands may use the data set as an input for further processing, rather than executing the entire pipeline.

In various implementations, one or more commands can be added to and/or edited in a search query that builds off of, or extends, the loaded saved pipeline (e.g., commands 1044a). The search query may correspond to the saved pipeline (e.g., commands 1044a), with an additional search query that builds off of the saved pipeline. One such example is search query 1044 in FIG. 10, with the additional search query comprising commands 1044b, 1044c, and 1044d that might have been added using command entry list 1008a or 1008b. As another example, the additional search query may have been added using a combination of command entry list 808 and interactions with table format 802, where the interface corresponds to search screen 800. Where updated events are needed for display, the updated events may be generated based on the output data set of the loaded saved pipeline, for example, by executing the additional search query using the output data set as an input, thereby saving system resources. Furthermore, by preventing the user from modifying the loaded pipeline in the interface, it may be ensured that the output data set can be used regularly for this purpose.

The constructed search query may be saved, for example, as a new saved pipeline that corresponds to the search query (the save process may be initiated by the user, for example, by selecting a save option in the interface). Furthermore, an output data set may be saved in association with the new saved pipeline that corresponds to an output of the pipeline. Additionally, the constructed search query can be saved in association with the saved pipeline and a new pipeline entry. The saved pipeline may then be accessed, for example, in selection interface 1100 using an associated use for input pipeline link and an associated edit pipeline link in the pipeline entry, similar to web logs.

2.6 Dependent Pipelines

In some respects, the present disclosure relates to creating a dependency between a first search query and a second search query, where the first search query defines a first data processing pipeline and the second search query defines a second data processing pipeline that extends the first data processing pipeline. The system can detect a modification to the first data processing pipeline defined by the first search query, and based on the modification of the first data processing pipeline being detected, enforce the dependency, such that the second data processing pipeline is modified to extend the modified first data processing pipeline.

In the context of the previous example, a dependency may be created between the saved pipeline (input pipeline) and the new pipeline being modified in the interface, where the first search query is the query corresponding to the saved pipeline and the search query being created corresponds to the second search query. In some cases, the modification that is detected could be performed while a user is modifying the first search query using an edit pipeline link, as one example. For example, the user could be modifying the first search query and creating the new pipeline concurrently (e.g., in different tabs). By enforcing the dependency, the new pipeline is modified to still extend the modified first data processing pipeline (e.g., automatically). As an example, the changes made to the first search query may be incorporated into the base pipeline being used to construct the new pipeline. In some cases, a non-persisted data set that corresponds to an output of the modified first search query (e.g., generated while modifying the first search query) could be used as an input to the additional search query, such that only the additional search query needs to be executed. As a further example, such a dependency may only be detected and/or enforced based on the modified first search query being saved by the user to update the saved pipeline (e.g., persistently).

As another example, in the context of the previous example, a dependency may be created between the saved pipeline and the newly saved pipeline (e.g. associated with the new pipeline entry), where the first search query is a query corresponding to the saved pipeline that served as a basis for the newly saved pipeline, and the second search query is a query corresponding to the extended saved pipeline. The modification that is detected could be performed using an edit pipeline link, as one example. Furthermore, the modification could correspond to an update to the saved pipeline that serves as a basis for the dependent pipeline. The dependency can be enforced so as to ensure that when a user selects the dependent pipeline for editing, or as an input pipeline, the pipeline that is loaded extends the updated saved pipeline.

Dependencies can be created and/or saved at any suitable time, such as based on a user selecting to save a pipeline. As another option, the dependency may be created and/or saved in response to the user selecting a saved data processing pipeline as a basis for the new pipeline (e.g., prior to any saving of the new pipeline). Furthermore, dependencies can be enforced at any suitable time. As an example, dependencies and be enforced at load time (e.g., using selection interface 1100), at save time (e.g., a user selected save process), or during query modification (e.g., using search screen 800).

It is noted that multiple pipelines may be created that extend that same base pipeline. Thus, dependencies may exist for each of these pipelines, such that changes to the base pipeline are propagated to the dependent pipelines. In this way, a user may only need to modify the base pipeline, instead of having to individually modify the other pipelines. Furthermore, each dependent pipeline may optionally apply its own additional processing to the same output data set produced by the base pipeline, without necessarily having to execute the base pipeline each time, as one example. Such features may be especially beneficial where the pipelines are used to apply a late-binding schema.

It is further noted that pipelines can be created that extend a pipeline, which itself extends a base pipeline. In such a case, a pipeline may have multiple dependencies, thereby creating a chain of saved pipelines. It is further noted that one pipeline can extend more than one base pipeline. In such a case, the pipeline may also have multiple dependencies. For example, the base pipelines could correspond to a combination of the base pipelines that may act to join, transact, or otherwise mix the pipelines in processing.

2.7 Extracting Field Label-Value Pairs

In some respects, the present disclosure relates to various approaches for extracting field label-value pairs from data items of events, such as event raw data, extracted fields, metadata, or other data items that may be assigned to one or more events. These approaches are useful in combination with some implementations described herein, such as various search interfaces. For example, various aspects of these approaches may be incorporated into at least one of the options that may be presented based on a user selecting a portion of a table format, which may be one of the options in option menu 926 (e.g., as one or more commands). However, it is noted that these approaches are more generally useful in the context of analyzing and/or interacting with events, which may optionally be facilitated by a graphical interface for displaying the events.

Extracting a field label-value pair from an event can generally refer to a process whereby a field label and a value associated with the field label are identified from the content of an event, such as event raw data of the event, or another event attribute, as a field label-value pair. Extractions of field label-value pairs can be implemented utilizing extraction rules that are applied to data in the events to extract values for specific fields as data items for the fields. In the context of extracting field label-value pairs, an extraction rule for a field can include one or more instructions that specify how to extract a value for the field from event data and further how to identify and/or extract a field label for the value from the event data. In some cases, an extraction rule comprises one or more regular expressions to provide instructions for identifying a field label and/or value. The field label may optionally be assigned to the field.

An extraction rule for extracting field label-value pairs can generally include any type of instruction(s) for identifying and extracting values and for identifying and/or extracting a field label corresponding to any extracted values, from data in events. The field label may optionally be generated from the data in the events. In contrast, other extraction rules may only provide instructions for identifying and extracting values from data in events. A field label may be manually entered for a field associated with the values.

An example of an extraction rule for extracting field label-value pairs is a rule that identifies a field label for a field based on text on the left hand side of an equal sign ("="), and identifies a value for a new data item or value associated with the field label based on text on the right hand side of the equal sign within a value of a data item. The equal sign can be used to demarcate text representing a field label and text representing a value associated with that field label. The identified text on each side of the equal sign could further be demarcated by a space character (" "). It should be noted that other demarcating character(s) could be employed in addition to, or instead of equal signs and space characters to define text representing a field label and/or value associated with the field label, such as one or more colons, back slashes, ampersands, quotation marks, and the like. Furthermore, rules that identify demarcating characters can vary in complexity, such as by considering text representing a value as being demarcated by characters that are not a number or word character. A word characters may include a to z, A to Z, or underscore, as an example. Furthermore, text representing a field label could be demarcated in a different manner than text representing the value, for at least one boundary thereof. Additionally, processing, such as decoding, could optionally be applied to the text portions to generate the field label and/or value.

Using such an extraction rule that identifies field labels and values using one or more demarcating characters, a system can identify within text in a data item that reads "itemid=EST-14," "itemid" as a field label, and "EST-14" as a value for a data item associated with the field label for a field label-data item pair. Such as in the raw event data of event 1 in FIG. 8A. Any values that are extracted from events using an extraction rule may be assigned to a new or existing field of an event as data items, for example, to define a late-binding schema for events. Thus, with reference to FIG. 8A, using the extraction rule, a new event attribute (an extracted field) may be created and assigned the extracted field label "itemid" for each event, along with data items corresponding to the extracted value associated with the field label for that event. As an example, the extraction rule may generate itemid data items having the values of "EST-14," "EST-15," "EST-18" respectively for events 1, 3, and 4 in FIG. 8A. As events 2 and 5 do not include text in the format of "itemid=," they could optionally be assigned a data item having a blank, or default value, or no value (e.g., empty). Similar extraction rules can be applied to each search result. The aforementioned example utilizes events that are part of search results for convenience only. It is noted that concepts related to extracting field label-value pairs are more generally applicable to any set of events.

2.8 Distinguishing Between Extracted Field Label-Value Pairs and Existing Field-Data Item Pairs In accordance with some implementations of the present disclosure, an extraction rule for extracting field label-value pairs from events can be used to extract a field label that corresponds to a field label assigned to another previously extracted field of the events. The previously extracted field may have been extracted using any suitable means, such as an extraction rule that only identifies and extracts values for a field, or an extraction rule that extracts field label-value pairs for a field. The values of the extracted field label-value pairs may be assigned to data items of another field of the events (e.g., a new field), in addition to or instead of assigning the values to data items of the existing field of the events.

Thus, the newly extracted values can be distinguished from the previously extracted values. This approach can be useful in many contexts, such as to distinguish between values that were extracted from events using different extraction rules. As another example, this approach can be used to distinguish between values that were extracted from one event attribute of events (e.g., event raw data), and values that were extracted from another event attribute of the event (e.g., an extracted field).

Referring to FIG. 8G, exemplary events are shown in table format 802 including fields extracted from the events. Assume that field 850 having field label 852 "itemid" was extracted from event attribute 854 having attribute label 856 "_raw" (e.g., event raw data) using an extraction rule which may include a regular expression and may extract values associated with instance 872 of "itemid=". An extraction rule for extracting field label-value pairs from field 858 having field label 860 "referer" can be used to extract field label 862 that corresponds to field label 852 "itemid" of previously extracted field 850 of the events. In accordance with implementations of the present disclosure, the system may cause values 864 of the extracted field label-value pairs to be assigned as data items of another field of the events (e.g., a new field 866 having field label 868 "referer_itemid" in FIG. 8G), in addition to, or instead of assigning values 864 to data items of existing field 852 of the events (e.g., automatically).

Where a new field is created, in some cases, the new field could be assigned the field label that was associated with the values (e.g., field label 862). However, in the example shown, new field 866 is assigned another field label 868, such as a modified version of field label 862. As examples, the assigned field label could be the identified field label prepended, appended, or otherwise supplemented with text, such as user specified text. Instead of user specified text, the text could be automatically generated. In the example shown, the text is from attribute or field label 852 that is assigned to event attribute or field 858 from which values 864 were extracted (i.e., "referer"). Thus, field label 868 that is assigned to new field 866 identifies the source of values 864 for that field.

In accordance with some implementations, the extraction of field label-value pairs can be invoked using a command. A command identifier for the command could be "autoextract," as a specific example. The command could optionally allow the user to specify how to supplement the identified field label, such as the text for supplementing the identified field label, for example, using prepend (if any). The command could also optionally specify which attribute(s) of the events should be used to identify the field label-value pairs. Furthermore, the command could also optionally specify which attribute label(s) of the events should be identified as field labels for the field label-value pairs in the events. In some cases, the command may identify all field label-value pairs that exist in the events, or only in specified attributes thereof. Where an attribute label is specified, the command may optionally only identify field label-value pairs that include the attribute label as a field label. Additionally, the command could optionally specify whether to decode the field label and/or value during extraction. Where decoding is specified, the command may further specify which decoding libraries should be utilized for the decoding.

An exemplary command in accordance with the forgoing could be invoked with "autoextract attribute='itemid' prepend='new_' decode='url'." In this example, "autoextract" is a command identifier, "attribute='itemid'" instructs the command to extract from the event attribute having an attribute label of "itemid," and "prepend='new_'" instructs the command to prepend any field labels identified in the itemid attribute with "new_." Furthermore, decode='url' instructs the command to use URL decoding (e.g., by referring to a URL decoding library) on any extracted values.

In executing this exemplary autoextract command, the system may search through the data items associated with the itemid attribute for events provided as input to the command. The autoextract command can employ extraction rules to extract sets of field label value pairs for each field label and associated values identified in the data items. In this case, the field labels may not only be identified in the data items, but also generated, or extracted from the data items. For example, the command may search for text in data items having the format "A=B," where each unique A is made a field label for extraction and each B is a value associated with the field label, as one example. Using such a command, at least one field label automatically discovered and extracted from the data items may match or otherwise correspond to a field label of an already existing extracted field. Despite this, the values associated with discovered field labels are assigned to data items of new fields, thereby distinguishing the values from the values of already existing fields. Based on the prepend, the new fields generated by the autoextract command will each be assigned field labels comprising the discovered field labels prepended with "new_." Tus, a user may easily identify the fields in a graphical interface. The autoextract command may optionally correspond to the option labeled "Auto-extract" in FIG. 8C.

It will be appreciated that many variations of the forgoing are possible. In the foregoing example, each field label that is discovered is automatically prepended with text regardless of whether the discovered field labels correspond to a field label of an already existing field. In accordance with some implementations of the present disclosure, the system can identify (e.g., automatically) where an extraction rule for extracting field label-value pairs from events extracts a field label that corresponds to a field label assigned to another previously extracted (and assigned) field of the events.

Doing so can provide various benefits. In the autoextract command above, for example, the system could optionally treat discovered field labels that do not correspond to a field label of an existing field different from those that do (also referred to as "duplicate field labels" for convenience). As an example, the system may automatically perform some action, such as presenting one or more options to the user based on the identification. As another example, the system could apply the prepended text (or other modified version of a field label) only to duplicate field labels (e.g., as part of the command), which may be performed automatically, or could be one of the above options selectable by the user. However, it is noted that benefits associated with identifying duplicate field labels in field label-value pair extraction are not limited to the autoextract command, and are more generally applicable to field label-value pair extraction.

2.9 Extracting Field Label-Value Pairs from Extracted Fields

In further respects, the preset disclosure relates to extracting field label-value pairs from data items of a field (e.g., assigned to one or more events) that were themselves extracted from an event attribute. For example, the data items may have been extracted from event raw data, or another extracted field. Furthermore, the data items may have been extracted using any suitable extraction rule. Examples of suitable extraction rules include an extraction rule for extracting field label-value pairs, and an extraction rule that only provides instruction(s) for identifying and extracting values from data for a field.

Such an approach provides many potential benefits, an example of which is described with respect to the events of FIG. 8Q by way of example only. As can be seen in FIG. 8Q some of the event raw data shown in event attribute 854 of events 1, 3, and 4 includes two instances of "itemid=," instance 870 embedded in a (uniform resource identifier) URI and instance 872. A user may wish to create a field based on instance 870 only, as each instance may have a different meaning. Instead of one complicated extraction rule, two simpler extraction rules could be employed to extract the desired data. First, a regular expression based extraction rule could be used to extract the URI to new field 858 having field label 860 "referer," as shown in FIG. 8G Subsequently, field label-value pair extraction can be performed on extracted field 858, so as to extract values 864 associated with field label 862 "itemid" in the URI, as opposed to anywhere in the raw event data. FIG. 8G shows extracted field 866 having field label 868 "referer_itemid," which can be a new field extracted from extracted field 858 having field label 860 "referer."

As another example, the subsequent extraction could be part of a command to automatically extract any field label-value pairs it discovers in data items of a specified attribute for events, such as in some of the exemplary autoextract commands described above (e.g., using "Auto-Extract" in FIG. 8C). Applying such as command to the event raw data of event attribute 854 of events 1, 3, and 4 may extract field label-value pairs for each field label discovered therein, which may include, itemid, JSESSIONID, categoryid, productid, and action, and also might automatically assign those field label-value pairs to fields. However, the user may only be interested in itemid. In accordance with implementations of the present disclosure, the command could be applied to an extracted field (e.g., field 858), such that the field labels (e.g., field label 862) that are extracted from the extracted field comprise a subset of the field labels that would have been extracted had the same command(s) been applied to event attribute 854 (or another event attribute such as a field). Where the events are displayed in a table format, such as table format 802, such a command(s) could be associated with an option in an option menu where the user selected a column corresponding to the extracted field (e.g., field 858). Amongst other possible benefits, this approach can simplify the user experience while avoiding unwanted or unnecessary extractions.

3.0 SUGGESTED FIELD LABEL-VALUE PAIR EXTRACTIONS

In some respects, the present disclosure relates to suggesting field label-value pair extractions. One or more field label-value pair extractions can be suggested to a user, and may be suggested based on analyzing one or more portions of one or more events of a set of events. In some cases, the one or more portions that are analyzed are selected by a user, such as in a user interface displaying at least some of the set of events. One such suitable interface may display a table format, such as table format 802. Furthermore, the selected one or more portions could correspond to selected portions of the table format, which could be accomplished in a similar manner as described above, amongst other possibilities.

In some implementations, the system receives data indicating the selection of one or more portions of data items of a set of events in a graphical interface displaying one or more events of the set of events. Based on the selection, the system automatically detects at least one field label-value pair at least partially within the selected one or more portions of the data items. Each detected field label-value pair can include a value and an associated field label. For example, the system may automatically determine an extraction rule capable of extracting a field label-value pair at least partially within at least selected one or more value, thereby detecting the field label-value pair.

If a user selects a cell in the table interface, which could correspond to the selection of cell 810 shown in FIG. 8B, the system could attempt to detect at least one field label-value pair that is at least partially within the data item corresponding to cell 810. One such field label-value pair that may be detected in cell 810 has a field label of "productid" and a value of "SF-BVF-G01."

If a user selects a column in the table interface, which could correspond to the selection of column 804*a* shown in FIG. 8C, the system could attempt to detect at least one field label-value pair that is at least partially within the data items corresponding to column 804*a*. As a further example, if a user selects multiple columns in the table interface, which could correspond to the selection of columns 804*c* and 804*e* shown in FIG. 8D, the system could attempt to detect at least one field label-value pair that is at least partially within the data items corresponding to columns 804*c* and 804*e*.

Additionally, if a user selects a portion of a textual representation of a values of one or more data items in the table interface, which could correspond to the selection of portion 814 of textual representation 812 shown in FIG. 8F, the system could attempt to detect at least one field label-value pair that is at least partially within portion 814. One such field label-value pair that may be detected partially within portion 814 has a field label of "productid" and a value of "BS-AG-G09." The user may select at least a portion of text corresponding to the field label, the value, or both the field label and value. In some cases, the user may optionally be required to select all of the associated text and not just the portion.

In further respects, each field label-value pair may be detected based on determining a corresponding extraction rule. For example, as indicated above, a field label-value pair may be detected based on being extractable using the corresponding extraction rule. However, in order to detect the field label-value pair, the field label-value pair does not necessarily have to be extracted using the corresponding extraction rule (although it may be). Rather, the system need only detect that a field label-value pair is extractable at least partially within the selection portion using the corresponding extraction rule. A field label-value pair may be considered at least partially within a selected portion of a data item for purposed of detection where at least some of the textual representation of the data item could be utilized to generate the value and/or the field label of the field label-value pair using the corresponding extraction rule.

The corresponding extraction rule could be a predefined extraction rule, a user generated extraction rule, a user specified extraction rule, or an automatically generated extraction rule, as some examples. In some cases the extraction rule may be generated at least partially based on the selection of the portion of the data items. In these cases, the extraction rule may be automatically generated by the system, or may be automatically generated and subsequently revised based on user input. As an example, an extraction rule can comprise one or more regular expressions that provide instructions for identifying field labels and/or values from data. As another example, an extraction rule can include detecting a first text portion as being separated by one or more designated demarcating characters from a second text portion in data.

Further based on the selection of the portion of the data items, the system can cause display of one or more options corresponding to one or more of the detected field label-data item pairs. For example, the options could be included in an option menu, which could be one of options 930a, 930b, 930c, or 930d or option menu 926 of FIG. 9 based on detection of a field label-value pair at least partially in a selected portion of a table format (e.g., cell(s), column(s), and/or portion(s) of a textual representation(s)). With respect to FIG. 8F, the option could be option 832 and could read "Extract 'productid'," with 'productid' being contextually generated based on the user selection. In addition, or instead, one of the options could read "Autoextract," and correspond to the autoextract command described above.

It is noted that not all detected field-label value pairs may be suggested with the options. Instead, a subset of detected field-label pairs may be suggested for extraction. Various selection criteria could be employed to choose which detected field-label pairs to suggest for extraction. In some cases, the selection criteria may be based on a number of field label-value pairs that are extractable using the corresponding extraction rule, with one or more detected field label-value pairs corresponding to the top numbers being used for suggestion.

Based on an option of the displayed one or more options being selected, the system can carry out one or more operations associated with the option. In some cases, the operations comprise one or more data items being assigned to one or more fields of the set of events (e.g., a new fields and/or existing fields). The one or more data items can be extracted using the corresponding extraction rule(s) for the one or more of the detected field label-data item pairs that correspond to the option.

At least one of the one or more data items may optionally comprise a value extracted and/or displayed before the option was selected, for example, as part of detecting the at least one field label-value pairs. However, at least one of the one or more data items may optionally comprise a value extracted based on, or responsive to, the selection of the option. For example, as described above, detection of a field label-value pair does not require extraction by the corresponding extraction rule, but could use some heuristic. Another scenario could be that the corresponding extraction rule was only partially executed for detection, for example, until at least one field label-value pair had been extracted. Yet another example is where the option corresponds to a command that extracts field label-value pairs that are identified within more than just the selected portion(s) of the data item(s), such as an entire column, where the user selected a cell or a textual representation of a data item value.

Thus, a user could select the "Extract 'productid'" option described above, and the system could assign only field label-value pairs that include the field label "productid" and any associated extracted values to data items of events as a new field that the system assigns the field label of "productid" (e.g., using a command associated with the selected option). The system may further automatically add a column corresponding to the new data items to the table format, or other format utilized to display events. As another example, a user could select the "Autoextract" option described above, and similar operations may be performed as the Extract 'productid'" option, with additional operations being performed to extract any other field label-value pairs that an autoextract command discovers at least partially in the selected portion(s) of the data item(s).

It is noted that options that are displayed and correspond to one or more of the detected field label-data item pairs need not be displayed in an option menu, or in the same option menu as other options when implemented with search screen 800. In some cases, one or more options may be displayed in a sidebar, such as sidebar 830, as one example. As another example, one or more of options may not be selectable. For example, an option could be displayed as non-selectable dialog, and may be included in a dialog box. The user may select the one or more portions of the events by hovering over a selectable region that corresponds to the one or more portions of the events. If a field label-value pair is detected, the dialog may be presented to the user.

It is further noted that although suggesting field label-value pair extractions could be integrated into a search interface that corresponds to search screen 800, with the set of events being search results described with respect to search screen 800, field label-value pair extractions could be suggested in other contexts, and need to be based on search results. As an example, the suggestions could be provided as part of a configuration interface (or search interface), where an option may be operable to save the corresponding extraction rule(s) (e.g., generated based on the user's selection of events) to a configuration file. In addition, or instead, an option may save the data items extracted with the corresponding extraction rule(s) (e.g., to the configuration file). The configuration file could be used to apply the suggested field label-value pair extractions (e.g., the corresponding extraction rule(s)) to other events than were utilized to generate the suggestions. For example, the configuration file may be loaded for this purpose in a search interface (e.g., in search screen 800). These and other possibilities are contemplated with respect to suggesting field label-value pair extractions.

3.1 Additional Features

FIGS. 12A, 12B, 12C, 12D, 12E, 12F, and 12G (also referred to herein collectively as "FIGS. 12"), show a progression of a search screen in an exemplary search interface through user interaction with a table format in accordance with some implementations of the present disclosure. The progression is in the depicted sequence shown, but at least some of the progression is not shown.

The search interface utilizes the search screen to display one or more events returned as part of a search result set based on a search query. The search interface can correspond to the search interface described with respect to search screen 800 of FIG. 8A. Unless specified, search screen 1200 and the search interface offer similar functionality as search screen 500 and the search interface described above. In particular, the following description if presented to provide additional potential features that can optionally be incorporated into search screen 800 and its corresponding search interface, and not to limit features to certain implementations. As with the description above sections, it should be appreciated that various concepts described below have more general utility than for search interfaces, or for a particular type of search interface. In these respects, various concepts are severable from the particular implementations described herein. As one specific example, although various concepts are described herein with respect to search, many of these concepts are more broadly applicable to queries in general. Thus, while the terms search interface, search screen, search results, search query, and other similar terms are utilized herein, these concepts are more broadly applicable to query interfaces, query screens, query results, and queries. Types of queries include search queries, script queries, and data processing queries.

3.2 Interface Panel

As shown in FIGS. 12, the search screen includes interface panel 1205. In various implementations, interface panel 1205 is purpose-built for assisting users in formulating commands for queries, such as the query corresponding to the search results displayed in table format 1202. In the implementation shown, the query is represented in sidebar 1230, corresponding to command entry list 1208.

Interface panel 1205 is adjacent sidebar 1230 and extends lengthwise along sidebar 1230. However the particular location, size, and relative positioning of interface panel 1205 can vary. For example, interface panel 1205 could extend crosswise in a search screen (e.g., adjacent the top or bottom of the search screen). Furthermore, in the search interface, interface panel 1205 is anchored in its position, but in other implementations could be floating and movable by the user. Additionally, although a single panel is shown, in some cases, functionality of the interface panel could be incorporated into multiple panels, which could be shown concurrently and/or could be independently hidden and unhidden. It should be appreciated that any of the various aspects of interface panel 1205 could be independently configurable by a user.

In the search interface of FIGS. 12, interface panel 1205 is implemented as a panel, by way of example only. In other cases, a window, tab, or other interface mechanism(s) can be employed. A user can selectively hide and unhide interface panel 1205 by selecting form element 1207, which is implemented as a clickable button. For example, FIG. 12D shows interface panel 1205 in a hidden state (e.g., partially or fully hidden) and the remaining ones of FIG. 12 show interface panel 1205 in an unhidden state. Interface panel 1205 could be hidden or unhidden in any of the various FIG. 12 shown. In implementations where the user can hide and unhide interface panel 1205, the user is able to selectively access the various form elements included therein as needed for adding to and/or modifying the search query, as is further described below.

As shown, interface panel 1205 comprises one or more form elements to assist the user in constructing the query. For example, in FIG. 12A, interface panel 1205 includes form elements 1209, in FIG. 12B interface panel 1205 includes form elements 1211, in FIG. 12C interface panel 1205 includes form elements 1213, in FIG. 12E interface panel 1205 includes form elements 1215, in FIG. 12F interface panel 1205 includes form elements 1217, 1219, and 1221, and in FIG. 12G interface panel 1205 includes form elements 1223.

3.3 Interface Templates

From FIG. 12 it should be apparent that the form elements and contents thereof included in interface panel 1205 can change over time based on context to assist the user in interacting with table format 1202. In various implementations, the present disclosure provides for interface templates for populating interface panel 1205. As indicated above interface panel 1205 could be implemented utilizing multiple panels, windows, and/or tabs, and need not be a single panel as shown. Furthermore, at least some interface templates may correspond to one or more dedicated interface panels, windows, and/or tabs.

Each interface template generally comprises instructions for one or more forms. In some implementations, each interface template corresponds to a respective table manipulation action a user may perform on table format 1202. As used herein, a table manipulation action may describe a predefined alteration to the number of rows, columns, and/or cells in a table format and/or the contents thereof that can be achieved by adding one or more commands to a query, such as the search query represented by command entry list 1208.

In some implementations, each option presented to the user through selection of one or more interactive regions (e.g., selectable cells, columns, rows) of the table format can correspond to a table manipulation action and interface template. For example, the options can be the options in option menu 926 or any of the various options described herein. Where an option is instantiated in the search interface, it is done so as instructed by its associated interface template. For example, an interface template can provide instructions that define any of the various features of an option described with respect to FIG. 9, including context for displaying the option based on the selection that prompted option menu 926 (or more generally the list of options).

Further, the interface template for an option defines the overall flow of user interaction with the option. In various implementations, the overall flow of user interaction defined by an interface template extends from the presentation of the option through modification of the query (e.g., through adding one or more commands to the search query based on user selection of the option). In this way, an interface template can define one or more forms and the sequence and/or conditions for presentation of the one or more forms (e.g., whether a form is a form-based option, nested form-based option or any of features of an option). Further, an interface template can define one or more form elements for each of the forms, the number thereof to include in a form, as well as the contents thereof, including potential default contents. Various examples of such contents have been described herein.

Additionally, an interface template can define one or more mappings between form elements and modifications to the query. For example, an interface template may map form elements to one or more command identifiers and/or command elements for one or more commands to add to the query. In doing so, the interface template defines the syntax for the one or more commands. Thus, as has been previous described herein, the one or more commands that are added to the search query may be in proper syntax for the search query, complete with command identifiers and any command elements that are needed or desired for execution of the commands. Thus, the user can perform the table manipulation action associated with the interface template with little to no knowledge of the underlying query language.

Figure 12A:
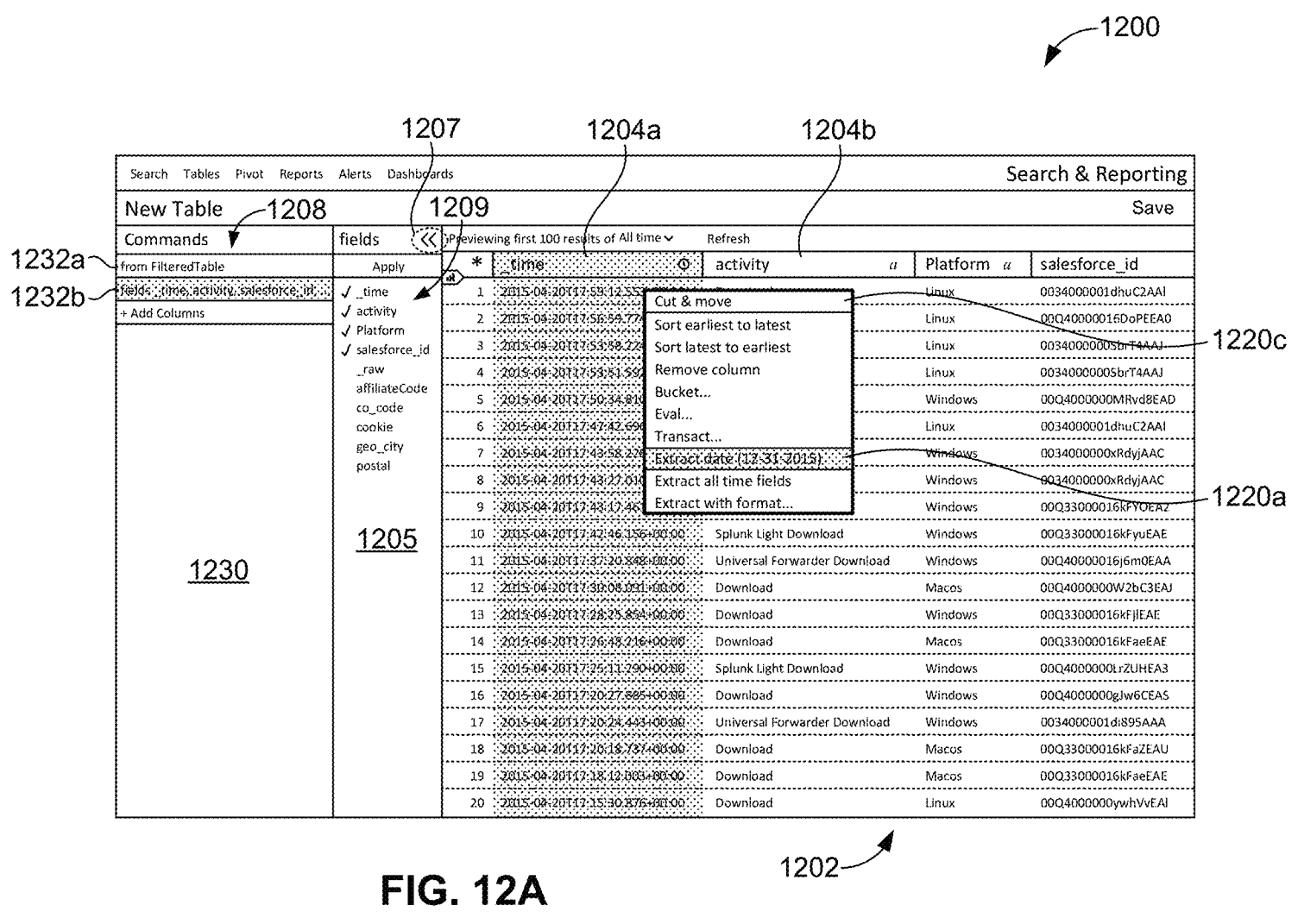
Figure 12B:
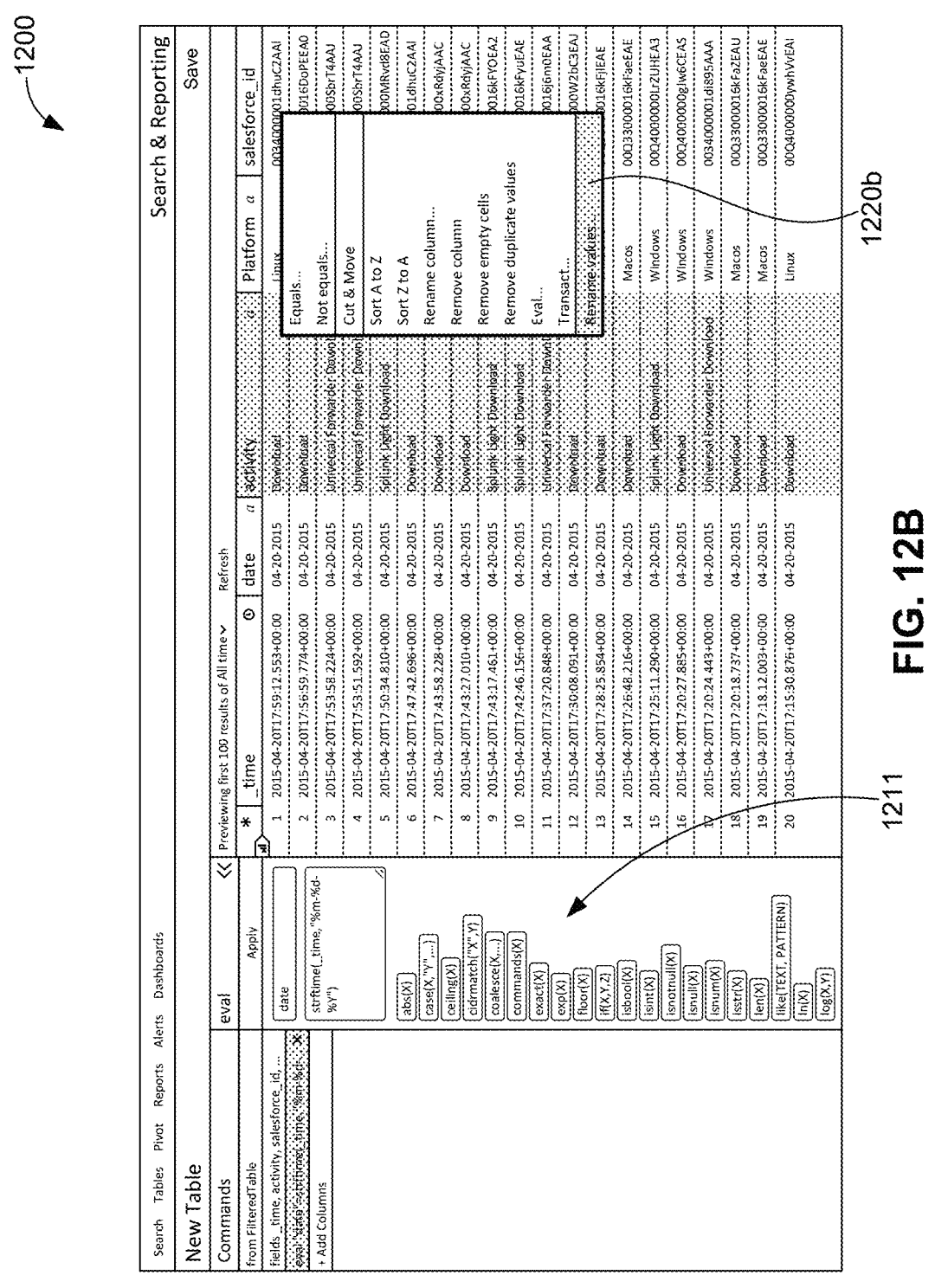

In various implementations, in response to a user selecting an option, the one or more forms defined by the interface template are displayed to the user. For example, in FIGS. 12, the one or more forms are displayed in interface panel 1205. Where a different form is displayed in interface panel 1205, that form may be replaced with the one or more forms. As an example, after selecting option 1220*a* in FIG. 12A, the form comprising form elements 1209 is automatically replaced with a form comprising form elements 1211, as shown in FIG. 12B. As shown, the form elements include a text box comprising an evaluation function labeled "strftime," which is the evaluation function applied by the "eval" command. Below the text box are other form elements that each correspond to a respective evaluation function that is compatible with the "eval" command. The form elements are individually selectable to cause the respective evaluation function to be entered into the text box. In some implementations, the respective evaluation function is provided entered as a syntax template with the function identifier and one or more variables that the user can replace with attribute labels and/or values using the text box. In addition, or instead, the evaluation function entered could be generated based on the data items and/or event attributes corresponding to the interactive region (and optionally the data type) selected by the user to display an option selected to display the form. For example, for a cell selection, the "X" in form elements 1211 could automatically be a value of the data items of the cell when entered into the text box. Generally, one or more values of selected data items or values generated therefrom and/or event attribute identifiers corresponding to the selected data items could be automatically mapped to the evaluation function templates. All of this behavior could be defined by the instructions of an interface template.

Figure 12C:
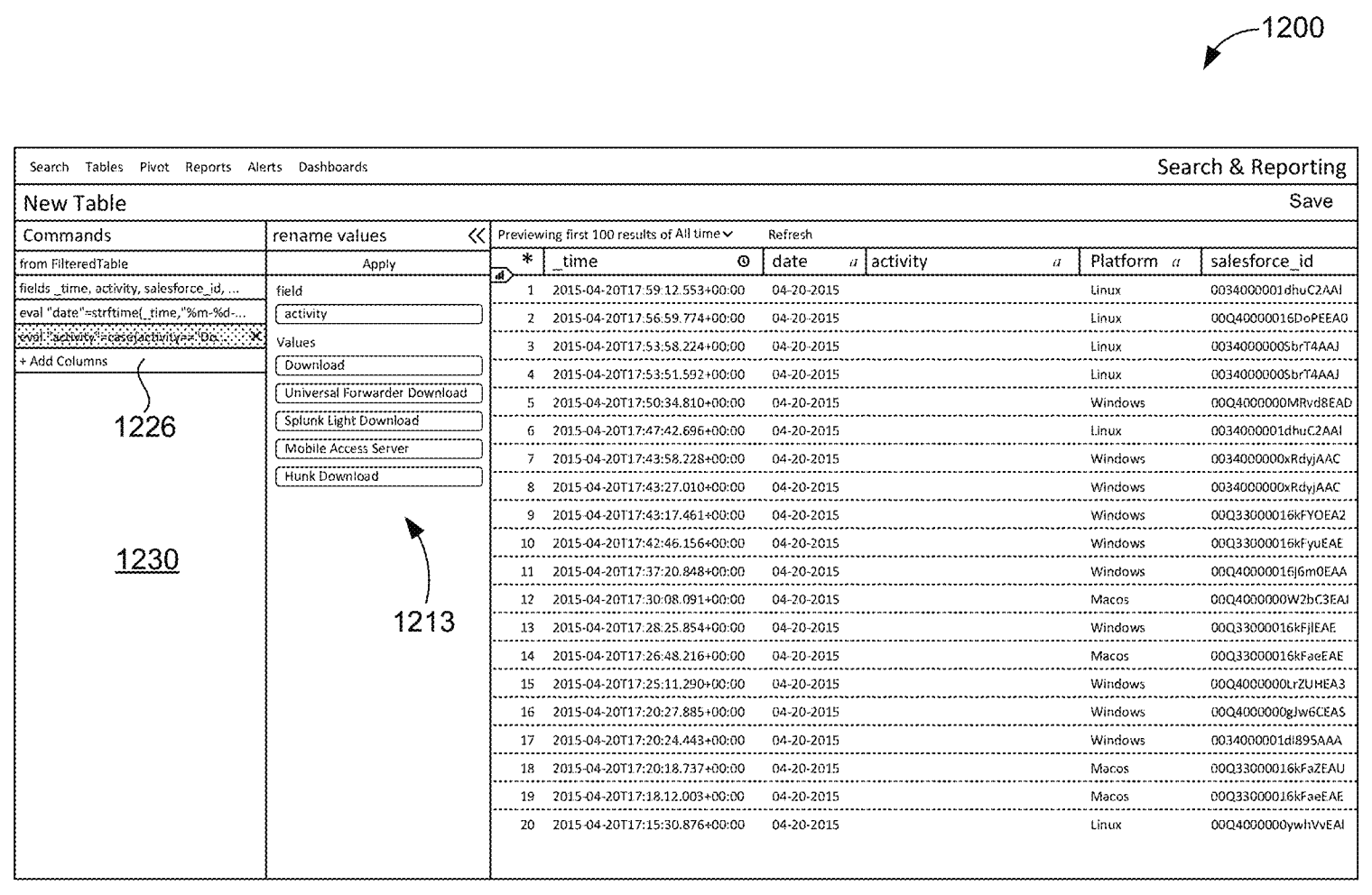

Optionally, an interface template can include instructions for causing display or causing removal of display of the one or more forms defined by the interface template. For example, an interface template may include instructions for unhiding interface panel 1205 based on selection of the option. Other interface templates may not include such instructions. Thus, for example, if interface panel 1205 had been initially hidden in FIG. 12A, the one or more forms defined by the interface template may not be displayed to the user. In contrast, where a user selects option 1220*b* in FIG. 12B, interface panel 1205 may display a form comprising form elements 1213, as shown in FIG. 12C, regardless of whether interface panel 1205 was initially hidden in FIG. 12B by automatically unhiding interface panel 1205 based on selection of option 1220*b* when interface panel 1205 is hidden.

Automatically unhiding interface panel 1205 and/or displaying the form can be beneficial, for example, where user input is desired for constructing the one or more commands to add to the query. One such example could be, for option 1220*b*, corresponding to a "rename values option" that enables a user to specify new values for particular values of event attributes in table format 1202. Each form element comprises a text box having a default value generated from a respective value of an event attribute selected based on an analysis of the selected column (or in other cases cell or combinations thereof). In some cases, each value can be included in the form with a respective form element. Other approaches include selecting a subset of the values, such as the top five values and/or presenting a dropdown list of any of the various values in the selection portion of the table format for a particular text box. In order to change the values, the initial values are displayed to the user and the user is able to define replacement values for the displayed default values via input into the form elements. By clicking the apply button, the query is updated to carry out the table manipulation action. For example, the one or more commands are automatically constructed and/or updated to carry to rename the values in in the selected event attribute. As shown, the event attribute is automatically detected based on the user selection of the column that corresponds to the event attribute. The event attribute can automatically be included as a command element in a command to specify which event attribute should have its values renamed. An example of the command that may be generated by the system is: "activity"=case (activity="Download", "Enterprise", activity="Universal Forwarder Download", "Universal Forwarder", activity="Splunk Light Download", "Splunk Light", activity="Mobile Access Server", "Mobile Access Server", activity="Hunk Download", "Hunk"). It will be appreciated that all of the foregoing may be specified by the interface template.

In further respects, in addition to or instead of each option corresponding to a table manipulation action and interface template, each command entry may correspond to a table manipulation action and interface template. For example, FIG. 12 shows command entry list 1208, which can correspond to command entry lists 808, 1008*a*, and 1008*b*, described above. In various implementations, each command entry list can be selected to cause one or more forms to be displayed, as instructed by an interface template. In some cases, a user selects a command entry so as to access one or more forms for modifying the one or more commands represented by the command entry. As an example, a user may select a command entry by clicking on the command entry or a portion thereof. Clicking on a command entry may be similar to clicking on an option in the option menu, as described above. In particular, one or more forms may be displayed in a similar manner. The form elements of the one or more forms can be populated with at least a portion of the one or more commands represented by the command entry, such as one or more command elements. Further the one or more commands can be modify by the user via input to the one or more form elements. Also similar to an option, the one or more forms may be displayed in interface panel 215. This behavior can be defined by an interface template.

Furthermore, for the purpose of displaying the one or more forms of the interface template, in some cases, only one command entry may be selected at a single time. Selecting one command entry may automatically deselect the currently selected command entry and update the displayed form. When interface panel 215 is hidden upon selection, the form may remain hidden until being unhidden by the user.

In addition to or instead of selecting a command entry directly, a command entry may be automatically and indirectly selected based on a user selecting a corresponding option, such as one of the options in an option menu. More particularly, selection of an option may cause a corresponding command entry to be added to command entry list 1208 (e.g., to the bottom of the list) representative of the one or more commands added to the query. Additionally, adding the command entry may coincide with the command being selected in command entry list 1208. Thus, a single interface template may correspond to both an option and a command entry that may be created as part of the interface template. In some cases, there is a one-to-one correspondence between an option and a command entry. Furthermore, there may be a one-to-one correspondence between a command entry and a command represented by the command entry (i.e., one command per command entry).

In various implementations, selection of a command entry in the command entry list causes the one or more forms of the interface template to be displayed in the same state as when the user completed previous interaction with the forms of the associated interface template. Thus, the previous form may be displayed to reflect the various user input into the form elements, such as user selections and user entered text. In this way, the user can go back to the forms via the commend entry as needed to modify the one or more commands using the same forms and/or information entered by the user. It should be appreciated that the one or more forms may or may not be the forms used to initially generate the one or more commands after selection of a corresponding option.

In various implementations, the current state of the various forms accessed in FIG. 12 can be stored as metadata. For example, the metadata may be saved in association with a saved pipeline (which may also be referred to as a data object, a search object, or a query object). In the example of FIG. 12, this saved pipeline may correspond to saved pipeline label 1104c in FIG. 11 that reads "MyReport." Where a user loads the saved pipeline into a search interface, such as by selecting edit pipeline link 1108c, the associated metadata may be loaded as well and the search interface can be configured as instructed by the metadata. Thus, the user can continue interacting with the query where the user left off at save time. Saving and loading the metadata can be useful for various reasons. One benefit is that the system can save and reuse relevant information about a query or query session that is not obtainable from the query itself. Another benefit is even where the information is obtainable from the query, the system does not need to process the query to extract the information or be coded to perform such complex extraction.

Other metadata that can optionally be saved in association with a pipeline include modifications made by the user to table formatting. As an example, the user may rearrange the ordering of the displayed columns in table format 1202. Column format metadata can describe the ordering of columns such that it is preserved when the saved pipeline is later accessed. In FIG. 12A, option 1220c may be used to reorder a column. Option 1220c does not cause one or more commands to be added to the query. Instead, option 1220c causes the metadata to reflect the ordering of the columns as modified by the user based on selecting the option. Using option 1220c, the user may place column 1204a where desired, such as by swapping places with column 1204b. As a further example, column format metadata can capture column widths that the user may modify for any of the various columns, for example, by dragging column dividers. Other optional column formatting metadata include column data types and/or column names. This and other table formatting may be stored in the metadata.

Also, as described above in section 2.6 a query of a saved pipeline may be dependent on one or more other queries that each may be saved as a respective saved pipeline. The metadata of each saved pipeline may correspond to the portion of the query that was composed for and saved to the saved pipeline (e.g., the extended portion or an input portion) and loading of the query using the saved pipeline could optionally load the metadata (or portions thereof) of each saved pipeline from which is depends. In some cases, a saved pipeline includes at least one link to a saved pipeline from which it depends. As an example, a saved pipeline may include a link to the saved pipeline it extended, such that a chain of links may be formed amongst saved pipelines back to an initial input pipeline. The chain of links can be used to sequentially load the chain of saved pipelines starting from the initial input pipeline and optionally the metadata associated with the respective saved pipeline. However, it is noted that this is one example and the metadata need not be saved with respect to a particular portion of the query or otherwise be specific to a saved pipeline.

3.4 SUPPLEMENTAL EVENT ATTRIBUTES IN A TABLE FORMAT

In various implementations, the present disclosure relates to adding supplemental event attributes to a table format that includes event attributes from a query. In particular, one or more supplemental event attributes, and data items corresponding to the one or more supplemental event attributes can be added to the table format in one or more corresponding supplemental columns. The data items of supplemental event attributes (i.e., supplemental data items) are incorporated into the table format and are from at least one source external to the initial query. In particular, the supplemental data items are included in events that correspond to results of the initial query. In doing so, the user is able to utilize the table format to interact with data items corresponding to the initial query along with the supplemental data items. For example, table manipulation actions available to the user through interactions with supplemental data items and supplemental event attributes may be indistinguishable from their counterparts that correspond to the initial query. Thus, the user can continue interacting with the table format without concern for the source of the data items.

The supplemental data items for a supplemental event attribute can be defined by a data object. In particular, a data object may define potential data items for one or more event attributes for the events. In some cases, the potential data items are statically defined, such as in one or more a table files. For example, the potential data items and optionally event attributes may be statically defined in a table definition file, such as a comma-separated values (CSV) file, a keyhole markup language (KML) file, an extensible markup language (XML) file, or generally any file or format that represents values for the potential data items.

In other cases, the potential data items are dynamically defined by one or more instructions that are executable to derive potential data items and/or event attributes for the table format. One example of a dynamic definition includes a query, such as a search query, that can be executed (by the system or externally) to produce the potential data items and/or event attributes. As an example, a data object comprising a dynamic definition could correspond to one of the saved pipelines represented in FIG. 11. The system could retrieve potential data items and/or event attributes as query results. However, the executable instructions need not include a query. Examples of instructions include a script, query, code, and/or binary executable that can provide the potential data items and/or event attributes.

The data utilized to produce supplemental data items based on static definitions and/or dynamic definitions can be stored within the system and/or external to the system. In various implementations, the definitions can specify a location for the system to access the data. A location can comprise a uniform resource identifier (URI), an internet protocol (IP) address, a domain, a file system path, or other information defining a location to access the data.

In some respects, the system can be used to create and/or preconfigure data objects for providing supplemental event attributes to a table format by a user. For example, the user can configure a data object and the potential data items and/or event attributes defined by the data object that may be added to the table format in a user interface. In some cases, the user could define a subset of available potential data items and/or event attributes that can be added to a table format using the data object. Data objects may further be assigned permissions, owners, and/or associated applications to determine which users and/or applications (e.g., a search or query application) are able to access and modify data objects.

3.5 Accessing Data Objects to Add Columns to a Table Format

Figure 12F:
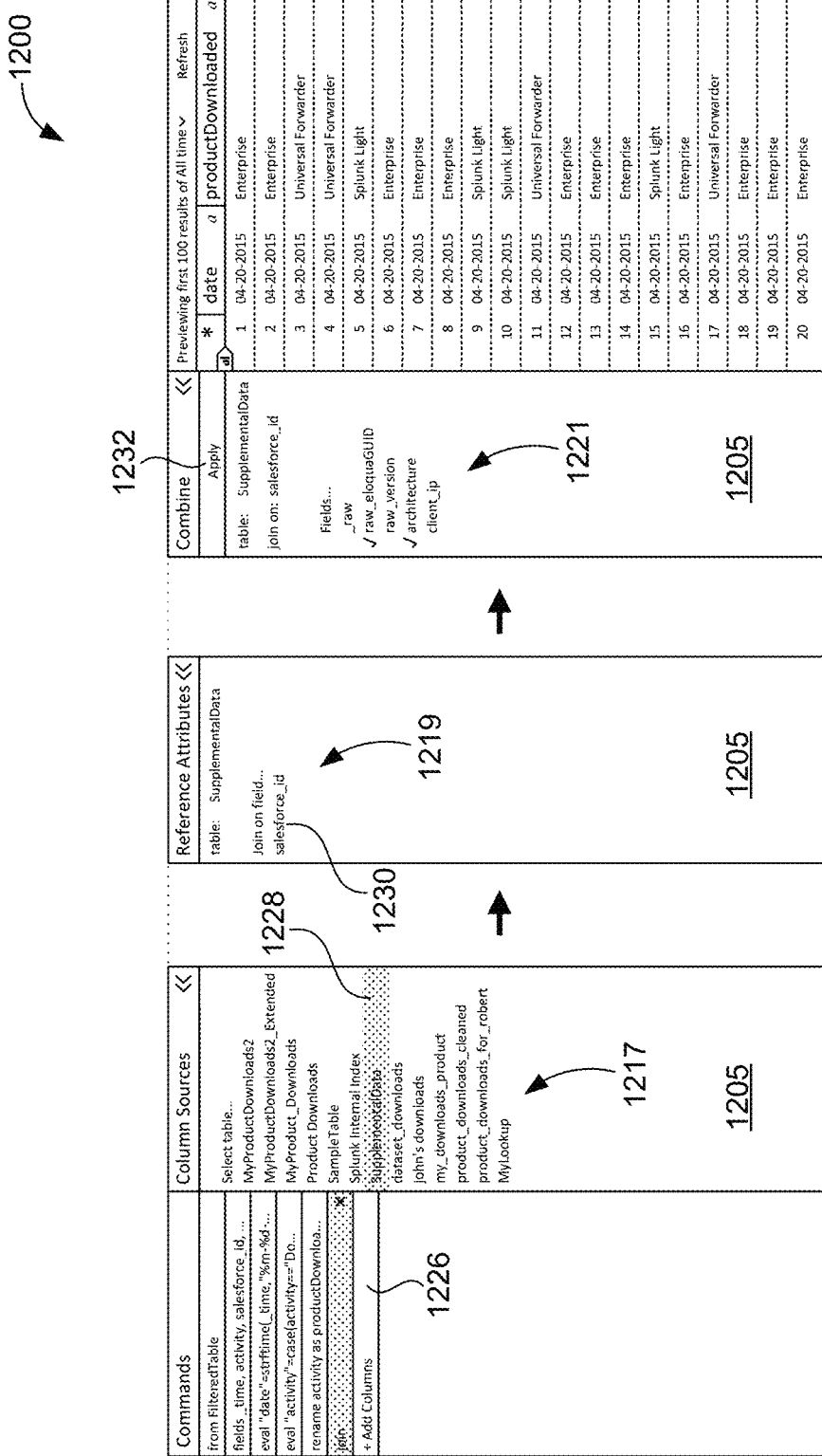
FIG. 12F illustrates a search screen in accordance with the disclosed embodiments.

Other users can access the preconfigured data objects in the search interface subject to their configurations so as to add supplemental data items therefrom to a table format. Referring to FIG. 12F, an exemplary interface for adding supplemental event attributes to table format 1202 is shown. By way of example, a user may initiate adding supplemental event attributes to table format 1202 by selecting option 1226, which can be a button in sidebar 1230, as shown. However, there are many ways the option could be presented, such as in an option menu (e.g., option menu 926) and/or contextually.

Option 1231 corresponds to an interface template, which in response to selection by the user, causes display of one or more forms in the search interface (e.g., in interface panel 1205). As shown in FIG. 12F, one of those forms includes a list of data objects (e.g., preconfigured data objects) available as sources of supplemental event attributes to table format 1202. The system may include additional data objects, but optionally, the data objects shown are listed based on the present user having permission to access the data objects.

For the present example, assume the user selects link 1228 (or option) corresponding to the data item labeled "SupplementalData" from form elements 1217. In response, another form of the interface template is optionally presented to the user (e.g., in interface panel 1205) along with a list of reference event attributes that can be used by the system to add supplemental event attributes from the selected data object. The list of reference event attributes correspond to event attributes of events in the table format. A reference event attribute represents an event attribute of the events to use as a reference for selecting supplemental data items to add to the table format.

How a reference event attribute is used as a reference depends on the combination type used for adding the supplemental data items to the table format. Various combination types may be employed, such as a lookup, a join, an inner join, an outer join, a left outer join, a right outer join, a full outer join, a natural join, or a merge. A lookup can lookup values of the data items of the events in the reference event attribute and assign the results of the lookup to the events as one or more supplemental event attributes. As indicated above, a lookup can be defined by the data object selected by the user. In cases where potential data items are statically defined, a static lookup table may be employed. In cases, potential data items are dynamically defined, the data object can provide transforms for producing supplemental data items for the table format from the values of the reference data items.

As another example, a join may utilize the reference event attribute as a foreign key for the join. However, as the join is not performed on relational data, but instead query results, there is no true foreign key relationship established between the data sets that are joined. For example, a join may combine the query results of the query with query results of a subquery (e.g., a saved pipeline) (e.g., if specified event attributes are common to each). As another example, a join may combine the query results with relational data, such as a relational database table. In these cases, the system may match event attributes to columns of relational database tables.

Thus, supplemental event attributes may be added to query results of the table format from relational database tables and/or query results. However, depending on the combination type being employed, certain event attributes may not be suitable for serving as a reference event attribute. As an example, for a join, the data object may not define any suitable event attribute for combination with one or more of the event attributes of query results. In some respects, the system analyzes the event attributes of the query results and/or the potential event attributes defined by the data object to identify those that are suitable for the particular combination type.

For a join, the system could analyze attribute labels of attributes (e.g., relational or late-binding) and/or values thereof (e.g., of relational values or of data items) to determine whether a particular attribute matches one or more event attributes in the query results displayed in the table format (e.g., could serve as a foreign key for a join). Various factors may be employed, alone or in combination, to identify one or more reference event attributes based on comparisons between event attributes of the query results and attributes defined by a data object. In some cases, a score may be generated (optionally for each factor to create an aggregate score) that quantifies a likelihood that an event attribute of the query results should be used as a reference event attribute. However, certain factors alone may be sufficient for qualifying an event attribute as a reference event attribute. One example is where an attribute label of the event attribute is identical to an attribute label defined by a data object. However, in other cases, a similarity score could be generated.

Another potential factor relates to a similarity between values of the data items of the event attribute of the query results and values of the attribute defined by the data item. For example, where the system determines the values of the same data type or substantially the same data type (e.g., categorical or numerical), the system increases the confidence that the event attribute could serve as a reference event attribute. In addition, or instead, the system may analyze similarities in the information type being represented by the data items. For example, the system may determine that both attributes represent e-mail address, phone numbers, IP addresses, and/or URLs. The more similar the information types, the higher confidence the system can have that the event attribute could serve as a reference event attribute. The system could further identify matches between particular values from each the attributes. The more matches (e.g., exact or substantial matches), the more likely the event attribute should be used as a reference event attribute.

The list of reference event attributes shown with respect to form elements 1219 in FIG. 12F include one or more reference event attributes, potentially identified and/or selected by the system as described above. In the example, shown, only the event attribute having the attribute label salesforce_id displayed in the table format was selected as an event attribute. For example, the event attribute may have been selected by the system based on the data object SupplementalData comprising salesforce_id in an attribute label. Different or additional event attributes could have been presented in the list had the system identified those as reference event attributes. For example, the system may have selected from event attributes corresponding to _time, date, productDownloaded, Platform, and salesforce_id, shown in FIG. 12E. The event attributes may have been selected from based on being displayed in the table format. Optionally, the system may also select from event attributes that are not displayed in the table format, but are still associated with the events in the table format.

The user can select one or more of the displayed reference event attributes for the combination with the data object. In response to the user selecting, for example, salesforce_id in FIG. 12, the system another form of the interface template is optionally presented to the user (e.g., in interface panel 1205) along with a list of supplemental event attributes that can be used by the system to add supplemental data items from the selected data object using the selected reference event attribute(s). The system can identify one or more supplemental event attributes from the data object based on the reference event attribute(s) selected by the user. In particular, the supplemental event attributes can correspond to event attributes that can be incorporated into query results corresponding to the query based on a selected reference event attribute (e.g., for a given combination type). Referring to FIG. 13 with FIG. 12F, FIG. 13 shows an exemplary search screen 1300 in accordance with disclosed embodiments. The search interface comprises the saved pipeline corresponding to the SupplementalData data object selected by the user in FIG. 12F. Based on the user selecting a reference event attribute corresponding salesforce_id, the system can identify supplemental event attributes having attribute labels raw_eloquaGUID, raw_version, architecture, and client_ip from the data object as candidates for the combination. A supplemental event attribute corresponding to salesforce_id is excluded based on the user selecting a corresponding reference event attribute.

As indicated with respect to form elements 1221, the user has selected supplemental event attributes corresponding to raw_eloquaGUID and architecture for adding to the table format. Based on the user selecting the supplemental event attributes, the supplemental event attributes are added to the table format. For example, the adding may be in response to the user selecting apply button 1232.

Figure 12G:
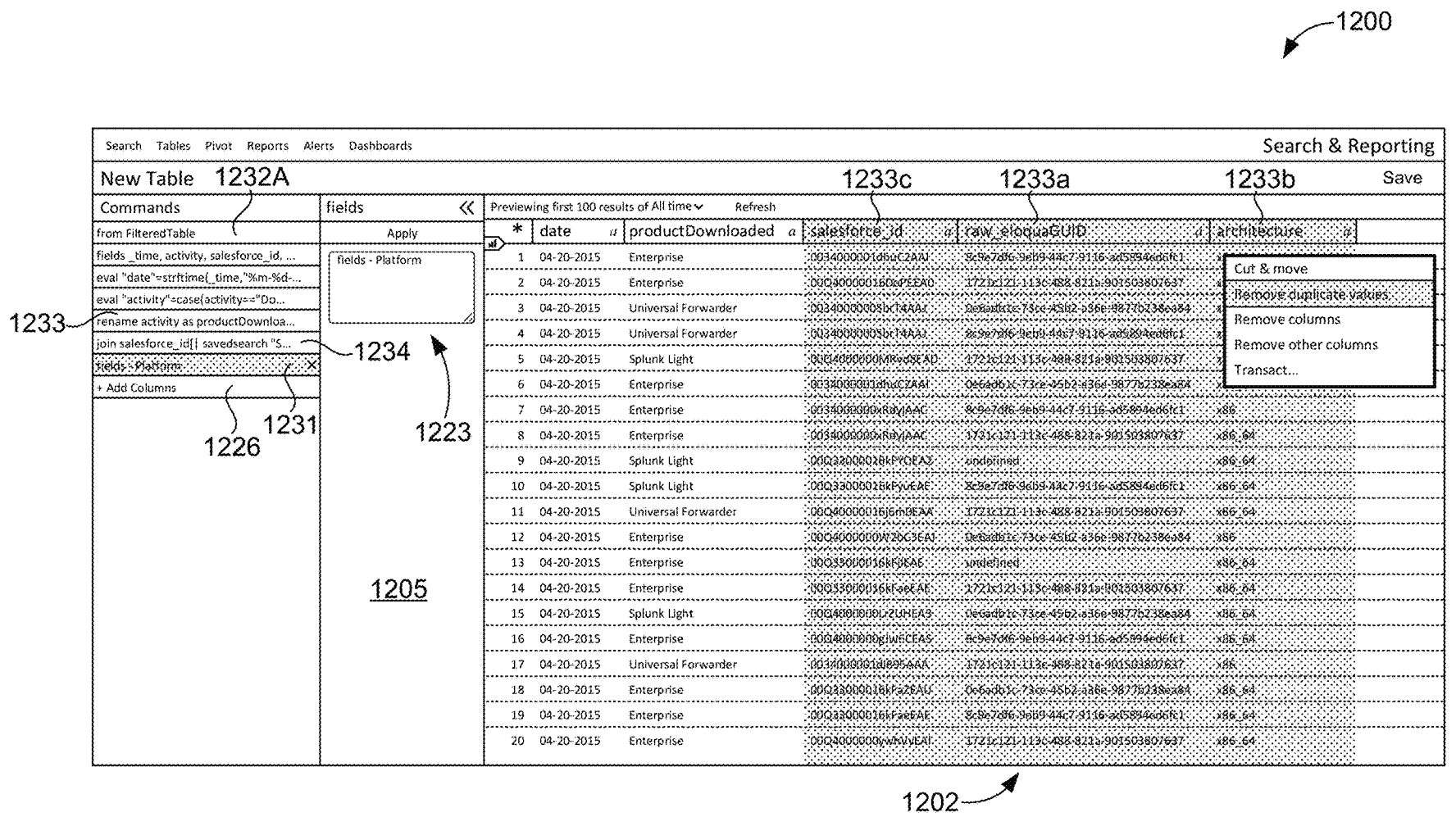

FIG. 12G shows supplemental columns 1233a and 1233b added to table format 1202 in response to the user selecting the supplemental event attributes using form elements 1221. The table format is caused to be updated to include supplemental columns 1233a and 1233b corresponding to the supplemental event attributes selected by the user using form elements 1221 and populated with the potential data items defined by the selected data object as supplemental data items. Had the user only selected raw_eloquaGUID, only supplemental column 1233a would have been displayed. Further, additional supplemental columns would be displayed had the user selected additional supplemental event attributes.

In further respects, a supplemental column may be added to the table format based on metadata corresponding to the attribute of the supplemental column associated with the data object. In particular, each data object can be preconfigured with metadata, such as has been described above with respect to search screen 1200. For attributes corresponding to supplemental columns added to the table format, corresponding column format metadata can be incorporated into the table format. Thus, the supplemental columns can be added based on the column width and column ordering corresponding to the attributes. The same widths and column ordering may be used, with each column being added to one side of the existing columns in the table format, as shown. The extracted metadata may optionally be stored in association with one or more commands (e.g., a command entry) used to cause the column to be added and may supplement metadata describing the previous state of the table.

Also shown, FIG. 12G, similar to other options described above, selecting the option caused a command entry a corresponding command entry (command entry 1234) to be added to command entry list 1208. Thus, it should be appreciated that the interface template could have any of the various features previous described for interface templates. For example, selecting the option can cause one or more commands to be added to the search query to execute the selected combination. Further, the user can select command entry 1234 to cause the form corresponding to form elements 1221 to reappear where the user may reselect supplemental event attributes. Further the user can optionally navigate back through the forms of the interface template and change any of the various selections made. The updated selections can automatically be reflected in the displayed table format (e.g., based on the user selecting apply button 1232 to apply the updated selections). Similar to other command entries, the command entry and one or more commands represented by the command entry can be automatically updated to correspond to updated selections made by the user.

The presence of at least one supplemental event attribute indicates to the system that potential data items exist for the table format in a data object. However, in other cases, no supplemental event attributes may be identified for a data object. Thus, the system may refrain from presenting the particular data object to the user using the interface template. For example, the system could identity all potential reference event attributes for the data object (e.g., for a given combination type) and determine whether at least one supplemental event attribute exists for the table format based on the potential reference event attributes. Data objects may be excluded from form elements 1217 where the system is unable to identify at least one supplemental data item for that data object. Thus, in some cases, whether a data object is presented to the user in form elements 1217 is based on the identification of one or more supplemental event attributes for the table format from the data object.

Having added the supplemental columns to the table format, the user can continue to perform table manipulation actions of the table format. To this effect, the supplemental event attributes and data items thereof may be treated identically from the perspective of the user's interactions with the table format. Thus, the user need not be concerned with the source of the data items displayed in the table format. For example, as shown in FIG. 12Q the user has selected interactive regions corresponding to columns 1233a, 1233b, and 1233c. Despite columns 1233a and 1233b being supplemental columns, the same option menu and options are displayed based on the selection as would have been displayed had each column been based on the source of the initial query.

As indicated above, various combination types may be available for adding supplemental event attributes to the table format. However, some users may not be familiar with the differences between the combination types. Furthermore, the some users may be unfamiliar with the particular syntax for the combination types, which could be significantly different per combination type. In various implementations, using the interface template corresponding to option 1226, the user is able to add supplemental event attributes to the table format without extensive knowledge of the combination types and/or query language. From the user's perspective, the user may be selecting available columns of data to add to the columns in the table format, with the system managing the underlying complexities of identifying and combing data sets, which can be from vastly different sources, such as query results, late-binding schema data, relational data, lookup tables, and the like.

In some implementations, different data objects correspond to different combination types. For example, one data object may be for a join and another may be for a lookup. This information may optionally be preconfigured in metadata of the data objects by the user and/or the system. For example, saved pipelines may be suitable for joins whereas lookup tables may be suitable for lookups. The suitable reference event attributes and/or supplemental event attributes can optionally be identified and/or selected based on these combination types automatically, such that the user need not be concerned with differences between the combination types. Thus, with respect to format elements 1217, SupplementData could correspond to a join whereas MyLookup could correspond to a lookup. The user may be presented with a similar interface for selection of either data object and a suitable command(s) will be generated by the system for the query.

It will be appreciated that in some cases, the system could allow the user to select the desired combination type. For example, prior to the form comprising form elements 1217, the user could be offered to select the combination type and the data objects in form elements 1217 may be based on the selected combination type.

3.6 Selecting Command Entries to View Corresponding Query Results

As indicated above, in various implementations, a user may select a command entry in a command entry list to view query results corresponding to the selected command entry. In particular, the user may select a command entry to specify an endpoint in the query represented by the command entry list. By selecting an endpoint, the query results displayed in the table format are caused to correspond to the commands of the query up to the endpoint. In some implementations, by selecting a command entry, the endpoint is specified as being directly after the one or more commands represented by the selected command entry. Thus, for example, a user may select command entry 1233 in FIG. 12G to specify the "join" command as the endpoint.

It should be appreciated that each command entry in the command entry list may be similarly selectable to achieve a similar result for the one or more commands it represents. Further, when command entries are added to the command entry list, those command entries are also selectable. A command entry may be selected, for example, by clicking on the command entry in the command entry list. By selecting a command entry the query results displayed in the table format may optionally be automatically updated to correspond to the query up to the specified endpoint. Thus, the user can view the progression of the query results and by selecting the various command entries in the command entry list without losing subsequent commands of the query. It is noted that selecting a command entry typically automatically deselects the previously selected query. Furthermore, when a command entry is added to the command entry list, in some cases, the command entry becomes automatically selected.

In some cases, when the query results are updated to correspond to the query up to the endpoint, the corresponding commands of the query are executed to update the query results. By way of example, by selecting command entry 1233 in FIG. 12G, the table format may look similar to what is shown in FIG. 12E (although if commands of the query are completely re-executed, the events in the query results could differ). It is noted that the command entry list may still look as it does in FIG. 12G except that command entry 1233 could be grayed out instead of command entry 1231 to visually indicate the currently selected command entry to the user. By subsequently reselecting command entry 1231, search screen 1200 would look similar to how it does in FIG. 12G.

In further respects, the user may optionally be permitted to interact with the displayed query results corresponding to the query up to the endpoint to insert one or more commands into the query directly after the endpoint, and to insert one or more command entries that represent the one or more commands directly after the selected command entry in the command entry list. For example, the user may select interactive regions (e.g., cells, columns, text) of the table format to add one or more commands to the query as has been described throughout the application.

In some cases, the user may optionally be precluded to interact with the displayed query results where the query results do not correspond to the entire query. Also, as one example, the selection of prior command entries in the command entry list may be utilized to preview prior states of the query results (e.g., without completely re-executing the commands). In some cases, the prior states of the query results could be saved with respect to a corresponding command entry so that the commands need not be completely re-executed on the data sources. However, at least some of the commands may be executed as needed to accurately portray the query results (e.g., after inserting a command entry and/or modifying one or more commands thereof).

It is also noted that in the present implementation, selecting a command entry displays a corresponding form allowing the user to modify the one or more commands represented by the selected command entry using one or more form elements of the form. As has been described previously, this form could be the same form displayed to the user when the one or more commands where adding to the query or modified in the query.

It is further noted that in some implementations, metadata can be stored with respect to a particular command of the query and/or command entry. For example, a state of the search interface can be saved to each command entry that represents the state when the command entry was previously selected (e.g., first added and/or last modified). The state in the metadata can include the column formatting (e.g., column widths, data types, orderings, and/or names) for each column in the table and optionally other information such as user input into one or more forms corresponding to the command entry. Thus, for example, when a new command entry is selected, the metadata of the command entry can be loaded into the table. Furthermore, any changes made while the command entry is selected can be reflected in the metadata of the command entry. In some cases, one or more changes are propagated to the metadata of one or more other command entries (e.g., each subsequent command entry in the list). As an example, column width and/or data types of columns may be propagated to the metadata. In some implementations, a change to column names may be propagated through the subsequent commands of the query. For example, a column name may comprise an attribute label and commands may reference event attributes by their attribute label. Thus, changing an attribute label may results in the references being automatically updated with the changed attribute label.

While the present example is given with respect to the table format of FIG. 12G, the query results need not be displayed in a table format, or could be displayed in a different table format than described with respect to search screen 1200. In particular, it is emphasized that this concept may be implemented in any of the query interfaces described herein, or in other interfaces.

3.7 Integrating Multiple Query Interfaces

The present application has described multiple search screens, which can correspond to different query interfaces. For example, the present application has described search screens 600, 800, 1200, and 1300. The various query interfaces offer different feature sets and may be more suitable for different types of interactions based on those differences. For example, the search interface corresponding to search screen 600 may be more suitable for filtering query results based on specified event attributes and/or values for the query results. The search interface corresponding to search screen 1200 may be more suitable for identifying specific information in filtered query results. For these and other reasons, including personal preferences, users may desire to utilize the different query interfaces for different purposes. In some respects, the present disclosure relates to integrating query interfaces, such that users can maintain progress made on constructing a query in one query interface in another query interface. Thus, users can construct various portions of the query in different query interfaces depending on their particular needs.

In some implementations, a query previously saved and/or constructed using the search interface corresponding to search screen 1200 (or search screens 800 or 1300) may be used as an input to the search interface corresponding to search screen 600. For example, as described above, in response to a user selecting a use as input link in FIG. 11, the system may cause the corresponding pipeline of the pipeline entry to be loaded as an input pipeline for an existing search query, or as a basis for a new pipeline that may be created based on the input pipeline. By selecting use as input link 1106d, for example, a saved pipeline corresponding to command of the query constructed in search screen 1300 of FIG. 13 could be loaded into an interface for creating and/or modifying a search query that builds on, or extends, the saved pipeline. As shown, the user selecting (e.g., clicking on) use as input link 1106d causes use as input links 1107a and 1107b to be displayed. The user selecting (e.g., clicking on) edit pipeline 1108d causes edit pipeline links 1109a and 1109b to be displayed. Alternatively any of these links may be directly accessible from the pipeline entry, may be accessible from a different screen and/or interface, or may not be included. It is also noted that one or more of the links may not be included in a pipeline entry, or may be grayed out depending on permissions associated with the user attempting to access the saved pipeline. Each pipeline entry in selection interface 1100 can optionally comprise similar links offering similar functionality as pipeline entry 1102c for the save pipeline corresponding to that entry.

Exemplary functionality of "edit pipeline" links has been described above. A primary distinction between edit pipeline 1109a and edit pipeline link 1109b is the query interface the saved pipeline is loaded into in response to a user selection of the link. The user can select edit pipeline link 1109a, which reads "Edit in Table," to use the saved pipeline as an input to the search interface corresponding to search screen 1200. In response to selecting the link, the system may, for example, automatically load the saved pipeline into the search interface corresponding search screen 1200 and display search screen 1200 to the user. The user can select edit pipeline link 1109b, which reads "Edit in Search" to use the saved pipeline as an input to the search interface corresponding to search screen 600 and display search screen 600 to the user. In response to selecting the link, the system may, for example, automatically load the saved pipeline into the search interface corresponding to search screen 600 and display search screen 600 to the user.

It is noted that in various implementations, loading a saved pipeline using an edit pipeline link loads the metadata stored in association with the saved pipeline. The metadata can be used to restore the editing session to its previous state in the search interface. Thus, it should be appreciated that metadata associated with a data object can include any information necessary to restore a corresponding editing session. FIG. 13 shows search screen 1300 of a search interface, which can correspond to search screen 1200. Assume the user constructs a query using the search interface and saves the state of the editing session, for example, by selecting save option 1352. The save option can be used to selectively save the pipeline as a new data object or overwrite a previous data object.

Saving a new pipeline can cause the pipeline to be displayed in selection interface 1100 of FIG. 11. Selecting edit pipeline link 1109a restores the state of the editing session to search screen 1300. Thus, the search screen may appear substantially as it did in the table format when the query was initially constructed and form elements of the forms may include input provided in the previous editing session (e.g., by loading form metadata, table formatting metadata, and/or command entry list metadata).

It is further noted that selecting edit pipeline 1109b can similarly function to restore the state of an editing session in a search interface corresponding to search screen 600. Furthermore search screen 600 may optionally include a save option. Care may be taken to allow for accessing saved pipelines where an editing session was saved in one search interface and editing is resumed in a different search interface. As an alternative, such behavior may be prohibited. In some implementations, to simplify the handling of metadata, edit pipeline links may not be offered for the search interface corresponding to search screen 600 (at least for queries constructed in the search interface of search screen 1300). Instead, the user may use that search interface to create new queries or extend saved queries.

Exemplary functionality of "use as input" links has been described above. For example, the user may be unable to modify and/or view the input query in the search interface, which could depend on permissions associated with the user. A primary distinction between use as input link 1107a and use as input link 1107b is the query interface the saved pipeline is loaded into in response to a user selection of the link. The user can select use as input link 1107a, which reads "Extend in Table," to use the saved pipeline as an input to the search interface corresponding to search screen 1200. In response to selecting the link, the system may, for example, automatically load the saved pipeline into the search interface corresponding search screen 1200 and display search screen 1200 to the user.

FIG. 12A is an example of a search screen resulting from a user selecting an "Extend in Table" link for pipeline entry 1102*d*. As shown, in some implementations, the user selecting to load a saved pipeline causes the previously query constructed to be utilized as an input query to the current query interface. Exemplary loading of an input search query has previously been described above with respect to FIG. 10. For example, command entry 1232*a* can correspond to command entry 1040*a* in FIG. 10. Furthermore, command entry 1232*b* may optionally automatically be presented to the user to allow the user to remove event attributes from query results corresponding to the input query as desired. In the example shown, the user has selected to remove each unselected event attribute corresponding to form elements 1209. Initially those event attributes may have been displayed in the table format. It is noted that at least some of the metadata of the previously saved editing session may be loaded based upon selection of the extend pipeline link. For example, the table formatting metadata can be loaded and applied to the table format. Thus, table format 1202 may appear substantially as it did to the previous editor of the table format. In some cases, form metadata is excluded from the loaded search interface. Thus user can continue to edit the input query and may save the extended pipeline as a new pipeline.

In FIG. 11, the user can select use as input link 1107*b*, which reads "Extend in Search" to use the saved pipeline as an input to the search interface corresponding to search screen 600 and display search screen 600 to the user. In response to selecting the link, the system may, for example, automatically load the saved pipeline into the search interface corresponding to search screen 600 and display search screen 600 to the user.

Figure 14A:
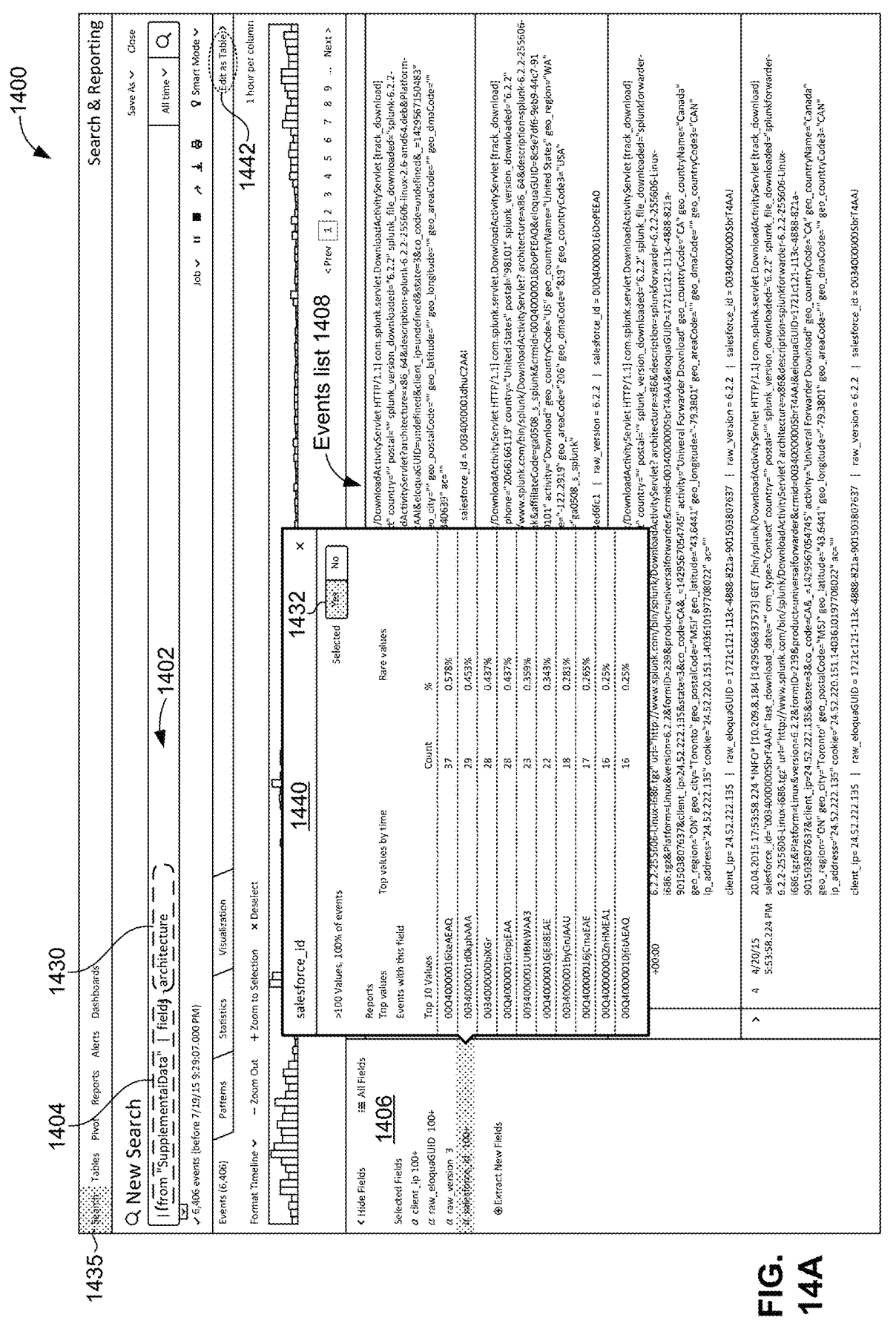

Referring to FIG. 14A, FIG. 14A illustrates search screen 1400 in accordance with the disclosed embodiments. Search screen 1400 can correspond to search screen 600 of FIG. 6A. In response to the user selecting use as input link 1107*b*, the saved pipeline (e.g., data object) corresponding to pipeline entry 1102*c* is loaded into the search interface. For example, the user can use search bar 1402 corresponding to search bar 602 in FIG. 6A to extend the previously constructed query. The input query corresponding to the saved pipeline optionally may correspond to the input query represented in search screen 1300 of FIG. 13, and may have been constricted therein.

As shown, the search bar is optionally automatically loaded with command 1404 corresponding to the input query of the saved pipeline. The "from" identifier represents a command that instructs the system to use a saved pipeline having a specified pipeline label as an input query. As shown, the command element "SupplementalData" identifies the saved pipeline. The user can type or otherwise add commands to search bar 1402, such as command 1430, to extend the input query. Command 1430 is a "fields" command that removes fields, or attributes, from the query results if present. In the example shown, the user has typed in the command to remove the event attribute having the attribute label architecture from query results. The extended query was applied to search screen 1400 to update the displayed query results. Further commands could be subsequently added to the query and applied.

In loading the saved pipeline, sidebar 1406 is optionally loaded with at least some of the same event attributes displayed in the table format when the saved pipeline is loaded into search screen 1300, as shown. In the present example, each event attribute displayed in the table format is loaded into the search interface. The _time and _raw attributes are displayed automatically in events list 1408, enabling the user to view the raw event data in each of the returned events from the query with corresponding time stamps. The remaining event attributes are displayed in sidebar 1406. This could be accomplished, for example, by loading metadata saved with respect to search screen 1300 that specifies which event attributes to display in the table format and loading those event attributes into search screen 1400 using the metadata.

However, in the present example, this is accomplished by loading each event attribute corresponding to the input query into search screen 1400. Further, search screen 1300 is configured to display each event attribute of the query in table format 1302 (e.g., when the most recent command entry is selected). Thus, in search screen 1300 the user can remove a column from the table format by removing the event attribute using the query. It is noted that this could include removing the event attributes corresponding to _raw and time. Thus, in some implementations, the event raw data and/or time stamps can be made unavailable to the user in search screen 1400. As such, it will be appreciated that at least some of the removing can be accomplished in search screen 1300 using the query, which is encapsulated by the input query (e.g., command 1404) in search screen 1400.

Further, in implementations where the user of search screen 1400 is unable to modify the input query (via permissions or otherwise), the user may be prevented from viewing transformed states of the input data prior to the output of the saved pipeline, including removed and/or transformed event attributes and/or the values thereof. Thus, in some respects, the data accessible to the user in search screen 1400 can be curated in search screen 1300 for use in search screen 1400. As an example, sensitive information such as social security numbers and other personal information can be removed from the input data for use in search screen 1400. It will be appreciated curation of input data can be performed in either search interface and saved as a pipeline. Furthermore, in each case selecting to extend a saved pipeline may prevent the user from accessing (viewing or modifying) prior states of the input data.

In search screen 1300, command entry 1330 in FIG. 13 corresponds to a command applied by the user to remove all event attributes except those labeled _time, _raw, architecture, client_ip, and salesforce_id. The user also interacted with table format 1302 to extract event attributes from the event attributes displayed in the table format. An exemplary options menu for performing extractions is shown. The user selected options to generate command entries 1332 and 1334 corresponding to commands that extract event attributes labeled raw_eloquaGUID (eloquaGUID) and raw_version (version) from an event attribute (the event raw data in the present example). Thus, as shown in FIG. 14A, those extracted event attributes are available to the user in search screen 1400 and loaded into sidebar 1406.

In some implementations, at least some of the event attributes are automatically selected in sidebar 1406 when loading the saved pipeline. For example, one or more of the fields displayed in the table format can be loaded as selected fields, as shown. In addition, or instead, one or more of event attributes could be loaded as an interesting field and be displayed as shown in FIG. 6A. It is noted that the event attribute having the attribute label architecture may have initially been a selected field (or interesting field) in search screen 1400, but was removed when the user removed that event attribute from the query results using command 1430. It is noted that user may optionally add filters to the query that filter events from query results based on specified values of event attributes (e.g., all returned events must include a specified value(s) for a specified event attribute or all returned events must not include a specified value(s) for a specified event attribute).

In search screen 1400, the user can select and deselect any of the event attributes displayed in sidebar 1406. By selecting an event attribute (e.g., an interesting field), the event attribute becomes a selected field. A user can click on any event attribute in sidebar 1406 to cause display of a form similar to form 1440, which is customized to the chosen event attribute. Form element 1432 can be used to toggle between a field being an interesting field and a selected field. In some implementations, one or more of the interesting fields may optionally be selected and/or generated by the system by extracting the interesting fields from the event raw data. These extractions may be preconfigured by a user and/or based on one or more default extraction rules, such as the extraction rules of an autoextract command described above. In some cases, these interesting fields may not be displayed where an input query is loaded into the search interface, may not automatically be displayed, or may be distinguished from interesting fields defined by the input query. For example, in the present example, the search interface only displays interesting fields that are defined by the input query when the query is initially loaded. A user may later generate other interesting fields from the event raw data if the data is available in the query results. Also shown in FIG. 14A, form 1440 displays statistics about the chosen event attribute and can be used to generate various reports on the event attribute.

Also shown in search screen 400, selected fields are displayed in events list 1408. In particular, values of the fields are displayed with the raw data that corresponds to the same event. In some implementations, selected fields are displayed in events list 1408 and the user can remove fields from events list 1408 by unselecting the field (e.g., using form element 1432) or removing the field using the query (e.g., using search bar 1402). Events list 1408 offers some interactivity such as allowing the user to select keywords in the raw data to add to the query.

Search screen 1400 also optionally includes a load in table option 1442. The load in table option is displayed as a button, and is selectable by the user to load the query (and optionally various metadata such as selected fields, interesting fields, and/or user generated extraction rules for fields) corresponding to search bar 1402 in the search interface corresponding to FIG. 12. Exemplary operation of the option is described in further detail with respect to FIG. 14B.

3.8 Transitioning Between Query Interfaces

Figure 14B:
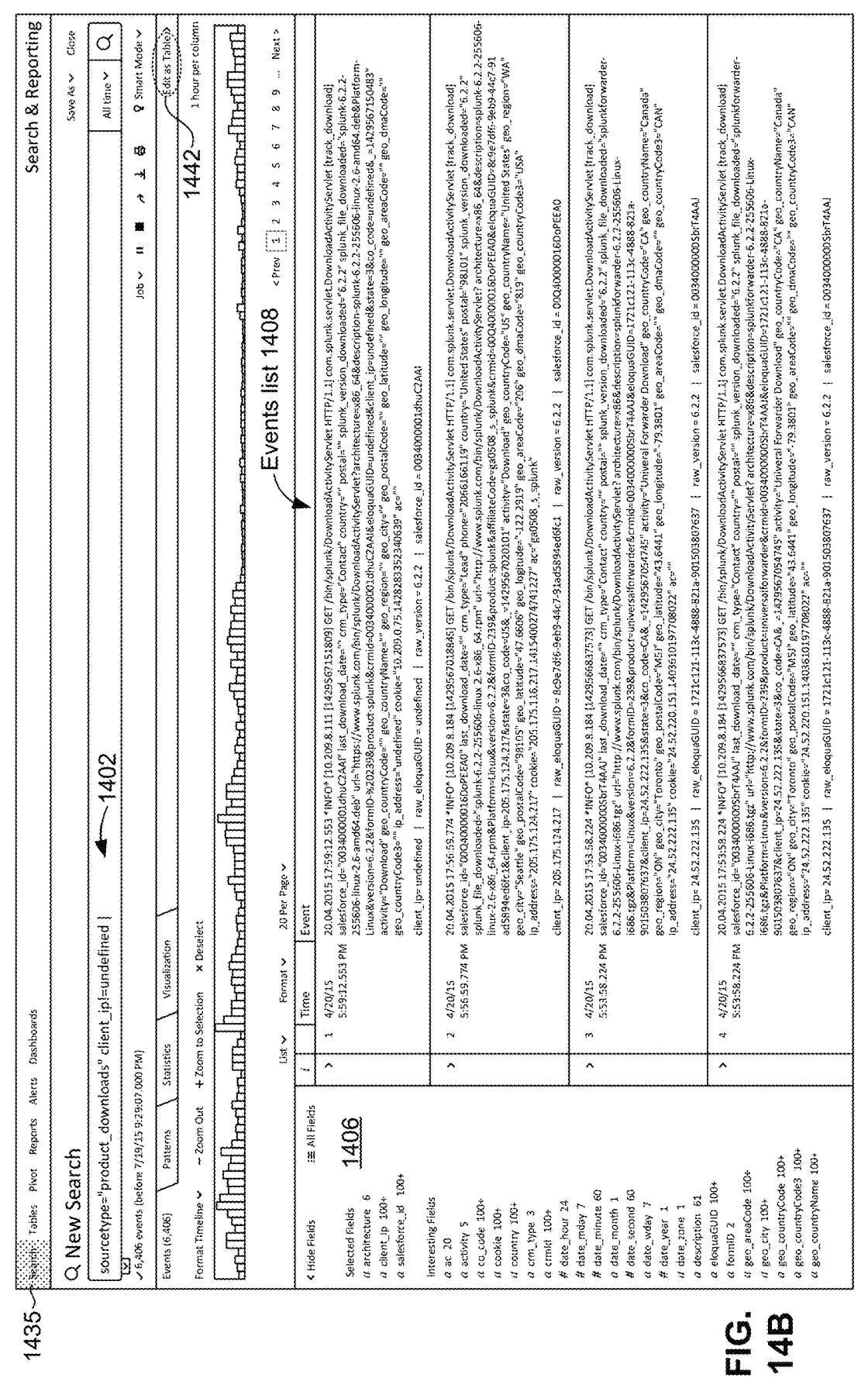

Referring to FIG. 14B, FIG. 14B illustrates search screen 1400 in accordance with the disclosed embodiments. In FIG. 14B, search bar 1402 corresponds to a new query. The user may have deleted commands 1404 and 1430 in FIG. 14A and typed in a new query, for example, such that the input query is no longer utilized. As another example, the user may have selected option 1435 causing search screen 1400 to be loaded without the input query. The user may have subsequently typed in the new query. As shown, in some implementations, selecting to create a new query causes display of interesting fields include at least some fields that do not correspond to event attributes of query results. As described above, these interesting fields can be based on user and/or system defined extraction rules that may be preconfigured in the system.

In search bar 1402, the user has specified the sourcetype of the query as "product_downloads" to filter events having other sourcetypes from query results. Further, the user has selected various fields shown in sidebar 1406 and potentially unselected other fields. Additionally, the user has constructed the query to filter events where the event attribute labeled client_ip has an undefined value.

Figure 15:
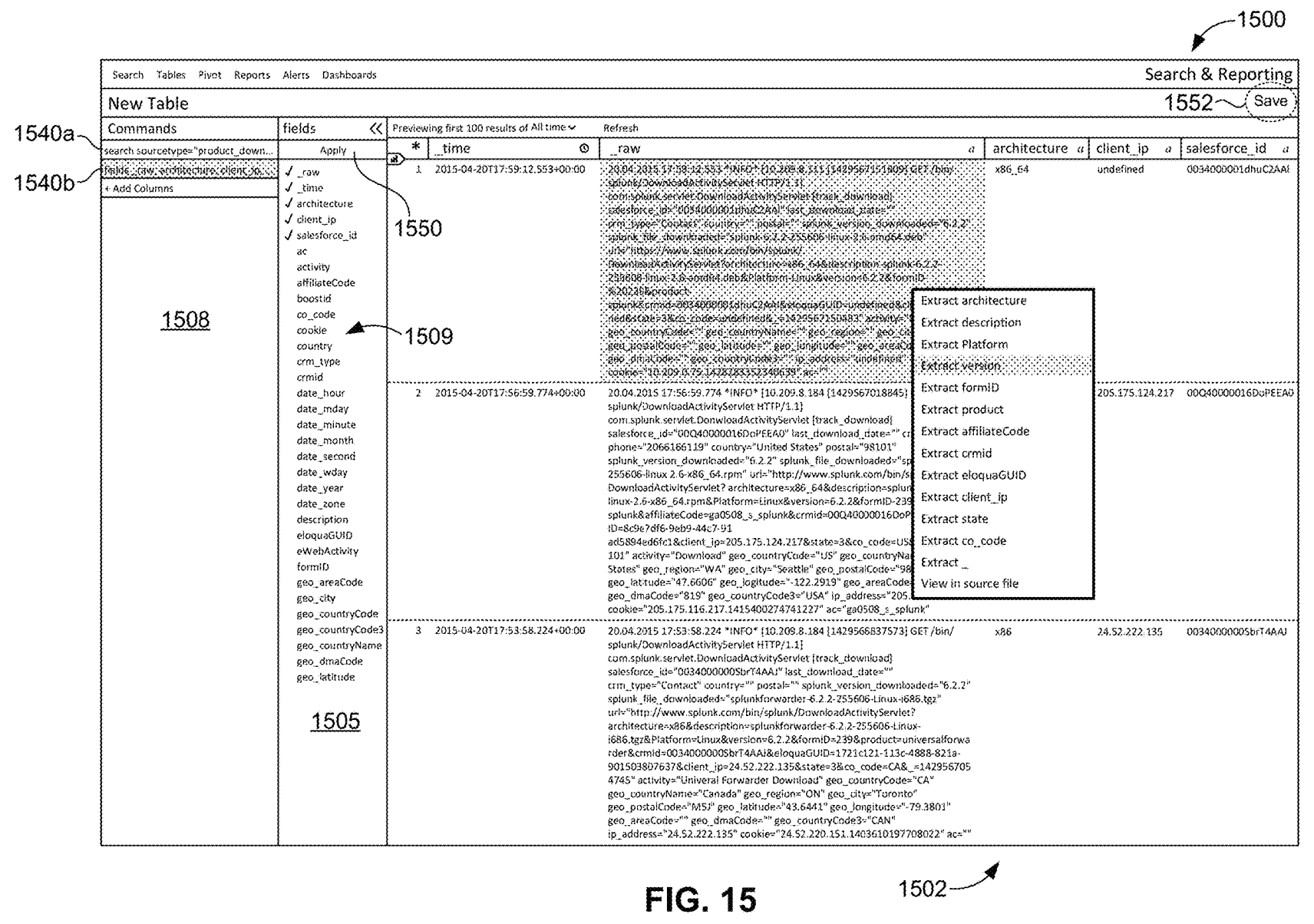

After performing initial curation of the input data via the query, the user may desire to load the query into the search interface corresponding to search screen 1200. In some implementations, this can be accomplished by clicking, or otherwise selecting load in table option 1442. Referring to FIG. 15, FIG. 15 illustrates search screen 1500 in accordance with the disclosed embodiments. Search screen 1500 corresponds to the query of search screen 1400 in FIG. 14B loaded into an interactive table format, which can correspond to the result of the selecting of load in table option 1442 by the user.

As shown, in some implementations, the user selecting to transition to the search interface corresponding to search screen 1500 causes the query constructed in the previous query interface to be utilized as an input query to the current query interface. Exemplary loading of an input search query has previously been described above with respect to FIG. 10. For example, command entry 1540*a* can correspond to command entry 1040*a* in FIG. 10. As an alternative, each portion of the query divided by a pipe symbol "|" could have been loaded as a respective command entry in command entry list 1508.

As shown, in some implementations, the user selecting to transition to the search interface corresponding to search screen 1500 causes one or more event attributes of query results of the query to be automatically displayed in table format 1502. The displayed event attributes may be determined by the user in the previous query interface. For example, the event attributes displayed in table format 1502 are based on the selected fields in search screen 1400. In the present implementation, each selected field is automatically displayed in the table format. Optionally, as shown, the event attributes labeled _time and _raw are also automatically displayed in the table format, if present. Thus, the user can continue to construct the query based on progress made using the previous search interface. The selected fields may optionally be extracted from metadata associated with the previous query interface and applied to the metadata associated with the new query interface.

In some implementations, one or more event attributes are automatically removed from the query results in transitioning to search screen 1500. For example, one or more commands may be automatically added to the query to remove the one or more event attributes. Furthermore, one or more command entries can be automatically added to command list 1508 that correspond to the one or more commands. For example, FIG. 15 shows command entry 1540*b* corresponding to a command that causes the query to remove designated event attributes from query results. In the present implementation, selected fields are retained from the previous query interface and other fields are automatically removed from the query results using the command. In other implementations, the one or more commands could be encapsulated in command entry 1540*a*.

In some implementations, each field in the query results is displayed in table format 1502. Thus, by automatically removing some of the fields, those fields are not displayed in table format 1502. As the user may not be interested in unselected fields from the previous query interface, it can be inferred that those fields should be excluded from table format 1502.

In some implementations, the user can selectively add event attributes to table format 1502 that were automatically excluded from table format 1502. For example, command entry 1540*b* can be selected by the user to cause display of a form comprising event attributes corresponding to the input query. As shown, the form includes form elements 1509 and is displayed in panel 1505 corresponding to interface panel 1205. The event attributes displayed in the form include, by way of example, interesting fields, selected fields, an event attribute corresponding to event raw data (i.e., _raw), and an event attribute correspond to event time stamps (i.e., time). The user can interact with the form elements to unselect and select event attributes as described to control the event attributes of the query and the display of event attributes in table format 1502. In the present example, each event attribute corresponds to a form element and the user selects or unselects the event attribute by clicking on the form element. The users selections can be applied to table format 1502, for example, by clicking apply button 1550.

As shown, the users can continue to modify the query through interaction with table format 1502. Further, the user can selectively save the pipeline, for example, by selecting save option 1552. As in each search screen, when available the save option can be used to selectively save the pipeline as a new data object and/or overwrite a previous data object. Saving a new pipeline can cause the pipeline to be displayed in selection interface 1100 of FIG. 11.

3.9 Runtime Permissions of Queries

In further respects, the present application relates to assigning runtime permissions to queries saved in association with query objects. Examples of query objects include data objects, such as saved pipelines described above. Runtime permissions that can be assigned to a query include access permissions to query one or more data sources. The access permissions grant the query access rights to input data for the query from the one or more data sources. By allowing users to execute data queries using the runtime permission assigned to the query, users that otherwise may not have access rights to at least some of the data sources can receive the same query results. Thus, it can be ensured that the query results are consistent amongst different users that may have different permissions.

For example, assume the input data provided to the query corresponding to search screen 1200 in FIG. 12A is from a first data source and a second data source. Each data source may have at least some extractable event attributes in event raw data that is unique to that data source. For example, the event attribute corresponding to activity may only be extractable from the first data source. Further assume that a first user has access permissions to the first and second data sources and a second user only has access permissions to the second data source. Applying the user permissions to the query results in table format 1202 including column 1204*b* and the associated events for the first user, but not the second user. However, it may be desirable to ensure that both users receive the same query results.

One approach to achieving consistent query results amongst users is to change the access permissions of the second user to allow access to both data sources. However, the first data source may contain sensitive information that should not be made accessible to the second user for security or privacy reasons. By allowing the second user to execute the data query using the runtime permission assigned to the query, the second user can access the same query results as the first user, while the sensitive information can be removed by the query. Thus, the second user's level of access to the second data source can effectively be made granular and specific rather than applying a blanket policy.

In further respects, the access permissions that are assigned as the runtime permissions can be of users. For example, the access permissions may be of a creator of the query (e.g., the initial creator of the query). In various implementations, the creator of the query creates the query in a query interface that allows the creator to view query results corresponding to the query. Further the query interface can allow the creator to update the query and see updated results of the query. Examples of such query interfaces are described throughout the present application and correspond to at least search screens 600, 800, 1200, 1300, 1400, and 1500.

In some implementations, the access permissions are assigned as a runtime permission of the query based on the user updating a query object and/or creating a new query object. For example, in response to the user selecting an option to save a query in association with a query object, the user's access permissions may be stored as runtime permissions in association with the query object and the saved query. The option could correspond to save option 1352 as one example. By saving the user's access permissions as a runtime permission of the query, the user can be ensure that subsequent users that execute the query can access query results that are consistent with the query results used to create the query.

Certain users can be denied access to previous state of input data by preventing the users from executing a modified version of the query (e.g., using permissions and/or the interface design). As an example, some users may be denied access to any edit pipeline links for the query (e.g., based on permissions). Typically the creator of the query and/or administrators will have access permissions for editing the query (e.g., automatically by default). Furthermore, in some cases administrators may selectively grant or remove these permissions for users on an individual or group basis. Additionally, the creator and/or administrators may selectively grant or remove the permissions to access the query for execution). Typically the creator of the query and/or administrators will have execution permissions for the query (e.g., automatically by default). In some cases administrators and/or the creator may selectively grant or remove these permissions for users on an individual or group basis.

In various implementations, as long as a user has execution permissions for the query, the user is allowed to execute the query with the runtime permissions (e.g., regardless of the user). However, it is noted that in some implementations, the runtime permissions may be designated for one or more particular projects and the allowing the second user to execute the search using the determined runtime permission is for the particular project(s). As an example, the runtime permissions may be designated by the creator, an administrator, and/or automatically by the system (e.g., where the project used to create the query is designated). In addition, or instead, runtime permissions may be designated for one or more particular apps in the project environment. "Apps" as used herein may represent software programs and processes that may implement various features and processing. Apps may give users insights into their projects via dashboards, reports, data inputs, and search sessions (e.g., in a search interface) that work in the project environment in which they are installed. Apps may completely reconfigure the way a project interface looks or may launch in an entirely separate interface.

In some respects, a query can be executed as a base query and/or one or more subqueries to a base query. A base query corresponds to a complete data processing pipeline. A base query can optionally comprise one or more subqueries. A subquery corresponds to data processing pipeline that provides the output query results of the data processing pipeline to a data processing pipeline of a base query. In some implementations, a subquery can serve as a base query to one or more other queries. The data processing pipeline of a base query supplements its query results with the query results of a subquery. The supplemented query results may further be processed by the data processing pipeline to provide query results as an output data set of the base query.

Figure 16:
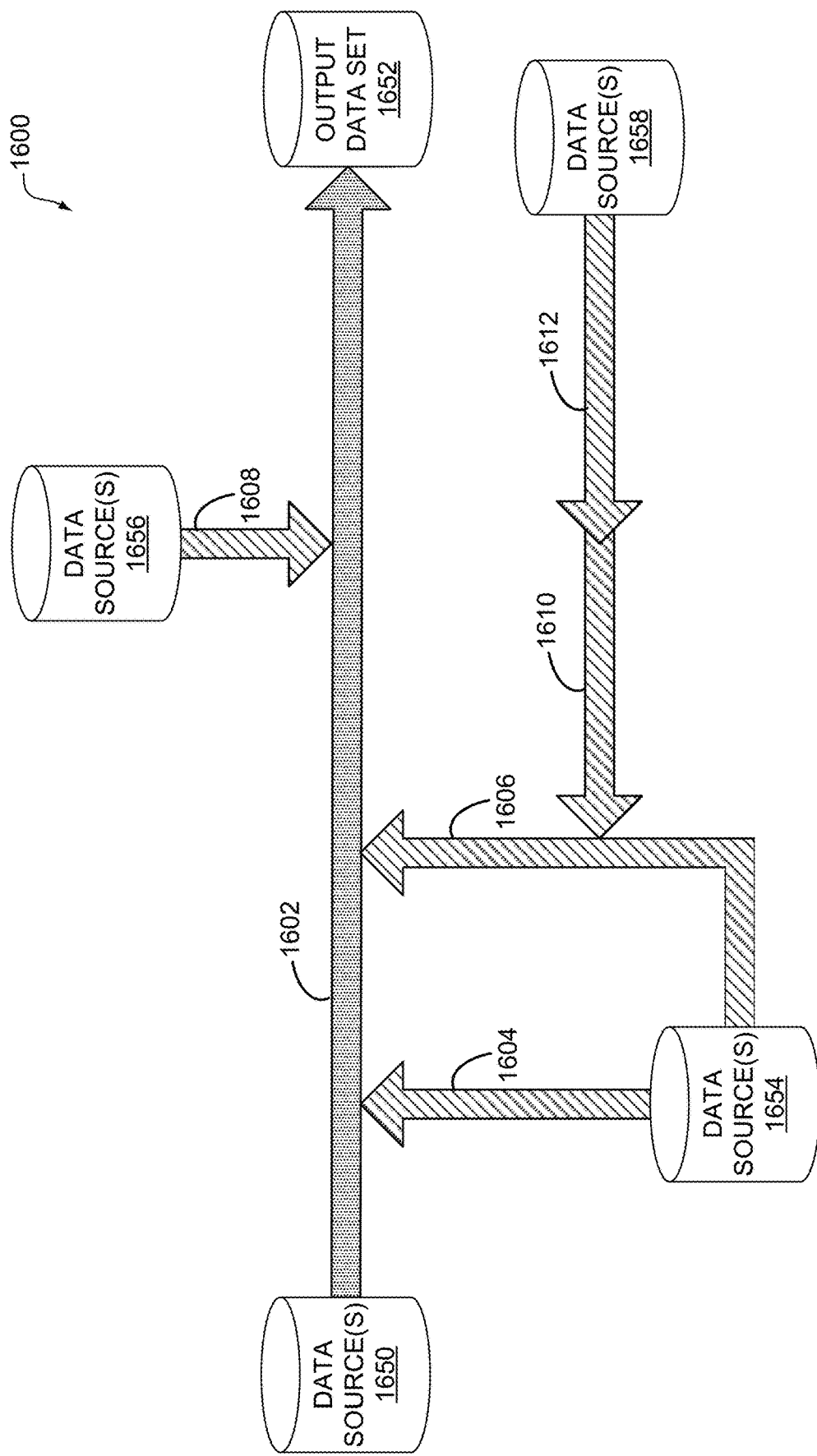
FIG. 16 depicts execution of a primary query in accordance with the disclosed embodiments.

Referring to FIG. 16, FIG. 16 shows diagram 1600 depicting exemplary execution of primary query 1602 in accordance the disclosed embodiments. A primary query corresponds to a base query that provides final query results of a data query executed by the system as an output data set. A data query typically comprises a single primary query. As shown in FIG. 16, primary query 1602 receives input data from data source 1650 and provides output data set 1652 comprising query results of the data query. Primary query 1602 corresponds to a data processing pipeline and may be in a pipelined query language, such as SPL or a data processing script. The execution of primary query comprises execution of multiple subqueries 1604, 1606, 1608, 1610, and 1612.

In various implementations, a primary query can comprise any number of subqueries. An input query may refer to a subquery that serves as an input data source to another query. A supplemental query may refer to a subquery that service as a supplemental data source to another query. As shown, subqueries 1604 and 1606 each receive input data from data source 1654 and serve as supplemental data sources to primary query 1602 at different points in the data processing pipeline. In particular query results of those subqueries are provided to the data processing pipeline of primary query 1602. Similarly, subquery 1608 receives input data from data source 1656 and serves as supplemental data source to primary query 1602 at a later point in the data processing pipeline of primary query 1602 (e.g., in a later command). Also in FIG. 16, subquery 1612 receives input data from data source 1658 and serves as an input data source of subquery 1610. In turn, subquery 1610 processes input data from subquery 1612 and serves as supplemental data source to subquery 1606 at a point in the data processing pipeline of subquery 1606.

In some cases, a subquery may be incorporated into a base query utilizing one or more commands of the base query (e.g., using a query identifier of the subquery in the commands). For example, a supplemental query may be referenced by in a lookup, join, or other data combination command in the base query. Exemplary combination types have been described above with respect to FIGS. 12E, 12F, and 12G Command entry 1234 in FIG. 12G represents a command that references a query as a supplemental data source. As an example of a reference to a query as an input data source, command entry 1232*a* represents a command that references a query as an input data source. It is noted that commands in the query need not be required to reference a query as an input data source or supplemental data source. For example, a reference may be made using another approach, such as via metadata associated with a query object of the base query or by otherwise storing the association.

From FIG. 16 is can be seen that execution of a primary query may be complex, including numerous queries serving as input data sources and supplemental data source of each other and/or the primary query. In executing the primary query, were users' access permissions applied, different users may receive vastly different versions of output data set 1652. Additionally, the various queries depicted in FIG. 16 may be created by many different users having many different access permissions. Were the executing of the primary query to utilize the runtime permissions of the primary query for each of the subqueries, the final query results may include more information than is desirable from the user executing the primary query. Thus, in some implementations, each subquery of a primary query is executed using the runtime permissions associated with the subquery (e.g., of the creator of the query). As with primary queries, each subquery may correspond to a respective query object. For example, each subquery may correspond to a respective saved pipeline having a corresponding pipeline entry in selection interface 1100 of FIG. 11. It should be appreciated that a query may be executed as a subquery of another query, or may be executed as a primary query itself. The saved pipeline corresponding to pipeline entry 1102*c* is one such example.

Figure 18A:
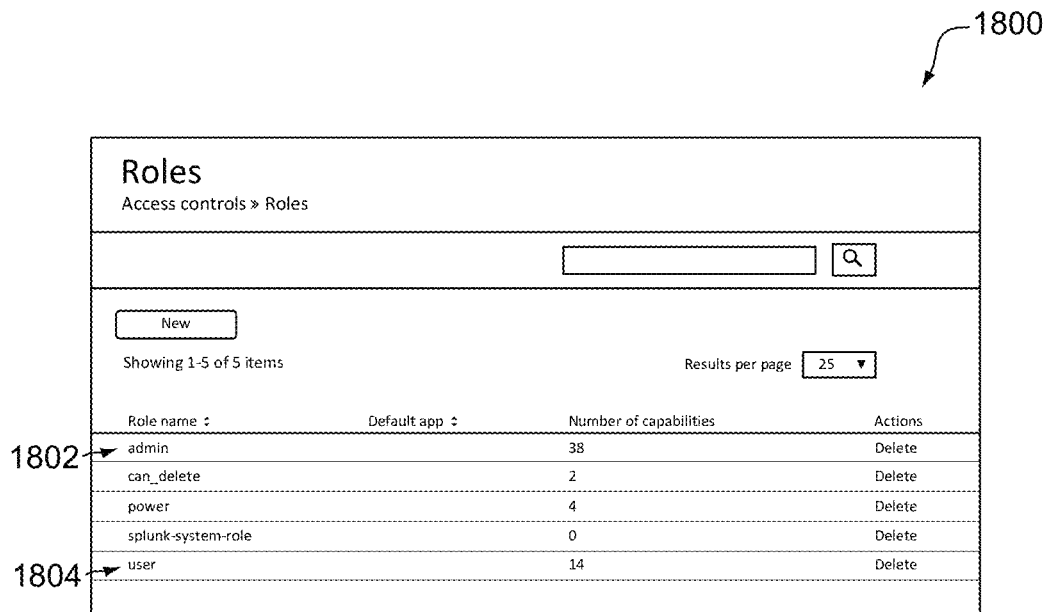
FIG. 18A illustrates a permissions interface in accordance with the disclosed embodiments.
Figure 18B:
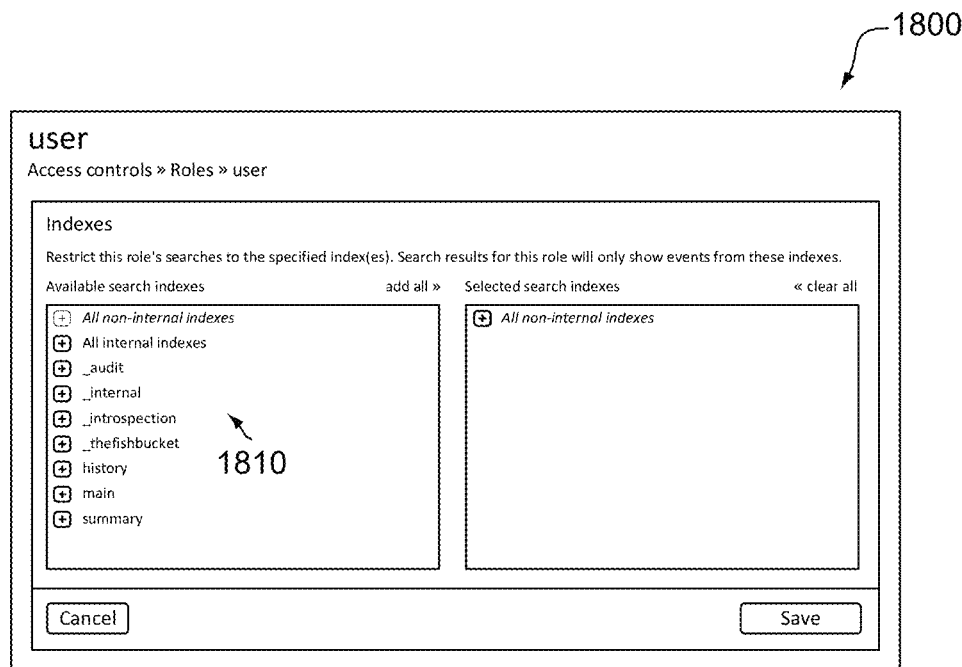
FIG. 18B illustrates a permissions interface in accordance with the disclosed embodiments.

In various implementations, the data sources corresponding to the runtime permissions are data stores. For example, the data stores can be indexed data stores and the query can be on indexed items in in the data stores. In some implementations the indexed items comprise indexed unstructured data, such as event raw data. Referring to FIGS. 18A and 18B, FIGS. 18A and 18B show exemplary permissions interface 1800 for modifying and assigning access permissions of users, such as those that may be assigned as runtime permissions of saved pipelines. Some implementations employ roles, such as those shown in FIG. 18A for defining the access permissions. Roles represent definitions of access permissions and authorizations that enable users to execute various features, apps, or access data, in the various embodiments. Roles may define how user may interact with apps, indexes, indexers, and the like. For example, a user may be assigned one or more roles. The roles shown in FIG. 18A include admin role 1802 and user role 1804. Any number of other roles can be employed.

In some implementations, a user selects a role and can perform one or more modifications any of the various aspects of the role, such as access permissions and authorizations. As an example, FIG. 18B may be the result of a user accessing user role 1804 for this purpose from FIG. 18A. For example, the user may be assigned admin role 1802 and click on the link corresponding to user role 1804 to access the screen shown in FIG. 18B. As shown in FIG. 18B, the user can alter the access permissions of the user role by selecting from the list of data stores 1810 which data stores are to be restricted for the user role. These access permissions may be the access permissions assigned to saved pipelines as runtime permissions thereof.

Referring to FIG. 11, a user may edit runtime permissions of queries, for example, by selecting a corresponding link of a saved pipeline entry. As an example, a user may edit runtime permissions of the saved pipeline corresponding to pipeline entry 1102*c* by selecting edit permissions link 120. FIG. 17 shows exemplary permissions form 1700, which may be presented to the user in response to selecting edit permissions link 1120. As shown, by default, the saved pipeline may be configured to run using the access permissions corresponding to the owner (e.g., the creator), as indicated by the selection of form element 1706. However, the user may optionally change the runtime permissions to correspond to another user. As an example, the runtime permissions may be changed to correspond to the user executing the query by selecting form element 1708.

Permissions form 1700 further shows that the user may optionally be able to determine Read and Write permissions for the saved pipeline with respect to other users, such as via selection of form elements 1710 for roles. In some implementations, Write permissions define whether a user can edit the saved pipeline (e.g., via an edit pipeline link of FIG. 11). Furthermore, Read permissions may define whether a user can extend the saved pipeline (e.g., via an extend pipeline link of FIG. 11). The user may subsequently apply any changes the user was permitted to make to the permissions in permissions form 1700.

4.0 ILLUSTRATIVE SEARCH SCREEN WITH SUMMARY VIEW FUNCTIONALITY

FIG. 19A depicts an illustrative search screen 1900 in accordance with various implementations of the present disclosure. As with search screens 800, 1200, 1400, and 1500, discussed above, search screen 1900 may be utilized as part of a search interface to display one or more events of a set of events that satisfy a search query (e.g., search query 1914 represented in a command entry list). As used herein, to satisfy search query 1914, the set of events would be those events that conform with search query 1914. Put another way, to satisfy search query 1914 the set of events would be returned by the execution of search query 1914.

Search screen 1900 may display a subset of the set of events in a table format 1902. Table format 1902 may be the same as, or similar to, the various table formats discussed above. As such, table format 1902 may include a plurality of rows 1906a-1906g. Each of rows 1906a-1906g can represent an event of the set of events. In addition, table format 1902 may include a plurality of columns 1904a-1904f. Each column of the plurality of columns can represent a respective event attribute. For example, columns 1904a-1904f represent event attributes _time, date, AccountName, AccountRegion, AccountSubRegion, and AccountTheater, respectively. It will be appreciated by those of skill in the art that the event attributes depicted are selected for purposes of example only and should not be viewed as limiting of this disclosure. The event attributes represented by columns 1904a-1904f can be a subset of the event attributes contained within the set of events or the entirety of the event attributes contained within the set of events. The columns of table format 1902 form cells (e.g., cell 1912) with the plurality of rows of table format 1902. As can be seen, these cells are formed where the columns of table format 1902 intersect with the plurality of rows of table format 1902. Each individual cell may include data items, or values of data items, of the respective event, represented by the row in which the individual cell lies, and the respective event attribute, represented by the column in which the individual cell lies.

Search screen 1900 may be utilized as part of a search interface (corresponding to the search interface of search screens 800, 1200, and the like) that allows a user to modify search query 1914. Some illustrative options for modifying search query 1914 include any combination of deleting commands from search query 1914, adding commands to search query 1914, reordering one or more commands in search query 1914, and modifying variables, parameters, arguments, and/or other properties of commands in search query 1914, as has been previously discussed herein.

Search screen 1900 may also be utilized to update the search result set to correspond to the modified search query and to update the events that are displayed in search screen 1900 to correspond to the updated search result set. In some cases, based on a search query being modified, the search query could be completely re-executed to retrieve new search results and generate the updated search result set, which could then be displayed in table format 1902. In other cases, the search query may only be partially executed. For example, in implementations where a pipelined query language, such as SPL, is employed for search queries, additional commands that are added to a search query may be applied to at least some previous search results. These and other variations are possible for updating the search result set to correspond to a search query.

By interacting with search screen 1900 to create and/or modify search queries, a user may utilize the search interface to filter, sort, clean, enrich, analyze, report on, and/or otherwise carryout functionality provided for by commands in search queries. Furthermore, as the user generates modified search queries, the search result set can be updated, with events displayed in search screen 1900 (e.g., in table format 1902) being updated to reflect the modifications. Utilizing this approach, a user may iteratively modify a search query and view the impact of the modification via updated search results. This approach can be employed to enable users to effectively and efficiently generate queries that return expected and desired results, even without extensive knowledge of the underlying commands and/or search language employed by the queries.

In embodiments, search screen 1900 may be configured by the system to enable a user to switch to a data summary view in which the user can view summary reports for event attributes represented by one or more of columns 1904a-1904f of table format 1902. Such a configuration is depicted by control 1910 which can be a button configured to cause the data summary view to display upon selection by a user. An illustrative data summary view is depicted in FIG. 19B.

4.1 Illustrative Data Summary View

Figure 19B:
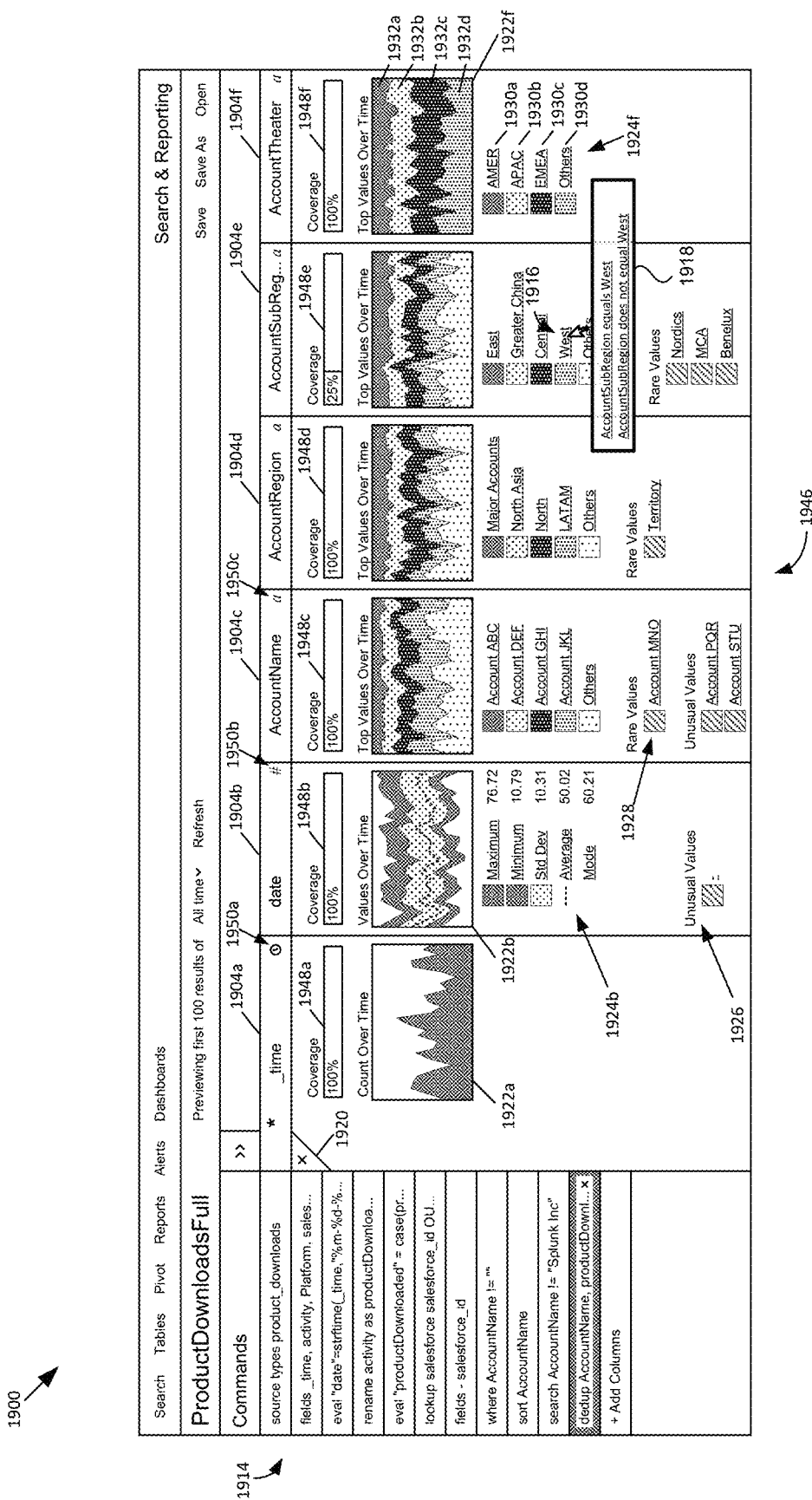
FIG. 19B illustrates a data summary view in accordance with the disclosed embodiments.

FIG. 19B depicts an illustrative data summary view 1946 that the system can cause to be presented. Data summary view 1946 is configured to display summary reports for the event attributes represented by each of one or more of columns 1904a-1904f. As depicted in FIG. 19B, a summary report is presented for each of the event attributes represented by columns 1904a-1904f, however, as discussed further in reference to FIG. 19C, in other embodiments, any subset of the event attributes represented by columns 1904a-1904f may be presented by summary reports. Data summary view 1946 may be presented, in some implementations, as an overlay over the above discussed table format 1902. A user can utilize control 1920 to selectively return to the above discussed table format 1902. As such, the system can enable a user to switch from table format 1902 to data summary view 1946 via control 1910 from within table format 1902 and to switch from data summary view 1946 back to table format 1902 via control 1920 from within the data summary view.

As depicted, each summary report may include a coverage indicator(s) (e.g., coverage indicators 1948a-1948f), a summary graph(s) (e.g., summary graphs 1922a, 1922b, and 1922f), and/or summary entries (e.g., summary entries 1924b and 1924f) for the respective event attribute which the summary report is summarizing. The summary reports depicted may present summary information for the set of events returned by search query 1914 while table format 1902 may not necessarily depict all of the events at any one time. As such, the summary report may present the user with a bigger picture of what is occurring in the data than the table format is capable of presenting. It will be appreciated that these components of the summary report are merely meant to be illustrative of possible components of the summary report and that any presentation of data summarization is within the scope of this disclosure. In addition, as discussed in greater detail below, the information displayed in the summary report, or the format of the summary report, may be based on a data type associated with the respective event attribute of the summary report.

The coverage indicator can indicate the percentage of events, of the set of events, that contain a data item for the respective event attribute. For example, the coverage indicator of event attribute _time indicates that there is 100% coverage for this event attribute. As such, each event of the set of events includes a data item for the _time event attribute. The coverage indicator for AccountSubRegion, on the other hand, indicates that there is only 25% coverage for this event attribute. As such, only 25% of the events in the set of events include a value for AccountSubRegion. The coverage indicator may be beneficial to enable a user to determine the percentage of events, of the set of events, that are included within the summary report. For example, the coverage indicator might be indicative of the relative importance of the event attribute associated with the coverage indicator or could indicate to the user that the query is returning unexpected or unwanted results and thus the query may need to be amended.

The summary entries are depicted in the area located below the summary graphs. Because the summary graphs, as illustrated, depict at least a subset of the summary entries within a summary report, the summary entries will be described first. In embodiments, the summary entries may include a selection of values that occur within the data items of the respective event attribute. In addition, summary entries may include summary statistics, in some embodiments. As used herein, summary statistics refer to results of any statistical, or mathematical, analysis of the set events (e.g., summary entries 1924*b*). In some embodiments, each summary entry may include a text component that corresponds with, or is based on, values of the data items of the respective event attribute. In addition, the summary entry may include a portion of a key, or legend, for the summary graph that identifies the section of the summary graph that corresponds with the summary entry. The summary graphs are discussed in greater detail below, however, it will be appreciated that not all summary entries need be represented in the summary graph.

In some implementations, the values of at least a portion of the summary entries may represent top values. These top values may identify one or more values within the data items of the respective event attribute whose occurrences exceed an upper occurrence threshold. In some embodiments, this upper occurrence threshold may be a user defined upper occurrence threshold. For example, if the user is only interested in summarizing those values of the data items of the respective event attribute that occur in at least 10% of the set of events, the user could designate 10% as the upper occurrence threshold. As another example, the user could be interested in only a specific number of values that occur the most within the data items of the respective event attribute, regardless of percentage. In such an example, the user could designate a set number (e.g., 5) of values to display as top values. As such, the system could be configured to select the top 5 values based on occurrence, which would effectively make the lowest percentage occurrence of these top 5 values the upper occurrence threshold. In other embodiments, the upper occurrence threshold may be defined programmatically. For instance, the upper occurrence threshold could vary based on the data items of the event attributes. For example, the system could be configured to select only those values that occur a sufficient number of times to make the values statistically significant. It will be appreciated that these examples are merely meant to be illustrative of possible mechanisms for selecting the top values and that any other suitable mechanism could be utilized without departing from the scope of this disclosure. In some embodiments, the top values may also include a catch-all category, such as the 'others' category depicted in top values 1924*f*. This catch-all category may represent all of those values whose occurrences did not exceed the upper occurrence threshold. This catch-all category may enable a user to visualize the percentage of values that did not exceed the upper occurrence threshold via the summary graphs (or may only collectively exceed the upper occurrence threshold).

In addition to the top values discussed above, in some embodiments the summary entries may include a selection of rare values (e.g., rare values 1928). These rare values may, in some embodiments, identify one or more values within the data items of the respective event attribute that occur below a lower occurrence threshold. In some embodiments, this lower occurrence threshold may be a user defined lower occurrence threshold. For example, if the user is only interested in summarizing those values of the data items of the respective event attribute that occur in less than 1% of the set of events, the user could designate 1% as the lower occurrence threshold. As another example, the user could be interested in only a specific number of values that occur the least within the data items of the respective event attribute, regardless of percentage. In such an example, the user could designate a set number (e.g., 4) of values to display as rare values. As such, the system could be configured to select the lowest occurring 4 values which would effectively make the highest percentage occurrence of these 4 values the lower occurrence threshold. In other embodiments, the lower occurrence threshold may be defined programmatically. For instance, the lower occurrence threshold could vary based on the data items of the event attributes. For example, the system could be configured to select only those values that occur a sufficiently low number of times to make the values statistically insignificant. It will be appreciated that these examples are merely meant to be illustrative of possible mechanisms for selecting the rare values and that any other suitable mechanism could be utilized without departing from the scope of this disclosure. In other embodiments, the system could be trained on what constitutes a rare value (e.g., by a user designating a specific value as rare or designating a value selected as rare to not be rare). Such training could be accomplished via interaction with either the table format discussed herein or summary elements of the data summary view.

In addition to the top values and rare values discussed above, in some embodiments the summary entries may include a selection of unusual values (e.g., unusual values 1926). These unusual values may identify the values of one or more data items of the respective event attribute that are beyond a threshold of similarity from the other data items of the respective event attribute. The similarity between one data item and another data item can be determined in any conventional manner for determining similarity between two items. In addition, the similarity between two data items can be determined based on any aspect of the data items, such as, for example, a type (e.g., data type) associated with the data item, a value contained within the data item, etc. As with rare values, in other embodiments, the system could be trained on what constitutes an unusual value (e.g., by a user designating a specific value as unusual or designating a value selected as unusual to be normal). Such training could be accomplished via interaction with either the table format discussed herein or summary elements of the data summary view.

The summary graphs (e.g., summary graphs 1922a, 1922b, and 1922f) depict a distribution of at least a subset of values of the data items, of the represented event attribute over time. As depicted, the summary graphs illustrate the distribution of values of the data items that are included within the summary entries discussed above. For example, summary graph 1922f depicts in sections 1932a-1932d the distribution of top values 1930a-1930d, respectively, over time. It should be noted that top value 1930d represents the previously discussed catch-all category. As such, section 32d of summary graph 1922f enables a user to visualize the percentage of values that did not exceed the upper occurrence threshold. As depicted, summary graph 1922f depicts a distribution for 100% of the values of the data items of the AccountTheater event attribute in the event set. Put another way, the combination of the top values when including the catch-all category of 'others' represent 100% of the possible values for the AccountTheater event attribute in the event set. It will be appreciated, that this is merely for illustrative purposes only and should not be viewed as limiting of this disclosure. Any other depictions that enable visualization of the values of the data items of the respective event attribute are explicitly contemplated.

As mentioned previously, the format or content of the summary report may vary automatically depending on a data type of the respective event attribute. The data type may be, for example, a time data type, a numerical data type, a categorical data type, or a user defined data type. It will be appreciated that these data types are selected for purposes of illustration only and that any other conventional data type is within the scope of this disclosure. As can be seen, the summary report of column 1904a is depicted as a time data type represented by symbol 1950a, the summary report of column 1904b is depicted as a numerical data type represented by symbol 1950b, and the summary report of column 1904c is depicted as a categorical data type represented by symbol 1950c.

As can be seen, the summary report of the time data type represented in column 1904 for the _time event attribute does not depict any summary entries, but merely summary graph 1922a that depicts a count of the data items over time. There is 100% coverage for the _time event attribute and this graph depicts a count of the events of the set of events over time.

The summary report of the numerical data type represented in column 1904b, on the other hand, depicts a distribution of values of the data items of the date event attribute over time. The values have undergone a numerical, or statistical, analysis to identify a maximum value, a minimum value, a standard deviation, an average value, a mode value, and a median value (not depicted) of the values of the data items of the date event attribute. As used in this context, average value refers to the mean value of the values of the data items. In addition, as used in this context, mean, median, and mode are to be interpreted in conformance with their respective understanding in conventional numerical analysis. It will be appreciated that this numerical analysis is merely meant to be illustrative of possible numerical analysis. Any other numerical analysis, statistical analysis, etc. that could enable a user to visualize the values of the data items of the respective event attribute are explicitly contemplated herein. It will also be appreciated that these values of the date event attribute represent a numerical conversion of the dates presented in the table format depicted in FIG. 19A. As can be seen in summary graph 1922b, the maximum, minimum, standard deviation, and average are all depicted in the graph to enable a user to visualize the occurrences of these values. It will be appreciated that the statistical analysis discussed above extends beyond merely a numerical data type and could be applied to any type of data. For example, this statistical analysis could include determining cardinality of various sets of values of the data items of the respective event attribute. As such, any statistical analysis that could enable a user to visualize the values of the data items of the respective event attribute are explicitly contemplated herein regardless of a data type associated with the values.

The summary report of the categorical data type represented in column 1904c, in contrast, depicts a distribution of values of the data items of the AccountName event attribute over time without the above discussed numerical analysis. As discussed above in reference to summary graph 1922f, summary graph 1922c depicts sections of the graph that correspond with the top values presented in the summary entries represented over a period of time. As can be deduced, and is discussed above, the combination of the top values when including the catch-all category of 'others' represent 100% of the possible values for the AccountName event attribute in the event set. It will be appreciated, that this is merely for illustrative purposes only and should not be viewed as limiting of this disclosure. Any other depictions that enable visualization of the values of the data items of the respective event attribute are explicitly contemplated.

4.2 Illustrative Interactions with Data Summary View

In some implementations, a user can interact with the summary entries and/or the summary graphs depicted in the summary reports. Such an interaction may enable display of additional information to the user concerning a selected summary entry or a selected portion of a summary graph; enable the user to revise the search query with respect to a selected summary entry or a selected portion of a summary graph; or enable filtering of the set of events with respect to a selected summary entry or a selected portion of a summary graph (e.g., to allow the user to perform a faceted analysis of the events in the set of events). These interactions are discussed in greater detail below.

As mentioned above, in some implementations the system may enable interaction with summary entries and/or the summary graph to cause display of additional information for a selected summary entry or a selected portion of the summary graph. As an example, selection of the catch-all category 'others,' either in a summary entry or a section of a summary graph, could display the values of the data items of the respective event attribute that are included within this catch-all category. As another example, selection of a value that is designated as a rare value in the summary entries may identify a percentage or number of occurrences that are attributed to that value. As an even further example, selection of a value that is designated as an unusual value in the summary entries may identify what aspects of the value, or the data item, make the value unusual (e.g., data type, format, etc.). Such a selection may be accomplished via a mouse-over event, a left click, a right click, a touch, or any other suitable form of interaction with a summary entry, or a corresponding portion of a summary graph.

In addition to displaying additional information, the system can be configured to cause interaction with a summary entry and/or a summary graph to enable the user to revise the search query with respect to a selected summary entry or the selected portion of a summary graph. To accomplish this, the system can be configured to enable a user to make a selection of a portion of a summary graph (e.g., a value or range of values) or a summary entry of a respective summary report. This selection may be accomplished through any conventional manner, including, but not limited to, mouse-over, left-click, right-click, touch selection, etc. Based on the selection, the system can be configured to cause one or more options to be displayed (e.g., list of options 1918) corresponding to the selection. Based on the user selecting one of the displayed options, commands, based at least in part on the selected option, can be added to search query 1914.

The one or more commands that are added to the search query (e.g., to the end of the search query) can potentially be based on additional factors, such as one or more data items and/or one or more event attributes of the selection. Furthermore, a corresponding command entry may be automatically added to the command entry list if present. In some cases, the updated query is automatically executed and the events displayed in search screen 1900 are updated to correspond to the updated query. Where the data summary view is still displayed, the data summary view may be updated to reflect the updated events. In some implementations, the view is automatically returned to table format 1902 instead of data summary view 1946 and the table format is updated to reflect the updated query.

Examples of selectable portions of a summary report include any portion of a summary graph of the summary report, including a value or range of values within the summary graph, or summary entries contained within the summary report. As an example, in some implementations, one or more summary entries and or portions of a summary graph may be selectable without necessarily requiring other summary entries and/or other portions of the summary graph to be selectable. The same is true for other types of summary report elements, such as, for example, columns.

Although many approaches exist for selection of a portion of a summary graph and/or a summary entry, hereinafter referred to collectively as selectable portion(s) for simplicity, in some implementations, a selectable portion(s) may be highlighted or otherwise emphasized when a pointer that is displayed in the user interface moves over a particular region of the display (e.g., a region of the summary report) that corresponds to the selectable portion(s). This feature is also referred to as highlight with rollover (e.g., detected when a pointer moves over a region, or upon occurrence of a mouse-over event). One or more highlighted selectable portions can then be selected in response to additional user input, such as a mouse click or touch input to select the selectable portions. A shift-click or other method could be utilized to select additional selectable portions or to select a range within a summary graph.

By way of example, in search screen 1900 of FIG. 19A, each summary entry can be individually selectable and each section of a summary graph can be individually selectable. The region for each of these selectable portions is substantially coextensive with the portion of the search screen 1900 covered by the selectable portion, as well as possibly the immediate area surrounding the selectable portion. For example, the region for selectable portion 1916 can include the text "West," as well as the block next to the text that acts as key, or legend, for the summary graph, and any space in between. Furthermore, each column is individually selectable and the region for each column is coextensive with the column's header, which comprises an attribute label of the event attribute of the column.

4.3 Illustrative Options within the Data Summary View

A variety of approaches are available for presenting options that are displayed based on and corresponding to the selection of one or more of the above discussed selectable portion(s) of summary reports of the data summary view. In some implementations, options can be presented as a list of selectable options. Options may appear as an option menu (e.g., option menu 1918), or elsewhere. Display locations of option menus can be based on the location of the selectable portion(s) that are selected by the user. For example, option menus can be configured to appear proximate to (e.g., over, or adjacent to) one or more selected portions, as illustrated by option menu 1918.

In the present implementation, each option of the option menu can correspond to one or more commands that may be included in search query 1914. However, in some cases, options need not correspond to one or more commands that may be included in a query. Instead, the option may be operable to interact with the system in some other manner. Where, an option corresponds to a command, the command may be provided to a search query utilizing a format that includes a command identifier that identifies the command and one or more command elements of the command, at least some of which may be optional (e.g., arguments, parameters, values, command options, and the like). In particular, each command could correspond to a pipelined search language command, such as an SPL command, or another type of command compatible with processing of the query.

In various implementations, option menu 1918 can be context based. In this regard, one or more of the options in option menu 1918 can be included based on a context related to selected portion 1916. For example, option menu 1918 may include options that correlate with a data type of the respective event attribute associated with selected portion 1916. The data type of the AccountSubRegion event attribute represented by column 1904e is a categorical data type and therefore options may include modifying the search query so that the set events only depict those events whose AccountSubRegion event attribute is equal to 'West' or those events whose AccountSubRegion event attribute is not equal to 'West.' If it were a numerical data type, on the other hand, a different array of options may be presented, including relational operators such as, for example, $>$, $<$, $=$, $\geq$, $\leq$, $\neq$ that may be utilized to add one or more commands to the search query. As an example, if a user were to select the average value depicted in column 1904b then the user could be displayed a list of options that include modifying the search query so that the set of events only depicts those events that satisfy one of the relational operators listed with respect to the selected average value. These relational operators may not make much sense and could be confusing if included in an option menu for a non-numerical data type.

Context can be further based on a source of data items in the selected portion(s) of the data summary view. For example, one or more options may be included in or excluded from an option menu based on a determination by the system that at least one of one or more data items of at least one of the selected portion(s) comprises a statistical value generated by one or more statistical functions performed on values of data items of at least some event attributes. A statistical value may refer to a value generated from an event using one or more statistical functions (e.g., average, sum, mean, median, mode, standard deviation, variance, count, range), such that the value no longer corresponds directly to event raw data. In some cases, a value may be determined as a statistical value based on identifying the value as an output of a statistical command in a search query. For example, statistical commands may be commands known to produce one or more statistical values as an output. A statistical value may also be referred to herein as a summary statistic where that statistical value summarizes or is based on a statistical function that takes into account multiple values of data items of an event attribute.

In addition to the above described options, those options described above in the section 2.3 entitled "EXEMPLARY OPTIONS" and elsewhere may also be utilized in these summary implementations where appropriate.

4.4 Hybrid Table Format with Data Summary View

Figure 19C:
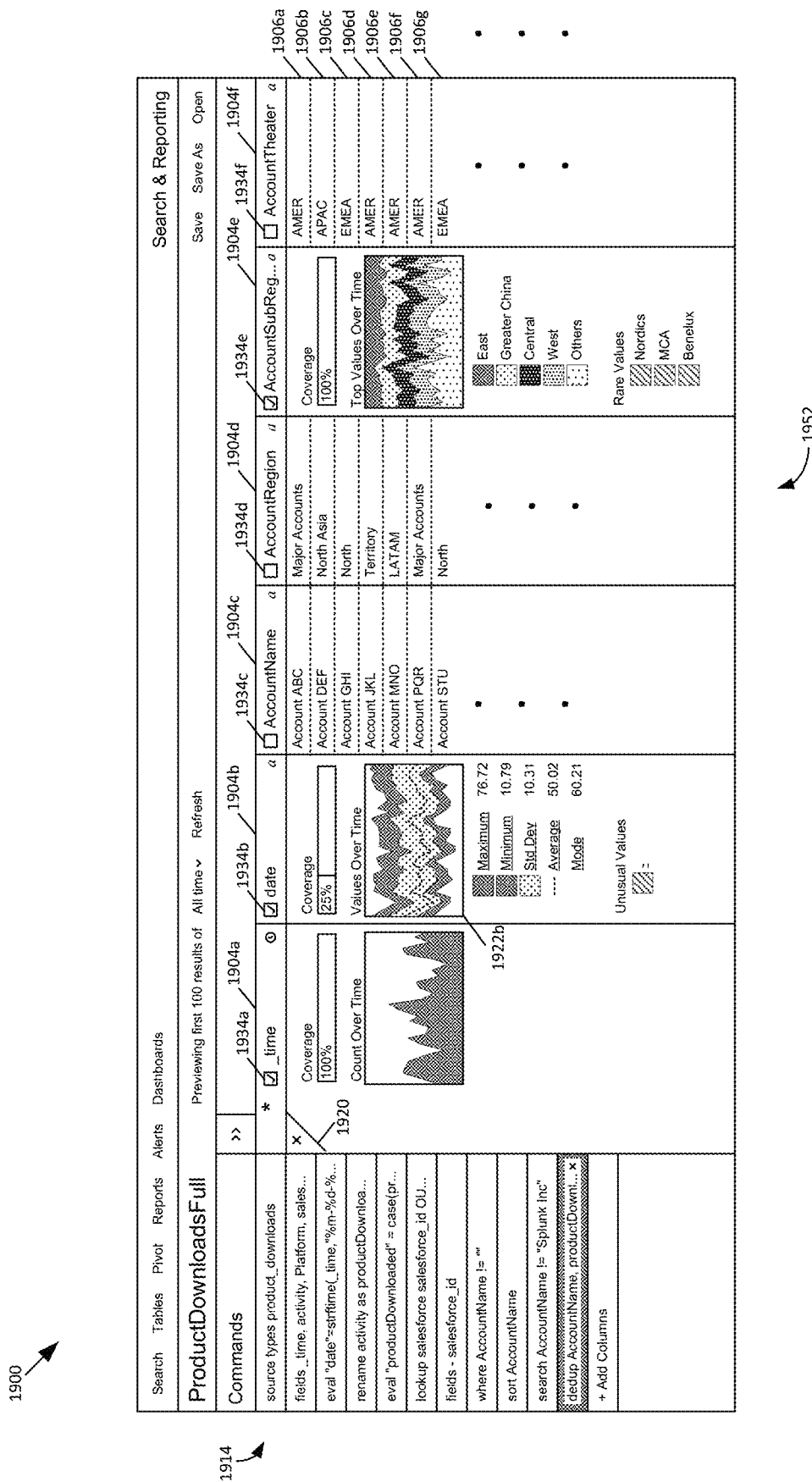
FIG. 19C illustrates a data summary view in accordance with the disclosed embodiments.

FIG. 19C depicts a hybrid table format with data summary view 1952, hereinafter merely referred to as hybrid view 1952. In such a hybrid view some columns may be depicted in the table format while other columns are depicted as summary reports of the respective event attribute of that column. In embodiments, each column can optionally be selectable as to whether or not the user would like to view the column in a table format or a data summary view. Such a selection may be made in any suitable manner; however, as depicted here, the columns are selectable through checkboxes 1934a-1934f. As depicted, columns 1934a, 1934b, and 1934e have been selected to be displayed as summary reports of a data summary view while columns 1934c, 1934d, and 1934f are displayed in a table format view. Another exemplary mechanism for selection would be through highlighting, as described above in reference to selection of cells, summary entries, or sections of summary graphs. It will be appreciated that these mechanisms for selection are merely meant to be illustrative of possible mechanisms and should not be treated as limiting. Any suitable mechanism for selection is explicitly contemplated herein.

Hybrid view 1952 can optionally be activated via a control, such as control 1910 of FIG. 19A and the full table format may be returned via control 1920. In addition, when the hybrid view is activated, selection of a column can act to automatically convert the display of that column from a table format to a data summary view, or vice versa. In addition, in some implementations, each column could have a control similar to control 1910, discussed above. In such an implementation, the summary report of each individual column, or event attribute, may be displayed by activating such a control. In addition, in such an implementation, the system may be configured to cause each summary report to have a control, such as control 1920 discussed above, to enable a user to switch individual columns displaying a summary report to a table format.

It will be appreciated that in some implementations, the system may be configured to enable the above discussed interactions with a data summary view to be carried out on those columns selected to display a summary report. In addition, the system may be configured to enable the interactions in the described above in the section 2.2 entitled "EXEMPLARY INTERACTIONS WITH A TABLE FORMAT" and elsewhere to be carried out on those columns displayed in a table format.

4.5 Filtering Events Through Interaction with a Data Summary View

Figure 19D:
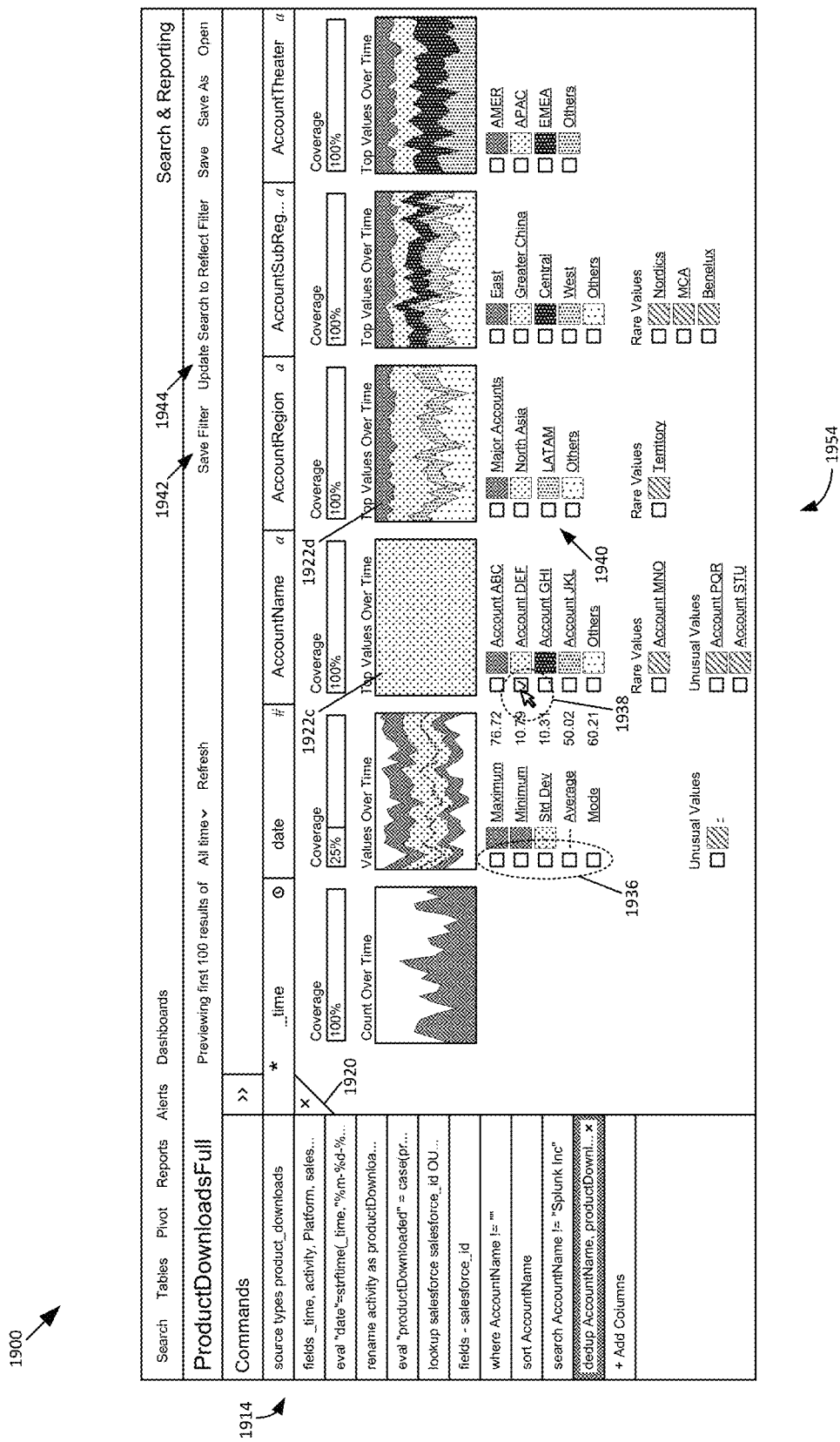
FIG. 19D illustrates a data summary view in accordance with the disclosed embodiments.

As mentioned previously, in some implementations, a user can interact with the summary entries and/or the summary graphs depicted in the summary reports of a data summary view to enable filtering of the set of events that satisfy search query 1914. FIG. 19D depicts an illustrative implementation of a data summary view that is configured to support such filtering. To accomplish this, the system can be configured to enable a user to make a selection of a portion of a summary graph (e.g., value or range) or a summary entry of a respective summary report. This selection may be accomplished through any conventional manner, including, but not limited to, mouse-over, left-click, right-click, touch selection, etc. Based on the selection, the system can be configured to cause the set of events to be filtered based on the corresponding selection. As can be seen in data summary view 1954, each of the summary entries depicted in the summary reports have a respective checkbox associated therewith (e.g., checkboxes 1936). It will be appreciated that these checkboxes are merely meant to be illustrative of a possible selection mechanism and that any other suitable mechanism for selection may be utilized in addition to, or in place of, the depicted checkboxes.

In implementations, the system may be configured to detect a user selection (e.g., selection 1938) of a summary entry via the depicted checkboxes. As used herein, selection may include initial selection of a summary entry, or subsequent selection of the summary entry, such that subsequent selection of the summary entry acts to deselect, or uncheck, the summary entry. In response to the selection of the summary entry, the system may be configured to filter the set of events based on the selection. To filter a set of events is to select events of the set of events that satisfy the filter. This is as opposed to modifying search query 1914 and executing the modified search query to produce a new set of events. As such, filtering the set of events can be more efficient than modifying search query 1914 and can enable additional uses, such as, for example, faceted browsing of the set of events to better visualize the data. As an example, data summary view depicts a user having selected 'Account DEF' of the event attribute AccountName. Application of a filter based on this selection would act to limit the events of the set of events to those events that have 'Account DEF' as the value of a data item within an event attribute. In some embodiments, filtering of a set of events may include applying a late binding schema, such as that discussed elsewhere herein, to the set of events. In such an embodiment, the late binding schema may be associated with one or more extraction rules that are based on the user selections. In addition, in some embodiments, the system could calculate an affinity or co-occurrence between two or more selected summary entries and display the affinity or co-occurrence to the user to aid the user's choice on whether or not to filter based on the two or more selected values.

Once the set of events has been filtered based on the user selection, in some embodiments, the system is configured to update the summary graphs to reflect the filtered set of events. In such embodiments, as the user successively selects summary entries, the user can gain additional insight into the data through the changes reflected in the summary graphs in response to each selection. As an example, summary graph 1922c has been updated to reflect, or correspond with, the filtered set of events that correspond with selection 1938. As such, summary graph 1922c reflects that only those events that have 'Account DEF' as the value of a data item within an event attribute are included within the filtered set of events. In addition, summary graph 1922d has also been updated to reflect the impact of the filtered set of events to the distribution of values over time for the AccountRegion event attribute. As can be seen, the section of this summary graph that depicted the 'West' value in FIGS. 19B and 19C has been removed from summary graph 1922d of FIG. 19D. This reflects that the filtered set of events that correspond with selection 1938 does not include any events that have a value of 'West' for the AccountRegion event attribute. It will be appreciated, however, that all summary graphs, or any subset thereof, could reflect changes to the distribution of values for the respectively associated event attribute over time. These changes could include adjustments to the distribution of values over time as well as removal of those sections of the graph that are no longer reflected in the filtered set of events.

In some embodiments, the summary entries may also be updated to reflect the filtered set of events. This is demonstrated by the removal of the 'West' value from summary entries 1940 in response to selection 1938. In other embodiments, the summary entries that are no longer in the filtered set of events may remain static or be designated in another way (e.g., change in font color, strikethrough, etc.) such that the user is still able to select those summary entries for inclusion in the filtered set of events. Such an inclusion could effectively act as an 'or' in the filtered set of events. In further embodiments, however, the summary entries for the event attribute associated with the selection (e.g., selection 1938) may remain static, regardless of the manner of updating the summary entries for the remaining event attributes. Such an embodiment would allow for further selection of values for the associated event attribute.

In some embodiments, based on the selection, the system can be configured to cause one or more options to be displayed (e.g., list of options 1918 discussed previously) corresponding to the selection. The filtering of the set of events could then be further based on the user selecting one of the displayed options. Such options are discussed in detail in reference to the above discussed section "ILLUSTRATIVE OPTIONS WITHIN THE DATA SUMMARY VIEW," however, rather than adding commands to the search query, the options would be applied to the set of events.

In some embodiments, it may be desirable for a user to be able to save the filter. For example, once the user has arrived at a filter that reflects an interesting find in the data the user may wish to save the filter for application of the filter to a different search query or to the same search query at a later time that could reflect newly added events. In such embodiments, the system may be configured to enable the user to save the filter via selection of save filter control 1942. Upon selecting save filter control 1942, the user may be able to enter a name for the filter so that the filter could be opened and applied to a different search query, or applied later to newly added events of the existing search query 1914. In embodiments where the user is interested in applying the filter at a later time to any newly added events that satisfy search query 1914, the filter could be saved as in metadata associated with a saved version of search query 1914 (e.g., metadata associated with a saved pipeline, as discussed above) so that the filter can be applied to search query 1914 when executed in the future (e.g., when loading the saved pipeline into a search interface).

In some embodiments, it may be desirable for a user to be able to update the commands of search query 1914 to reflect the filter that has been applied to the set of events. For example, once the user has arrived at a filter that reflects an interesting find in the data, the user may wish to update the commands of the search query to reflect the filter. Such an embodiment would result in an updated set of events that could then be further filtered, for instance. In such embodiments, the system may be configured to enable the user to update search query 1914 to reflect the filter via selection of control 1944. Upon selecting control 1944, the system may generate commands to be added to search query 1914. The system may then add these commands to search query 1914 (and one or more corresponding command entries to the command entry list) and may also automatically update the search results to reflect the updated search query.

It will be appreciated that, in some embodiments, the above discussed filtering could be applied to the hybrid view discussed above. In such embodiments, those columns displayed in the table format could also be updated to reflect the filtered set of events, in addition to updating the summary graphs and/or the summary entries displayed in those columns that have been selected to display summary reports for the respective event attribute.

In addition, it will be appreciated that, in some embodiments, the system may be configured to enable a user to select summary entries and/or values or ranges within the summary graphs to apply a filter to the set of events in accordance with the selections, while also simultaneously allowing a user to modify the search query through such selections, as discussed in the section "ILLUSTRATIVE INTERACTIONS WITH DATA SUMMARY VIEW," above. In such an embodiment, the manner of selection, for instance, may indicate whether the user intends to apply the selection as a filter or as a change to search query 1914. As an example, selection of the text of the summary entry (e.g., by clicking on the text) could indicate that the user wishes to modify search query 1914, while selection of, for example, a checkbox could indicate that the user wishes the selection to be applied as a filter. In such embodiments, as the system updates the set of events in response to changes to search query 1914, the filtered events may subsequently be automatically updated by the system to reflect the updated set of events.

5.0 ADDITIONAL EXEMPLARY IMPLEMENTATIONS

Figure 20:
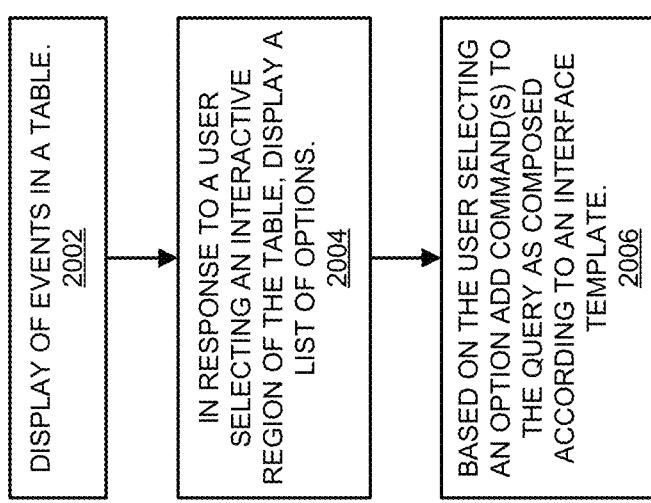
FIG. 20 presents a flowchart illustrating utilizing interface templates for query commands in accordance with the disclosed embodiments.

FIG. 20 presents a flowchart illustrating utilizing interface templates for query commands in accordance with the disclosed embodiments. Each block illustrating methods in accordance with FIG. 20, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 2002, events are displayed in a table. For example, a search system can cause display of events that correspond to search results of a search query in a table (e.g., 1202). The table can include a plurality of rows, each row representing an event of the events, the events comprising data items of event attributes. The table can also include a plurality of columns (e.g., 1204a, 1204b) forming cells with the plurality of rows, each column representing a respective event attribute of the event attributes, the cells of the column displaying the data items of the respective event attribute. The table further can include interactive regions of the table (e.g., cells, columns, rows, and/or portions thereof), each interactive region corresponding to one or more data items of the displayed data items and being selectable by a user to cause display of a list of options (e.g., 1220a, 1220b) corresponding to the selected interactive region.

At block 2004, in response to a user selecting an interactive region of the table, a list of options is displayed. For example, in response to the user selecting the designated interactive region (e.g., corresponding to 1204*a*) of the interactive regions of the table, the search system can cause display of the list of options (e.g., 1220*a*, 1220*c*) corresponding to the designated interactive region, each displayed option corresponding to an interface template for composing query commands.

At block 2006, based on the user selecting an option, commands are added to the query as composed according to an interface template. For example, based on the user selecting an option (e.g., 1220*a*) in the displayed list of options, causing one or more commands (e.g., corresponding to command entry 1232*b*) to be added to the search query, the one or more commands composed based on the one or more data items that corresponds to the designated interactive region according to instructions of the interface template of the selected option.

In some cases, the one or more commands are composed based on input from the user into the one or more form elements of a form, the instructions of the interface template mapping the one or more form elements to one or more portions of the one or more commands.

In some cases, the method further comprises based on the user selecting an option in the displayed list of options, causing display of a graphical user interface defined by the instructions of the interface template, and composing the one or more commands from user input to the graphical user interface.

In some cases, the method further comprises receiving a request from the user to modify the one or more commands added to the search query, in response to the request, causing a form to be presented comprising one or more form elements defined by the instructions of the interface template, and modifying the one or more commands in the search query based on input from the user to the one or more form elements, the instructions of the interface template mapping input to one or more portions of the one or more commands.

In some cases, the instructions of the interface template comprise extracting values of the one or more data items that corresponds to the designated interactive region, determining a number of form elements to display to the user based on the extracted values, causing display of each of the form elements to the user based on the user selecting an option in the displayed list of options, and composing the one or more commands based on input from the user into one or more of the form elements.

In some cases, the one or more commands are composed and added to the search query based on input from the user into the one or more form elements defined by the instructions of the interface template, and the method further comprises adding one or more subsequent commands to the search query, receiving a selection, by the user of a command entry representing the one or more commands of the search query, and based on the selection, causing presentation of at least one of the one or more form elements to the user for modifying the one or more commands added to the search query, the at least one of the one or more form elements comprising the input from the user.

In some cases, the one or more commands are composed and added to the search query using a form defined by the instructions of the interface template, and the method further comprises adding one or more subsequent commands to the search query, receiving a selection, by the user of a command entry representing the one or more commands of the search query, and based on the selection, causing presentation of the form to the user for modifying the one or more commands added to the search query.

In some cases, the causing one or more commands to be added to the search query automatically causes the displayed events in the table to be updated to correspond to the search query comprising the one or more commands.

In some cases, the method further comprises receiving a selection, by the user of a command entry representing one or more previously added commands of the search query, and based on the selection, causing a displayed form defined by the instructions of the interface template for composing the one or more commands to be replaced with a form defined by instructions of another interface template for composing the one or more previously added commands.

In some cases, the method further comprises receiving a selection, by the user of a command entry representing one or more previously added commands of the search query, and based on the selection, causing one or more form elements defined by the instructions of the interface template for composing the one or more commands to be replaced in an interface panel with one or more form elements defined by instructions of another interface template for composing the one or more previously added commands.

In some cases, the method further comprises causing display of an interface panel to the user, the interface panel being configured to display form elements for composing commands of the search query, in response to a request from the user to hide the interface panel, hiding the displayed interface panel including the form elements, and based on the user selecting the option in the displayed list of options, causing the hidden interface panel to be automatically unhidden, and causing the unhidden interface panel to include form elements defined by the instructions for composing the one or more commands.

In some cases, the instructions define that each command composed using the interface template identifies the one or more data items that corresponds to the designated interactive region in the command.

In some cases, the instructions define that each command composed using the interface template is composed by determining an identifier of an event attribute of the one or more data items that corresponds to the designated interactive region, and including the identifier in the command.

In some cases, the instructions specify a command identifier to include in each command composed using the interface template.

In some cases, the search query is executed on event data that includes a plurality of events, each event including a timestamp associated with raw data.

In some cases, the method further comprises executing the search query, wherein the executing returns the search results comprising a plurality of events, the executing performing an extraction of values from the plurality of events using a common extraction rule, the extraction defined by the second query.

In some cases, the method further comprises executing the search query, wherein the executing returns the search results comprising a plurality of events, the executing performing an extraction of values from the plurality of events using a regular expression, the extraction defined by the second query.

In some cases, the method further comprises executing the search query, wherein the executing returns query results comprising a plurality of events, the executing applying a late-binding schema to the plurality of events.

In some cases, the search query is represented in a pipeline query language and the one or more commands are written in the pipelined query language.

Figure 21:
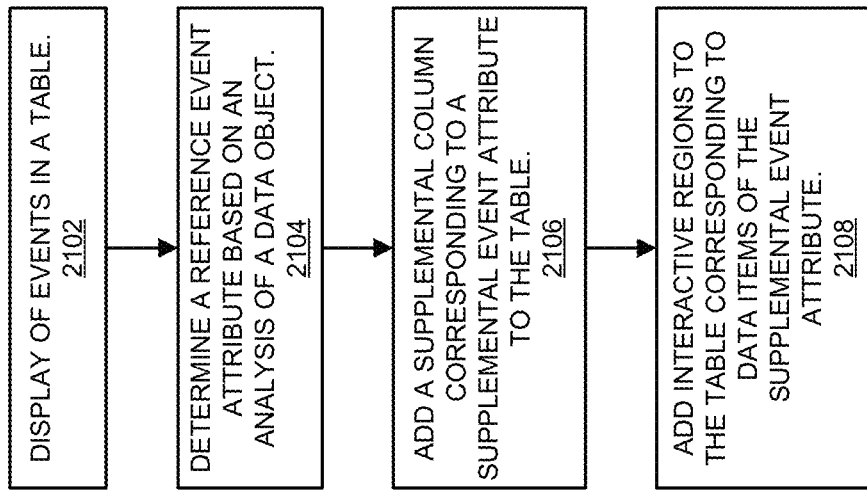
FIG. 21 presents a flowchart illustrating adding supplemental event attributes to a table format in accordance with the disclosed embodiments.

FIG. 21 presents a flowchart illustrating adding supplemental event attributes to a table format in accordance with the disclosed embodiments.

At block 2102, events are displayed in a table. For example, a search system can cause display of events that correspond to search results of a search query, the events comprising data items of event attributes, where the events are displayed in a table (e.g., 1202). The table can include cells arranged in rows and columns, each column (e.g., 1233*c*) corresponding to an event attribute the event attributes, and each row corresponding to an event of the events, the cells of each column being populated with the data items that correspond to the event attribute of the column, and interactive regions of the table (e.g., columns, cells, rows, and/or portions thereof), each interactive region corresponding to at least one data item of the displayed data items and being selectable by a user to add one or more commands to the search query based on the selected interactive region.

At block 2104, a reference event attribute is determined based on an analysis of a data object. For example, the search system can determine a reference event attribute (e.g., 1230) of the event attributes in the displayed table for adding a supplemental event attribute (e.g., corresponding to 1233*a*, 1233*b*) to the event attributes displayed in the table based on an analysis of a data object (e.g., corresponding to 1102*c*) that defines the supplemental event attribute.

At block 2106, a supplemental column is added corresponding to a supplemental event attribute of the table. For example, the search system can based on the user selecting an option (e.g., 1232), perform the adding comprising causing a supplemental column (e.g., 1233*a*, 1233*b*) corresponding to the supplemental event attribute to be added to the displayed table, cells of the supplemental column being populated with supplemental data items, each supplemental data item being mapped to a respective event for the supplemental column using a data item of the reference event attribute of the respective even and being displayed in the row corresponding to the respective event.

At block 2108, interactive regions are added to the table corresponding to data items of the supplemental event attribute. For example, the adding can further comprise the search system causing supplemental interactive regions (e.g., columns, cells, and/or portions thereof) to be added to the interactive regions of the displayed table, each supplemental interactive region corresponding to at least one of the supplemental data items and being selectable by the user to add one or more commands to the search query based on the selected supplemental interactive region.

In some cases, the performing the adding further comprises causing the search query to be updated to include one or more commands, the updated search query being executable to return search results comprising events having data items of the event attributes and the supplemental event attribute.

In some cases, the reference event attribute if of a plurality of reference event attributes identified based on the analysis of the data object, and the method further comprises causing presentation of the plurality of identified reference event attributes to the user as options for the adding of the supplemental column, where the option selected by the user is included in the options.

In some cases, each supplemental data item that is mapped to the respective event for the supplemental column is determined from the data object using a common combination type assigned to the adding.

In some cases, each supplemental data item that is mapped to the respective event for the supplemental column is determined from the data object using a join combination type identified for the adding.

In some cases, each supplemental data item that is mapped to the respective event for the supplemental column is determined from the data object using a lookup combination type identified for the adding.

In some cases, the method further comprises identifying a combination type preconfigured for the data object by another user, and based on the identifying of the combination type, using the combination type for the adding, wherein each supplemental data item that is mapped to the respective event for the supplemental column is determined from the data object using the combination type identified for the adding.

In some cases, t each supplemental data item is extracted from relational data identified by the data object.

In some cases, each supplemental data item is extracted from a lookup table identified by the data object.

In some cases, each supplemental data item is extracted from search results of a supplemental search query identified by the data object.

In some cases, the adding further comprises executing a supplemental search query associated with the data object and each supplemental data item is extracted from search results of the supplemental search query.

In some cases, each supplemental data item of the supplemental event attribute is extracted from at least one data source external to the search query.

In some cases, the data object defines a plurality of supplemental event attributes including the supplemental event attribute and an additional supplemental event attribute, and the performing the adding further comprises causing an additional supplemental column corresponding to the additional supplemental event attribute to be added to the displayed table, cells of the additional supplemental column being populated with additional supplemental data items, each additional supplemental data item being mapped to a respective event for the additional supplemental column using a data item of the reference event attribute of the respective even and being displayed in the row corresponding to the respective event, and causing additional supplemental interactive regions to be added to the interactive regions of the displayed table, each additional supplemental interactive region corresponding to at least one of the additional supplemental data items and being selectable by the user to add one or more commands to the search query based on the selected additional supplemental interactive region.

In some cases, the data object defines a plurality of supplemental event attributes, and the method further comprises causing presentation of the plurality of supplemental event attributes to the user based on the determining of the reference event attribute, receiving, from the user, a selection of a subset of the presented plurality of supplemental event attributes for the adding, the subset including the supplemental event attribute, and based on the selection of the subset, performing the adding wherein a supplemental column and corresponding supplemental data items is added to the displayed table for each supplemental event attribute in the subset.

In some cases, the determining the reference event attribute of the event attributes in the displayed table comprises identifying a potential event attribute defined by the data object, the potential event attribute having a plurality of values, calculating a level of similarity between one or more values of the plurality of values of the potential event attribute and one or more of the data items of a particular event attribute of the event attributes displayed in the table based on an analysis of the one or more values, and selecting the particular event attribute as the reference event attribute based on the calculated level of similarity, where the potential event attribute is used as the supplemental event attribute.

In some cases, the determining the reference event attribute of the event attributes in the displayed table comprises, identifying a potential event attribute defined by the data object, the potential event attribute having an attribute label, comparing the attribute label of the potential event attribute to an attribute label of a particular event attribute of the event attributes displayed in the table, and selecting the particular event attribute as the reference event attribute based on the comparing, where the potential event attribute is used as the supplemental event attribute.

In some cases, the search query is executed on event data that includes a plurality of events, each event including a timestamp associated with raw data.

In some cases, the search query defines an extraction of values from a plurality of events using a common extraction rule, the reference event attributes comprising the extracted values.

In some cases, the search query defines an extraction of values from a plurality of events using a regular expression, the reference event attributes comprising the extracted values.

In some cases, the search query applies a late-binding schema to the events.

In some cases, the search query is represented in a pipeline query language and the performing the adding further comprises adding one or more pipelined commands to the search query, the updated search query being executable to return search results comprising events having data items of the event attributes and the supplemental event attribute.

FIG. 22 presents a flowchart illustrating utilizing runtime permissions for queries in accordance with the disclosed embodiments. At block 2202, an access permission of a first user is assigned to a first query as a runtime permission. For example, a search system can assign an access permission of a first user to a query object that represents a first query (e.g., 1604), the access permission granting the first user access rights to one or more data sources (e.g., 1654) of the first query, the access permission being assigned as a runtime permission of the first query.

At block 2204, a request is granted from a second user to execute a second query. For example, the search system can grant a request from a second user to execute a second query (e.g., 1602).

At block 2206, an access request is received to execute the first query as a subquery of the second query. For example, the search system can receive an access request directed to the query object to execute the first query as a subquery of the second query.

At block 2208, the access request is granted to allow the second user to execute the first query as the subquery using the runtime permission. For example, based on the granting of the request from the second user to execute the second query, the search system can grant the access request, the granting of the access request allowing the second user to execute the first query on the one or more data sources (e.g., 1654) of the first query using the runtime permission assigned to the first query in executing the second query using the first query as the subquery.

In some cases, the method further comprises assigning an access permission of a third user to a base query object, the access permission granting the third user access rights to one or more data sources of the third query, the access permission being assigned as a runtime permission of the third query, and allowing the second user to execute the second query on the one or more data sources of the third query using the runtime permission assigned to the third query.

assigning an access permission of a third user to a base query object, the access permission granting the third user access rights to one or more data sources of the second query, the access permission being assigned as a runtime permission of the second query, and based on the granting of the request from the second user to execute the second query, allowing the second user to execute the second query on the one or more data sources of the second query using the runtime permission assigned to the second query.

In some cases, the allowing the second user to execute the first query on the one or more data sources of the first query for the subquery using the runtime permission assigned to the first query returns supplemental query results of the first query to a data processing pipeline corresponding to the second query.

In some cases, the first query is an input query of the second query, the input query representing an initial portion of a data processing pipeline represented by the second query.

In some cases, the one or more data sources of the first query comprise one or more indexed data stores and the first query is on indexed objects in the one or more data indexed data stores.

In some cases, the request from the second user to execute the second query is directed to another query object that represents the second query to execute the second query as a subquery of a third query.

In some cases, the granting the request from the second user to execute the second query is based on the second user having access rights to another query object that represents the second query.

In some cases, the second query defines a plurality of subqueries, each subquery having a respective query object that defines runtime permissions of the subquery that are used for executing the subquery in the executing of the second query.

In some cases, the method further comprises constructing, by the second user, the second query in a query interface, wherein the request from the second user to execute the second query is received in the query interface and causes query results of the second query to be displayed in the query interface.

In some cases, the method further comprises constructing, by the first user, the first query using a query interface configured to display query results of the first query to the first user, receiving, by the query interface, a request from the first user to save the first query, and saving the first query in association with the query object based on the request from the first user, the saving comprising the assigning of the access permission of the first user to the query object.

In some cases, the method further comprises constructing, by a third user, a third query using a query interface configured to display query results of the third query to the third user, receiving, by the query interface, a request from the third user to save the third query, and saving the third query in association with another query object based on the request from the third user, the saving comprising assigning an access permission of the third user to the another query object as a runtime permission of the third query. The granting the request from the second user to execute the second query allows the second user to execute the third query on the one or more data sources of the third query as a base query to the second query using the runtime permission assigned to the third query.

In some cases, the runtime permission is designated by the query object as being for a project, and the granting the access request is based on the executing of the second query being for the project.

In some cases, the first query and the second query are executed on event data that includes a plurality of events, each event including a timestamp associated with event raw data.

In some cases, the executing of the second query returns query results comprising a plurality of events, the executing performing an extraction of values from the plurality of events using a common extraction rule, the extraction defined by the second query.

In some cases, the executing of the second query returns query results comprising a plurality of events, the executing performing an extraction of values from the plurality of events using a regular expression, the extraction defined by the second query.

In some cases, the executing of the second query returns query results comprising a plurality of events, the executing applying a late-binding schema to the plurality of events.

In some cases, the first query and the second query each comprise a plurality of pipelined commands of a pipelined query language.

FIG. 23 presents a flowchart illustrating integrating query interfaces in accordance with the disclosed embodiments. At block 2302, a query is received in a first query interface. For example, a search system can receive, in a first query interface (e.g., corresponding to FIG. 14B), a query composed by the user by typing commands into a query box (e.g., 1402) of the first query interface.

At block 2304, events are displayed corresponding to the query with fields corresponding to the events. For example, based on the receiving of the query, the search system can cause events corresponding to query results of the query to be displayed (e.g., in 1408) in the first query interface with fields (e.g., in 1406 and/or 1408) corresponding to the events.

At block 2306, a selection is received of an option to load the query into a second query interface. For example, the search system can receive, from the user, a selection of an option (e.g., 1442) to load the query composed in the first query interface into a second query interface (e.g., corresponding to FIG. 15).

At block 2308, the second query interface is displayed with a table comprising events corresponding to the loaded query. For example, based on the selection by the user of the option, the search system can cause display of the second query interface and display of a table (e.g., 1502) in the second query interface that comprises events that correspond to query results of the loaded query (e.g., represented in 1508), the events comprising data items of event attributes. The displayed table can comprise cells arranged in rows and columns, each column corresponding to an event attribute the event attributes, and each row corresponding to an event of the events, the cells of each column being populated with the data items that correspond to the event attribute of the column, wherein the event attribute that corresponds to a designated column of the columns is a field of the fields displayed in the first query interface, and interactive regions of the table (e.g., columns, cells, rows, and/or portions thereof), each interactive region corresponding to at least one data item of the displayed data items and being selectable by the user to add one or more commands to the loaded query based on the selected interactive region.

In some cases, the method further comprises based on the selection by the user of the option, causing display of one or more form elements, each form element corresponding to at least one of the fields, the form elements allowing the user to select a subset of the fields, where the display of the table includes a respective column in the columns of the table for each selected field in the subset of the fields based on the user selecting the subset of the fields, and the event attribute of the respective column is the selected field.

In some cases, the method further comprises based on the selection by the user of the option, causing display of one or more form elements, each form element corresponding to at least one of the fields, the form elements allowing the user to select a subset of the fields, and causing at least one column to be added to the table such that the table includes a respective column in the columns of the displayed table for each selected field in the subset of the fields based on the user selecting the subset of the fields, the event attribute of the respective column being the selected field.

In some cases, the method further comprises based on the selection by the user of the option, causing one or more commands to be automatically added to the query to result in the loaded query, the one or more commands causing at least one of the fields to be removed from the events that correspond to query results of the loaded query.

In some cases, the query box is a search bar and the query is a search query.

In some cases, the field is defined in the first query interface outside of the query by an extraction rule.

In some cases, the method further comprises receiving, in the first query interface, a selection by the user of the field from the fields displayed with the events in the first query interface, and in response to the selection of the field, causing values of the field to be displayed in association with the events, each value being displayed with a corresponding one of the events. The designated column is included in the table of the second query interface based on the selection of the field in the first query interface.

In some cases, the method further comprises receiving, in the first query interface, a selection by the user of a designated field from the fields displayed with the events in the first query interface, in response to the selection of the designated field, and causing values of the designated field to be remove from display in association with the events, each value displayed with a corresponding one of the events. The display of the table in the second query interface is caused to automatically exclude a designated column for the designated field based on the selection by the user of the designated field.

In some cases, the method further comprises based on the selection by the user of the option, causing display of a command entry list, at least one command entry in the command entry list representing the query composed in the first query interface.

In some cases, the option selected by the user is a button in the first query interface and the selection of the button causes the first query interface to transition to the second query interface.

In some cases, the method further comprises causing an update to the query to include one or more commands based on the selection by the user of one or more of the interactive regions of the table in the second query interface, causing the updated query to be saved in association with a query object, receiving a selection of a pipeline entry representing the query object in a selection interface, and in response to the selection of the pipeline entry, loading the updated query into the first query interface using the query object.

In some cases, the method further comprises causing an update to the query to include one or more commands based on the selection by the user of one or more of the interactive regions of the table in the second query interface, causing the updated query to be saved in association with a query object, and loading the updated query into the first query interface using the query object, where at least a portion of the updated query is represented in the query box.

In some cases, the method further comprises causing an update to the query to include one or more commands based on the selection by the user of one or more of the interactive regions of the table in the second query interface, causing the updated query to be saved in association with a query object, the updated query comprising saved commands, and loading the updated query into the first query interface using the query object, the updated query being loaded as an input query for a designated user, where the first query interface allows the user to add one or more commands to the saved commands of the updated query saved in association with the query object, and precludes the designated user from modifying the saved commands of the updated query saved in association with the query object.

In some cases, the method further comprises based on the selection by the user of the option, automatically modifying the query such that the loaded query removes one or more of the fields displayed in the first query interface from the query results of the loaded query.

In some cases, the query is executed on event data that includes a plurality of events, each event including a timestamp associated with raw data.

In some cases, the method further comprises the query defines an extraction of values from a plurality of events using a common extraction rule, the values corresponding to the data items in the cells for at least one of the columns in the table.

In some cases, the method further comprises the query defines an extraction of values from a plurality of events using a regular expression, the values corresponding to the data items in the cells for at least one of the columns in the table.

In some cases, the loaded query applies a late-binding schema to the events that correspond to the query results of the loaded query.

In some cases, the loaded query is represented in a pipelined query language and each interactive region is selectable by the user to add one or more pipelined commands to the loaded query based on the selected interactive region.

FIG. 24 presents a flowchart illustrating utilizing a data summary view in accordance with the disclosed embodiments. In embodiments, the process flow may begin at block 2402 where the system receives a request to display a data summary view (e.g., the data summary view discussed extensively in reference to FIGS. 19A-19D) of search results of a search query (e.g., search query 1914 of FIG. 19A). In embodiments, this request may be received while the search results are being displayed in a table format (e.g., table format 1902 of FIG. 19A) within a search screen (e.g., search screen 1900 of FIG. 19A). Such a table format may include a plurality of rows and a plurality of columns. Each row of the plurality of rows may represent an event, of a set of events that satisfy the search query. Thea plurality of columns may form cells with the plurality of rows. Each column may represent a respective event attribute of a plurality of event attributes of the set of events and may include data items of the respective event attribute populating ones of the cells (e.g., cell 1912 of FIG. 19A).

At block 2404, in response to receiving the request, the system may cause display of the requested data summary view. The data summary view may include a summary report, such as that discussed extensively in reference to FIG. 19A-19D, for a selected event attribute of the plurality of event attributes. The summary report may include summary entries (e.g., 1924*b*, 1924*f,* 1926, and 1928 of FIG. 19B) that present a summary of data items of the selected event attribute. In addition, the summary report may include a summary graph (e.g., 1922*a* and 1922*b* of FIG. 19B or 1922*c* and 1922*d* of FIG. 19*d*) of these data items. The summary graph may depict a distribution of at least a subset of values of the data items of the selected event attribute over a period of time. In some cases a format of the summary entries and the summary graph are based on a type (e.g., numerical, categorical, user defined, etc.) associated with the selected event attribute. In some cases, the summary entries may identify one or more values within the data items of the selected event attribute that occur above an upper occurrence threshold (e.g., top values 1924*f* of FIG. 19B). In some cases, the summary entries may identify one or more values within the data items of the selected event attribute that occur below a lower occurrence threshold (e.g., rare values 1928 of FIG. 19B). In some cases, the summary entries identify one or more values within the data items of the selected event attribute that are beyond a threshold of similarity from other values within the data items of the selected event attribute (e.g., unusual values 1926 of FIG. 19B). In some cases, the summary entries include summary statistics, such as those summary statistics discussed previously (e.g., summary statistics represented by summary entries 1924*b* of FIG. 19B). In some cases the summary entries are based on a data type (e.g., numerical, categorical, user defined, etc.) of the selected event attribute. In such cases, for a numeric data type the summary entries may include one or more of a maximum value, a minimum value, a mean value, a median value, a mode value, and a standard deviation. In some cases, the summary entries for a numeric data type, for example, could include one or more of: a maximum value, a minimum value, a mean value, a median value, a mode value, and a standard deviation.

In some cases, the summary graph depicts the distribution of values of the subset of the data items of the selected event attribute over a period of time. In such cases, the distribution of values may include one or more of a maximum value, a minimum value, a standard deviation, and an average value.

In some cases, the data summary view may include a separate summary report for each of one or more additional event attributes of the plurality of event attributes, up to and including all of the plurality of event attributes (e.g., data summary view 1946). As with the above discussed summary report, each of the additional summary reports may include summary entries and/or a summary graph of data items of a respective one of the one or more additional event attributes.

In some cases, in causing display of the data summary view the system may be configured to cause the data summary view to overlay the table format. In some cases this overlay could be displayed over one or more columns of the table. In such cases, a portion of the table format may still be viewed alongside the overlayed data summary view.

In some cases, the system may enable a user to switch from the data summary view to the table format from within the data summary view and switch from the table format to the data summary view from within the table format.

In some cases, causing display of the data summary view includes causing the data summary view to overlay one or more columns of the table format. In such cases, the one or more columns would include the column that represents the selected event attribute. In addition, such cases may include overlaying the one or more columns of the table format such that a remainder of the table format is still visible. In some cases, each of the plurality of columns is selectable by a user (e.g., via checkboxes 1934a-1934f of FIG. 19C). In such cases the request to display a data summary view may include an identifier of one or more columns that have been selected by the user (e.g., columns 1904a, 1904b, and 1904e of FIG. 19C). In such cases the one or more columns that overlay the table format can be the columns identified in the request.

In some cases the data summary view is interactive such that the data summary view includes user selectable portions (e.g., selectable summary entries and/or selectable values or ranges of values from the summary graph). In such cases, the system may be configured to receive a selection of a selectable portion of the data summary view. In response to receiving the selection of the selectable portion the system may update the search query based on the selected portion.

In some cases, the system may be configured to, upon receiving the selection of the selectable portion of the data summary view, cause a list of options (e.g., options menu 1918 of FIG. 19B) to display to the user. In some cases, the list of options may be dependent on a type (e.g., time, numerical, categorical, user defined, etc.) of the selectable portion selected. Such a list of options is discussed extensively above. The system may then, update the search query (e.g., by causing one or more commands to be added to the search query). In some cases, the one or more commands may be based, at least in part, on an option that is selected from the list of options. In some cases, the system may be configured to automatically update the set of events that satisfy the search query to correspond with the updated search query.

FIG. 25 presents a flowchart illustrating utilizing a data summary view with filtering in accordance with the disclosed embodiments. Such filtering can enable faceted browsing of the set of events. In some embodiments, the process flow may begin where the system receives a request to display a data summary view (e.g., the data summary view discussed extensively in reference to FIGS. 19A-19D) of search results of a search query (e.g., search query 1914 of FIG. 19A), as discussed in reference to FIG. 24, above. In some embodiments, this request may be received while the search results are being displayed in a table format (e.g., table format 1902 of FIG. 19A) within a search screen (e.g., search screen 1900 of FIG. 19A). Such a table format may include a plurality of rows and a plurality of columns. Each row of the plurality of rows may represent an event, of a set of events that satisfy the search query. The plurality of columns may form cells with the plurality of rows. Each column may represent a respective event attribute of a plurality of event attributes of the set of events and may include data items of the respective event attribute populating ones of the cells (e.g., cell 1912 of FIG. 19A).

In other embodiments, the process may begin at block 2502, where the system may cause display of the data summary view. The data summary view may include summary reports, such as the summary reports discussed extensively in reference to FIGS. 19A-19D, that are each respectively associated with a selected event attribute. The summary reports may each include summary entries (e.g., 1924b, 1924f, 1926, and 1928 of FIG. 19B) that present a summary of data items of the respectively associated event attribute. In addition, the summary reports may each include a summary graph (e.g., 1922a and 1922b of FIG. 19B or 1922c and 1922d of FIG. 19d) of the respective data items of the respectively selected event attribute. The summary graphs may depict a distribution of at least a subset of values of the respective data items over a period of time.

In some cases a format of the summary entries and the summary graphs of the summary reports are based on a type (e.g., numerical, categorical, user defined, etc.) associated with the respective event attribute. In some cases, the summary entries may identify one or more values within the data items of the respective event attribute that occur above an upper occurrence threshold (e.g., top values 1924f of FIG. 19B). In some cases, the summary entries may identify one or more values within the data items of the respective event attribute that occur below a lower occurrence threshold (e.g., rare values 1928 of FIG. 19B). In some cases, the summary entries identify one or more values within the data items of the respective event attribute that are beyond a threshold of similarity from other values within the data items of the respective event attribute (e.g., unusual values 1926 of FIG. 19B). In some cases, the summary entries include summary statistics, such as those summary statistics discussed previously (e.g., summary statistics represented by summary entries 1924b of FIG. 19B). In some cases the summary entries are based on a data type (e.g., numerical, categorical, user defined, etc.) of the respective event attribute. In such cases, for a numeric data type the summary entries may include one or more of a maximum value, a minimum value, a mean value, a median value, a mode value, and a standard deviation.

In some cases, the summary graphs of the summary reports depict the distribution of values of the subset of the data items of the respective event attributes over a period of time. In such cases, the distribution of values may include one or more of a maximum value, a minimum value, a standard deviation, and an average value.

In some cases, in causing display of the data summary view the system may be configured to cause the data summary view to overlay the table format. In some cases this overlay could be displayed over one or more columns of the table. In such cases, a portion of the table format may still be viewed alongside the overlayed data summary view.

In some cases, the system may enable a user to switch from the data summary view to the table format from within the data summary view and switch from the table format to the data summary view from within the table format.

In some cases, causing display of the data summary view includes causing the data summary view to overlay one or more columns of the table format. In such cases, the one or more columns would include the columns that represent the respective event attributes of the summary reports. In addition, such cases may include overlaying the one or more columns of the table format such that a remainder of the table format is still visible. In some cases, each of the plurality of columns is selectable by a user (e.g., via checkboxes 1934a-1934f of FIG. 19C). In such cases the request to display a data summary view may include an identifier of columns that have been selected by the user (e.g., columns 1904a, 1904b, and 1904e of FIG. 19C). In such cases the columns that overlay the table format can be the columns identified in the request.

In some cases the data summary view is interactive such that the data summary view includes user selectable portions (e.g., checkboxes 1936 of FIG. 19D and/or selectable values or ranges of values from the summary graphs). In such cases, the system may be configured to receive a selection of a selectable portion of a first of the summary reports. In response to receiving the selection of the selectable portion the system may filter the set of events based on the selected portion at block 2504.

In some cases, the system may be configured to, upon receiving the selection of the selectable portion of the first of the summary reports, cause a list of filtering options to display to the user. In some cases, the list of filtering options may be dependent on a type (e.g., numerical, categorical, user defined, etc.) of the selectable portion selected. Such a list of options is discussed above in the section "FILTERING EVENTS THROUGH INTERACTION WITH THE DATA SUMMARY VIEW." Once the set of events has been filtered, in some cases the system may be configured to cause an update the summary graphs, at block 2506, of the summary reports to reflect the filtered set of events. In some cases, the system may be further configured to cause an update of at least the summary entries of those summary reports that did not have a selectable portion selected to reflect the filtered set of events. In some cases the system may be configured to cause the summary entries of the first summary report to remain static to allow for additional selection from the first summary report which would enable additional filtering. In some cases, the system may be configured to cause the set if events displayed in the table view to reflect the filtered set of events.

In some cases, the user may select another selectable portion from a different summary report than the summary report that was previously selected from. In such cases, the system may be further configured to, in response to selection of one or more of the selectable portions by the user, update the filter based on the selection. In such cases, the system may be configured to refilter the set of events utilizing the updated filter. In addition, in such cases the system may be configured to cause an update of at least the summary graphs of the summary reports to reflect the refiltered set of events.

In some cases, it may be desirable for a user to be able to save the filter. For example, once the user has arrived at a filter that reflects an interesting find in the data the user may wish to save the filter for application of the filter to a different search query or to the same search query at a later time that could reflect newly added events. In such embodiments, the system may be configured to enable the user to save the filter. In some cases, the system may be configured to enable the user save the filter as metadata associated with a saved version of the search query so that the filter can be applied to the search query when executed in the future.

In some embodiments, it may be desirable for a user to be able to update the commands of the search query to reflect the filter that has been applied to the set of events. For example, once the user has arrived at a filter that reflects an interesting find in the data, the user may wish to update the commands of the search query to reflect the filter. Such an embodiment would result in an updated set of events that could then be further filtered, for instance. In such embodiments, the system may be configured to enable the user to update the search query to reflect the filter via selection of a control (e.g., control 1944 of FIG. 19D). Upon selecting the control, the system may be configured to generate commands to be added to the search query. The system may then add these commands to the search query and may also automatically update the search results to reflect the updated search query.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
   causing a user interface to present rows of search results and columns displaying textual values of attributes of the search results; and
   in response to receiving input instructing presentation of a summarized view of the search results, causing the user interface to replace the textual values in each individual column of one or more columns of the columns with a corresponding panel that is confined to the individual column and displays a graph that plots changes over time of a measure of how frequently one or more distinct values of the textual values appeared in a corresponding attribute represented by the individual column.

2. The computer-implemented method of claim 1, wherein the corresponding panel confined to each individual column displays a list of the one or more distinct values of the textual values of the corresponding attribute based on a determination that a number or percentage of occurrences of each of the one or more distinct values in the corresponding attribute exceeds an occurrence threshold.

3. The computer-implemented method of claim 1, further comprising, in response to detecting a click or a tap on a representation of a value of the one or more distinct values displayed in the corresponding panel in a particular column of the one or more columns, filtering the search results into a filtered set of the search results that have the value in the corresponding attribute represented by the particular column.

4. The computer-implemented method of claim 1, wherein the one or more columns include a particular column and other columns, the computer-implemented method further comprising, in response to detecting a click or a tap in the corresponding panel in the particular column on a representation of one or more values, updating the graph in each of the other columns to represent a filtered set of the search results that have one of the one or more values in the corresponding attribute represented by the particular column.

5. The computer-implemented method of claim 1, further comprising, in response to detecting a click or a tap in the corresponding panel in a first column on a representation of one or more values, updating the graph in another column to represent a filtered set of the search results that have one of the one or more values in the corresponding attribute represented by the first column.

6. The computer-implemented method of claim 1, wherein selection of a control on the user interface causes the user interface to replace the corresponding panel in each individual column with the textual values of the corresponding attribute represented by the column.

7. The computer-implemented method of claim 1, wherein selection of a particular column of the one or more columns causes the user interface to replace the corresponding panel in the particular column with the textual values of the corresponding attribute represented by the particular column and retain the corresponding panel in other columns.

8. One or more non-transitory computer-readable media storing instructions executable by one or more processors to cause the one or more processors to perform operations comprising:

causing a user interface to present rows of search results and columns displaying textual values of attributes of the search results; and in response to receiving input instructing presentation of a summarized view of the search results, causing the user interface to replace the textual values in each individual column of one or more columns of the columns with a corresponding panel that is confined to the individual column and displays a graph that plots changes over time of a measure of how frequently one or more distinct values of the textual values appeared in a corresponding attribute represented by the individual column.

9. The one or more non-transitory computer-readable media of claim 8, wherein the corresponding panel confined to each individual column displays a list of the one or more distinct values of the textual values of the corresponding attribute based on a determination that a number or percentage of occurrences of each of the one or more distinct values in the corresponding attribute exceeds an occurrence threshold.

10. The one or more non-transitory computer-readable media of claim 8, the operations further comprising, in response to detecting a click or a tap on a representation of a value of the one or more distinct values displayed in the corresponding panel in a particular column of the one or more columns, filtering the search results into a filtered set of the search results that have the value in the corresponding attribute represented by the particular column.

11. The one or more non-transitory computer-readable media of claim 8, wherein the one or more columns include a particular column and other columns, the operations further comprising, in response to detecting a click or a tap in the corresponding panel in the particular column on a representation of one or more values, updating the graph in each of the other columns to represent a filtered set of the search results that have one of the one or more values in the corresponding attribute represented by the particular column.

12. The one or more non-transitory computer-readable media of claim 8, the operations further comprising, in response to detecting a click or a tap in the corresponding panel in a first column on a representation of one or more values, updating the graph in another column to represent a filtered set of the search results that have one of the one or more values in the corresponding attribute represented by the first column.

13. The one or more non-transitory computer-readable media of claim 8, wherein selection of a control on the user interface causes the user interface to replace the corresponding panel in each individual column with the textual values of the corresponding attribute represented by the column.

14. The one or more non-transitory computer-readable media of claim 8, wherein selection of a particular column of the one or more columns causes the user interface to replace the corresponding panel in the particular column with the textual values of the corresponding attribute represented by the particular column and retain the corresponding panel in other columns.

15. A system comprising:
one or more processors and memory storing instructions executable by the one or more processors to cause the one or more processors to perform operations comprising:
causing a user interface to present rows of search results and columns displaying textual values of attributes of the search results; and
in response to receiving input instructing presentation of a summarized view of the search results, causing the user interface to replace the textual values in each individual column of one or more columns of the columns with a corresponding panel that is confined to the individual column and displays a graph that plots changes over time of a measure of how frequently one or more distinct values of the textual values appeared in a corresponding attribute represented by the individual column.

16. The system of claim 15, wherein the corresponding panel confined to each individual column displays a list of the one or more distinct values of the textual values of the corresponding attribute based on a determination that a number or percentage of occurrences of each of the one or more distinct values in the corresponding attribute exceeds an occurrence threshold.

17. The system of claim 15, the operations further comprising, in response to detecting a click or a tap on a representation of a value of the one or more distinct values displayed in the corresponding panel in a particular column of the one or more columns, filtering the search results into a filtered set of the search results that have the value in the corresponding attribute represented by the particular column.

18. The system of claim 15, wherein the one or more columns include a particular column and other columns, the operations further comprising, in response to detecting a click or a tap in the corresponding panel in the particular column on a representation of one or more values, updating the graph in each of the other columns to represent a filtered set of the search results that have one of the one or more values in the corresponding attribute represented by the particular column.

19. The system of claim 15, the operations further comprising, in response to detecting a click or a tap in the corresponding panel in a first column on a representation of one or more values, updating the graph in another column to represent a filtered set of the search results that have one of the one or more values in the corresponding attribute represented by the first column.

20. The system of claim 15, wherein selection of a control on the user interface causes the user interface to replace the corresponding panel in each individual column with the textual values of the corresponding attribute represented by the column.

* * * * *